(12) United States Patent
Park et al.

(10) Patent No.: US 8,369,909 B2
(45) Date of Patent: Feb. 5, 2013

(54) SLIDING OPENING AND CLOSING DEVICE AND A PORTABLE TERMINAL HAVING THE SAME

(76) Inventors: Jae-Young Park, Gyeonggi-do (KR); Jun-Hong Lee, Gyeonggi-do (KR); Chun-Soo Park, Gyeonggi-do (KR)

( * ) Notice: Subject to any disclaimer, the term of this patent is extended or adjusted under 35 U.S.C. 154(b) by 666 days.

(21) Appl. No.: 12/573,774

(22) Filed: Oct. 5, 2009

(65) Prior Publication Data

US 2010/0029348 A1 Feb. 4, 2010

Related U.S. Application Data

(63) Continuation of application No. 10/569,516, filed as application No. PCT/KR2004/002132 on Aug. 25, 2004, now Pat. No. 7,599,723.

(30) Foreign Application Priority Data

| Aug. 25, 2003 | (KR) | 10-2003-0058715 |
| Sep. 9, 2003 | (KR) | 10-2003-0062941 |
| Dec. 29, 2003 | (KR) | 10-2003-0098725 |
| Apr. 19, 2004 | (KR) | 10-2004-0026729 |
| Apr. 21, 2004 | (KR) | 10-2004-0027516 |
| Jul. 9, 2004 | (KR) | 10-2004-0053563 |
| Jul. 16, 2004 | (KR) | 10-2004-0055523 |

(51) Int. Cl.
*H04M 1/00* (2006.01)

(52) U.S. Cl. .............. 455/575.4; 455/575.1; 455/575.8; 379/433.01; 379/433.11; 379/433.12; 361/727

(58) Field of Classification Search .............. 455/575.1, 455/575.4, 575.8; 379/433.01, 433.11, 433.12; 361/727
See application file for complete search history.

(56) References Cited

U.S. PATENT DOCUMENTS

| 6,816,363 | B2 | 11/2004 | Yamamoto |
| 6,822,871 | B2* | 11/2004 | Lee et al. ............ 361/727 |
| 7,020,495 | B2 | 3/2006 | Han |
| 7,496,389 | B2 | 2/2009 | Cho et al. |
| 7,599,723 | B2 | 10/2009 | Lee et al. |
| 2001/0036266 | A1 | 11/2001 | Gronroos et al. |
| 2003/0203747 | A1* | 10/2003 | Nagamine ............ 455/575.3 |

FOREIGN PATENT DOCUMENTS

| CN | 1864339 | 11/2006 |
| KR | 20-0308165 | 3/2003 |
| KR | 20030050277 | 6/2003 |
| KR | 20-0345703 | 3/2004 |
| WO | WO2005/020452 | 3/2005 |

* cited by examiner

*Primary Examiner* — Raymond Dean
(74) *Attorney, Agent, or Firm* — Harness, Dickey & Pierce, P.L.C.

(57) ABSTRACT

Disclosed are a sliding opening and closing device and a portable terminal having the same. According to the first embodiment of the present invention, a slide plate is linked to a main plate to be slidable in one direction. Also, the main plate supports an elastic part so as to generate an elasticity power in one direction. A power transformation member receives the elasticity power of the elastic member, and transmits the elasticity power to the slide plate in the direction of the opening or the closing according to the position of the slide plate.

18 Claims, 48 Drawing Sheets

SLIDING OPENING AND CLOSING DEVICE AND A PORTABLE TERMINAL HAVING THE SAME

CROSS-REFERENCE TO RELATED APPLICATIONS

This application is a continuation of U.S. patent application Ser. No. 10/569,516 filed Feb. 24, 2006 (now U.S. Pat No. 7,599,723, issued Oct. 6, 2009), which, in turn, is a U.S. national stage filing under 35 U.S.C. §371 of International Application No. PCT/KR04/02132 filed Aug. 25, 2004.

PCT International Application No. PCT/KR04/02132 claimed the benefit of the following seven Korean patent applications:

Korean Patent Application No. KR10-2003-0058715 filed Aug. 25, 2003, (now Korean Patent No. KR54377 issued Jan. 10, 2006);
Korean Patent Application No. KR10-2003-0062941 filed Sep. 9, 2003 (now Korean Patent No. KR505961 issued Jul. 27, 2005);
Korean Patent Application No. KR10-2003-0098725 filed Dec. 29, 2003 (now Korean Patent KR597246 issued Jun. 28, 2006);
Korean Patent Application No. KR10-2004-0026729 filed Apr. 19, 2004 (now Korean Patent No. KR570724 issued Apr. 6, 2006);
Korean Patent Application No. KR10-2004-0027516 filed Apr. 21, 2004 (now Korean Patent No. KR571045 issued Apr. 7, 2006);
Korean Patent Application No. KR10-2004-0053563 filed Jul. 9, 2004 (now Korean Patent No. KR660819 issued Dec. 18, 2006; and
Korean Patent Application No. KR10-2004-0055523 filed Jul. 16, 2004 (now Korean Patent No. KR668262 issued Jan. 8, 2007).

The entire disclosures of each of the above applications are incorporated herein by reference.

BACKGROUND

1. Field of the Invention

The present invention relates to a sliding opening and closing device and a portable terminal having the same. More specifically, it relates to a sliding opening and closing device, of which a slide plate is automatically opened from or closed into a main plate if it is applied with a force only initially, and relates to a portable terminal wherein the sliding opening and closing device is installed so that a sub body can be opened from and closed into a main body by a sliding operation.

2. Description of the Related Art

Generally, a sliding opening and closing device means a part that connects two items with each other and makes the items to be slidable for each other. The sliding opening and closing device is used in various fields, e.g., home electronics such as a refrigerator, office machines such as a duplicator, computer equipment such as a notebook computer monitor and an LCD monitor, and telecommunications equipment such as a cellular phone, a PCS phone and a PDA, etc.

Recently, as the use of portable wireless terminals becomes universalized, as well as the simple intrinsic function of the wireless communication, additional functions are also being required for the opening and closing operation in order to satisfy the taste of each user.

According to this request, portable terminals have been developed from general bar-type terminals to flip-type terminals, to flip-up-type terminals and to folder-type terminals, etc. Currently, the folder-type terminals are predominantly used.

That is because the folder-type terminals have sufficient special room enough to employ a wide LCD module as a display device and have a superior portability to other terminals since they are foldable in half.

Meanwhile, a sliding-type terminal has been known. It can be equipped with a display device having a wide LCD module with similar size of that of a folder-type terminal. Also, it can be conducive to minimization of a terminal.

In case of the sliding-type terminal, a sub body as a cover is opened and closed on a main body in a sliding operation. It has an additional advantage of being opened and closed in a new operation while maintaining the advantages of the existing folder-type terminal.

As a kind of such sliding-type terminal, a sliding-type portable wireless terminal has been filed by the applicant, Himac Corporation, under the Korean Utility Model Application No. 2003-0000136.

The terminal disclosed in the above application comprises a guide means for guiding a sub body onto a main body and at least one elastic means for changing direction of pressure in a direction of opening or in a direction of closing based on a certain sliding position of the sub body between the sub body and the main body. Also, when the sub body operates a complete opening or a complete closing by the elastic means, it can maintain the maximum opening position or the maximum closing position without a stopper. As the elastic means, a torsion spring is employed. One end of the torsion spring is fixed to the main body and the other end is fixed to the sub body.

In case of such terminal, as the sub body moves, the torsion spring rotates and supplies rotating force to the sub body. During the action, the torsion spring gets strained and relaxed widely. For this reason, torsion springs with wide motion but less elasticity power were used. In order to complement the insufficient elastic force, two torsion springs were arranged.

However, in case of the above terminal, although two torsion springs were arranged, the elasticity power was not sufficient because of the characteristic of the torsion spring. Furthermore, since the torsion springs loosened widely, they aged easily due to fatigue with repeated actions and lost their normal function early.

SUMMARY OF THE INVENTION

The present invention solves the above-described problems in the prior art. Therefore, it is a first object of the present invention to broaden the lifetime of an elastic part by increasing a pushing force of a slide plate by using a power transformation member to transfer an elasticity power of the elastic part by changing it to the pushing force of the slide plate while decreasing the variation of the elastic part.

It is a second object of the present invention to provide convenience to a user in the opening and closing of a portable terminal by making the sub body to be automatically operated from the main body by a sliding operation and by a push of a button.

It is a third object of the present invention to display a horizontally long image by using the entire screen of the display device by making the sub body to be opened and closed by a sliding operation and by making the display device installed in the sub body to rotate.

In order to achieve the first object, the present invention provides a sliding opening and closing device comprising a main plate; a slide plate which is connected to the main plate to be slidable in one direction; an elastic part which is supported by the main plate and generates an elasticity power in one direction; and a power transformation member which receives the elasticity power of the elastic part so that, on a particular position in the moving path of the slide plate, it can supply the elasticity power to the slide plate in a direction of closing when said slide plate is in the closing position, and supply the elasticity power to the slide plate in a direction of opening when the slide plate is in the opening position.

According to one embodiment of the present invention, at least one guide slit is formed in the slide plate along the moving direction and a guide rib is formed which is connected to be slidable to each of the guide slits.

The elastic part is composed of a torsion spring generating an extending elastic force, wherein the main plate supports one end of the torsion spring and the power transformation member supports the other end of the torsion spring.

The power transformation member is composed of a rotating arm, one end of which is connected to the elastic part and guided onto the main plate so that it can flow only in a perpendicular direction to the moving direction of the slide plate, and the other end of which is connected to be rotatable to the slide plate.

According to another embodiment of the present invention, the power transformation member is composed of a moving block, which is fixed so as to receive an elasticity power of the elastic part. Also, a cam groove is formed in the slide plate, which comprises a first cant having an angle supplying a force in a direction of opening the slide plate after receiving the elasticity power of the moving block and a second cant being connected to the first cant and supplying a force in a direction of closing the slide plate.

The moving block comprises a cam shaft being connected to the elastic part and having a boss part connected to be slidable to the cam groove; a bushing being connected to be slidable to an elongated hole which is formed at the main plate in a direction of supplying an elasticity power of the elastic member; and a screw which penetrates into the bushing and coupled to the cam shaft.

The sliding opening and closing device additionally comprises a guide member which guides a connecting part between the elastic part and the power transformation member to move in a direction of being applied with an elasticity power of the elastic member, and which generates a damping force against the power transformation member not to move the slide plate any more in the direction of closing the slide plate into the main plate when the slide plate is closed into the main plate, and not to move the slide plate any more in the direction of opening the slide plate from the main plate when the slide plate is opened from the main plate.

The guide member comprises a guide pin connecting the elastic part with the power transformation member, and an elongated hole is formed on the slide plate for guiding the guide pin to move in a direction perpendicular to the moving of the slide plate.

According to another embodiment of the present invention, the power transformation member is composed of a link, wherein a first end fixed with the elastic part is coupled to be pivotable to the slide plate, and a second end is coupled to the main plate in such a manner that the elastic part can move straightly to and pivot on the position where the elastic part is coupled to the main plate.

The power transformation member is composed of a link, wherein a first shaft hole, which is coupled to be rotatable to a first rotating shaft projecting from the slide plate, is formed at the first end of the link; and an elongated hole, which provides space in which a second rotating shaft projecting from the main plate can move, is formed at the second end of the link.

The opening and closing device limits the moving distance of the slide plate by making the end of the elongated hole to be hung by the second rotating shaft when the slide plate is closed into and opened from the main plate.

A second boss is formed in the slide plate, and a fitting part for limiting a rotation of the link before the slide plate arrives at the position where the slide plate is closed completely into the main plate is formed in the link, thereby controlling the moving distance in the direction of closing the slide plate to be shorter than the moving distance in the direction of opening the slide plate.

The elastic part is composed of a torsion spring which generates an elasticity power in an extending direction; one end of the torsion spring is fixed to a first boss formed in the link between the first shaft hole and the elongated hole, and the other end of the torsion spring is coupled to be rotatable to the second rotating shaft.

The power transformation member comprises a first block forming a second shaft hole which is coupled to be rotatable to a third rotating shaft projecting from the slide plate; at least one shaft part fixed to the first block; and a second block forming a third shaft hole which is coupled to be rotatable to the second boss formed in the slide plate.

The opening and closing device limits a moving distance of the slide plate by fixing a hanging plate to the shaft part, which has passed the penetrating hole, and making the hanging plate to hang in the second block in a closed position and an open position of the slide plate.

The first block is a non-circular form, and a fitting projection for limiting a rotation of the first block before the slide plate arrives at the position where the slide plate is closed completely into the main plate is formed in the slide plate, thereby controlling the moving distance in the direction of closing the slide plate to be shorter than the moving distance in the direction of opening the slide plate.

The elastic part is composed of a compression spring which is coupled to the shaft part and which generates an elasticity power in a direction where the first block and the second block become distant from each other.

According to another embodiment of the present invention, the power transformation member comprises a first block which is coupled to be rotatable to a first spot of the main plate, a second block which is coupled to be rotatable to a second spot of the slide plate; the moving course of the second spot is not consistent with that of the first spot, and a bar member which connects the first block with the second block elastically.

The elastic part is coupled to the bar member and generates an elasticity power in a direction of extending the first and the second blocks.

Based on the point of inflection in the moving course of the slide plate, at a closed position of the slide plate, the second block is positioned in a direction of closing into the first block, so that the elasticity power of the elastic part can affect in a direction of closing the slide plate; while at an open position of the slide plate, the second block is positioned in a direction of opening from the first block, so that the elasticity power of the elastic part can affect in a direction of closing the slide plate.

The second block is installed at the place where the moving distance of the slide plate when being opened can be shorter than the moving distance of the slide plate when being closed.

The bar member comprises a female shaft which is fixed to one side of the first block or the second block, and the length of which is shorter than the beeline between the first block and the second block; and a male shaft which is fixed to the other side of the first block or the second block, and the length of which is shorter than the beeline between the first block and the second block and is slidable in the female shaft during the opening and the closing of the slide plate.

The elastic part is composed of a compression spring.

According to another embodiment of the present invention, the elastic part generates a tension, and the power transformation member is composed of at least two link rows, which connect a first spot of the main plate to a second spot of the slide plate, each of which is composed of at least two links having one or more refraction points, and which receive the tension of the elastic part and generate an elasticity power in a direction of extending the first and the second spots.

The elastic part is composed of a tension spring.

The power transformation member supplies an elasticity power based on the point of inflection on the moving course of the slide plate in a direction of closing the slide plate at a closed position of the slide plate, while it supplies the elasticity power in a direction of opening the slide plate at an open position of the slide plate.

The power transformation member controls the moving distance in the direction of opening the slide plate to be shorter than the moving distance in the direction of closing the slide plate.

According to another embodiment of the present invention, a compensation elastic means is additionally provided, which generates an elasticity power in the same direction as the elastic part as to the direction of moving the slide plate, while generates an elasticity power in a symmetrical direction to the elasticity power of the elastic part as to the perpendicular direction of moving the slide plate, so that the slide plate can receive a uniform force as to the perpendicular direction.

The compensation elastic means comprises a first block which is connected to be rotatable to the first spot of the main plate; a second block which is connected to be rotatable to the second spot of the slide plate; a guide shaft which connects the first block to be elastic to the second block; and an elastic part which is coupled to the guide shaft, and generates an elasticity power in a direction of extending the first and the second blocks.

The second block helps the elasticity power to be applied, based on the point of inflection on the moving course of the slide plate, in a direction of opening the slide plate into the first block at an open position of the slide plate, while it helps the elasticity power to be applied in a direction of closing the slide plate from the first block at a closed position of the slide plate.

The second block is installed at the place where the moving distance of the slide plate when being opened can be shorter than the moving distance of the slide plate when being closed.

The guide shaft comprises a female shaft which is fixed to one side of the first block or the second block, and the length of which is shorter than the beeline between the first block and the second block; and a male shaft which is fixed the to other side of the first block or the second block, and the length of which is shorter than the beeline between the first block and the second block and is slidable in the female shaft during the opening and the closing of the slide plate.

The elastic part is composed of a compression spring.

In order to achieve the second object, the present invention provides a portable terminal having a sliding opening and closing device comprising a main body; a sub body which is connected to be slidable to the main body; a stoppering part for fixing the sub body to either position between the sub body being inputted into the main body and being outputted from the main body; and an elasticity part which supplies an elasticity power in a direction where the sub body is outputted from the main body or inputted into the main body.

A keypad is placed on the main body, and a liquid crystal screen is placed on the sub body.

The main body has an empty space from the side to the inside, and the sub body comes in and out of the space.

The stoppering part comprises a sliding bar in which a hook hanging in a fitting boss installed in the sub body and a first elongated hole in a sliding direction are formed, and one end of which comes in and out from the inside of the main body to the outside thereof; a first pin which is installed in the main body and coupled to the first elongated hole; and a compression spring flipping the sliding bar in a direction where the hook is hung in the fitting boss.

The elastic part comprises a first cross bar, one end of which is supported by the main body, and the other end of which is supported by the sub body; a second cross bar which is positioned to be crossed with the first cross bar, one end of which is supported by the main body, and the other end of which is supported by the sub body; a second pin which is coupled to the centers of the first and the second cross bars, and which makes the first and the second cross bars to be rotated relatively; and a torsion spring which is coupled to the second pin, and which supplies an elasticity power in a direction where the first and the second cross bars push the sub body.

At least two elastic members are installed in series.

The elastic members additionally comprise a first bracket, which is coupled to one end of the first and the second cross bars, and which is fixed to the main body; a second bracket, which is coupled to the other ends of the first and the second cross bars, and which is fixed to the sub body; and a pair of guide rails, which are respectively fixed to both sides in the main body and which form a guide groove to which both ends of the first and the second brackets are coupled to be slidable.

In order to achieve the third object, the present invention provides a portable terminal having a sliding opening and closing device comprising a main body; a main plate which is coupled to the main body; a slide plate which is coupled to be slidable to the main plate; a rotating plate which is coupled to be rotatable to the slide plate; a sub body which is coupled to be fixed to the slide plate; and a display device which is fixed to the rotating plate, and which rotates on the sub body.

A slide shaft is fixed to the slide plate, and a shaft holder is installed in the main plate, which is coupled to be slidable to the slide shaft.

The portable terminal having the sliding opening and closing device comprises a first elastic part which supplies an elasticity power in a direction of closing the slide plate when the slide plate is near to the closed position of the slide plate based on a certain spot on the moving course of the slide plate, while it supplies an elasticity power in a direction of opening the slide plate when the slide plate is near to the open position of the slide plate based on a certain spot on the moving course of the slide plate.

The point of inflection in a direction of supplying force of the first elastic part is positioned within ½ of the total movement distance of the main plate from the closed spot thereof.

The first elastic part is composed of a torsion spring, the main plate supports one end of which, and the slide plate supports the other end of which.

The first elastic part is composed of a torsion spring, one end of which is supported by the main plate and the other end of which is supported by the rotating plate, so that it can supply an elasticity power to the rotating plate to maintain the initial condition when the rotating plate is not rotating, while it can supply an elasticity power to the rotating plate to continue to rotate when the rotating plate is rotating.

The winding part of the first elastic part is wound a plurality of times, so that its radius can become widened around a concentric circle.

The portable terminal having the sliding opening and closing device additionally comprises a second elastic part which supplies an elasticity power to the rotating plate to maintain the initial condition when the rotating plate is not rotating, while it can supply an elasticity power to the rotating plate to continue to rotate when the rotating plate is rotating.

The second elastic part is composed of a torsion spring, the slide plate supports one end of which and the rotating plate supports the other end of which.

The winding part of the second elastic part is wound a plurality of times, so that its radius can become widened around a concentric circle.

The rotating plate rotates around a center axis which passes a penetrating hole formed in the center of the rotating plate, and which is coupled to the slide plate.

A table part for holding the bottom of the center of the rotating plate is formed on the slide plate.

The portable terminal having the sliding opening and closing device additionally comprises a rotation limiting means for limiting the rotation angle of the rotating plate.

The rotation limiting means is composed of a rotation-limiting boss which is formed at one side of the slide plate or the rotating plate, and which is inserted into the trajectory groove formed at the other side thereof. The rotation-limiting boss contacts both ends of the trajectory groove and controls the rotating plate not to rotate any more when it is rotating or is not rotating.

BRIEF DESCRIPTION OF THE DRAWINGS

The above object and advantages of the present invention will become more apparent by describing preferred embodiments thereof in detail with reference to the attached drawings, in which.

DETAILED DESCRIPTION OF THE PREFERRED EMBODIMENTS

The sliding opening and closing device according to the preferred embodiments of the present invention will now be further described with reference to the figures.

Figure 1:
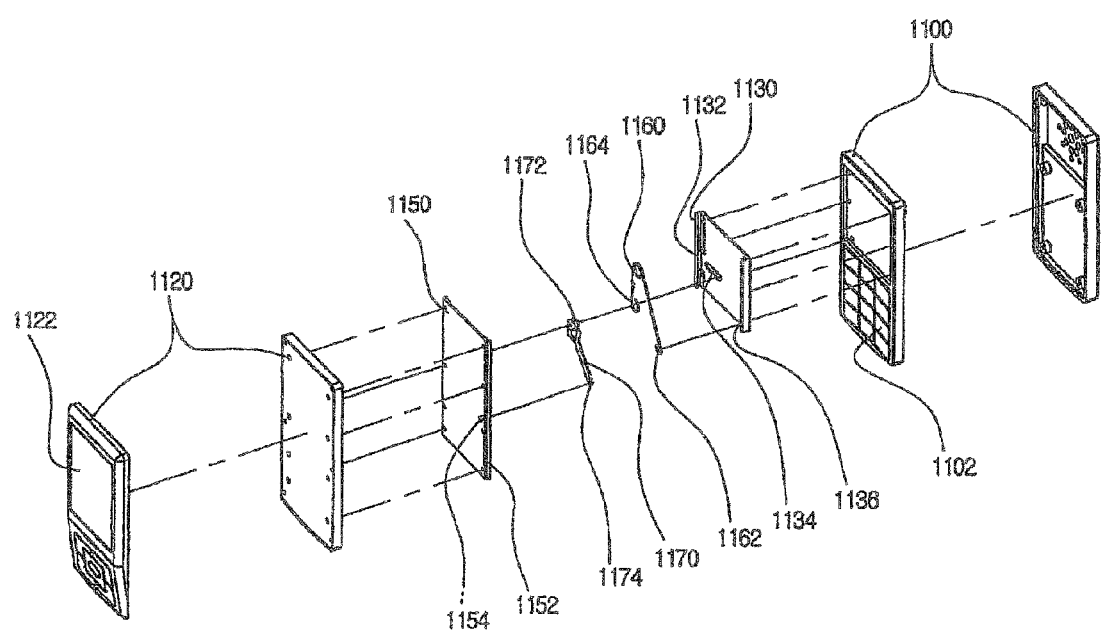
FIG. 1 is a cross-sectional view of a portable terminal having the sliding opening and closing device according to a first embodiment of the present invention.

FIG. 1 is a cross-sectional view of the sliding opening and closing device according to the first embodiment of the present invention and the portable terminal having thereof;

A keypad (1102) is placed on a main body (1100) composing a portable terminal, and a main board executing various functions is installed in the main body (1100). A liquid crystal screen (1122) is placed on a sub body (1120), which is electrically connected to the main body (1100) through a flexible PCB.

A main plate (1130) is coupled to the main body (1100), and a slide plate (1150) is coupled to the sub body (1120) and connected to be slidable in one direction to the main plate (1130).

A guide slit (1152) is formed in the slide plate (1150), and a guide rib (1132) is formed in the main plate (1130), which guides the guide slit (1152) to be slidable along a designated path.

An elastic part is supported by the main plate (1130), and generates an elasticity power in one direction. The elastic part is composed of a torsion spring (1160), of which one end is fixed to the main plate (1130) and the other end is free, which generates an elasticity power attracted toward the fixed end.

In order to be equipped with the torsion spring (1160), a first boss (1136) is formed in the main plate, a first ring part (1162) is formed at the fixed end of the torsion spring (1160), which is coupled to the first boss (1136), and a second ring part (1164) is formed at the free end.

A power transformation member is coupled to the slide plate (1150) and to the elastic member, and receives the elasticity power of the elastic part to supply the elasticity power in the direction of closing the slide plate (1150) in the closed position of the slide plate (1150) based on a designated spot on the moving path of the slide plate (1150), also to supply the elasticity power in the direction of opening the slide plate (1150) in the open position of the slide plate (1150) based on the same.

The power transformation member is composed of a rotating arm (1170), of which one end is connected to the elastic part and guided onto the main plate (1130) so that it can flow only in a perpendicular direction to the moving direction of the slide plate (1150), and the other end is connected to the slide plate (1150) to be rotatable.

Then, a guide pin (1172), which is coupled to be rotatable to the second ring part (1164), is provided at one end of the rotating arm (1170). Also, at the other end of the rotating arm (1170), a rotating hole (1174) is provided. A second boss (1154), which is coupled to be rotatable to the rotating hole (1174), is provided on the slide plate (1150).

A guide member guides a connecting part between the elastic part and the power transformation member to move in a direction of being applied with an elasticity power of the elastic member, and generates a damping force against the power transformation member not to move the slide plate (1150) any more in the direction of closing the slide plate into the main plate when the sub body (1120) is closed into the main body (1100), and not to move the slide plate (1150) any more in the direction of opening the sub body (1120) from the main body (1100) when the slide plate (1150) is opened from the main plate.

The guide member is composed of an elongated hole (1134), which guides the guide pin (1172) to move the connecting part between the elastic part and the power transformation member only in a direction where the torsion spring (1160) applies an elastic force. The elongated hole (1134) is formed lengthwise to be perpendicular to the direction of the moving of the slide plate (1150).

In the portable terminal of this embodiment, the slide plate (1150) is coupled to the main plate (1130), so that separation of the rotating arm (1170) and the torsion spring (1160) installed therein can be prevented.

Due to the above constitution, when the sub body (1120) is opened from the main body (1100) or closed into the main body (1100), the guide pin (1172) at the rotating arm (1170) is hung in the elongated hole (1134) to prevent excessive movement of the slide plate (1150) and stop the sub body (1120). Also, the torsion spring (1160) supplies the elasticity power in a direction of continuously moving the rotating arm (1170) when the sub body (1120) is stopped, so that the sub body (1120) can maintain a closed position or an open position.

Thus, although the rotating arm (1170) stops the slide plate (1150) when the slide plate (1150) is closed and opened, it is still necessary to additionally provide a stopper constitution to prevent excessive movement of the slide plate (1150) to the main plate (1130) and the slide plate (1150).

The portable terminal has the function: when the sub body (1120) is opened from the main board at the main body (1100), the liquid crystal screen (1122) turns on; and when the sub body (1120) is closed into the main body (1100), the liquid crystal screen (1122) turns off.

The operation of this embodiment will be explained below.

FIGS. 2-7 are cross-sectional views of the operation of the portable terminal shown in FIG. 1.

Figure 2:
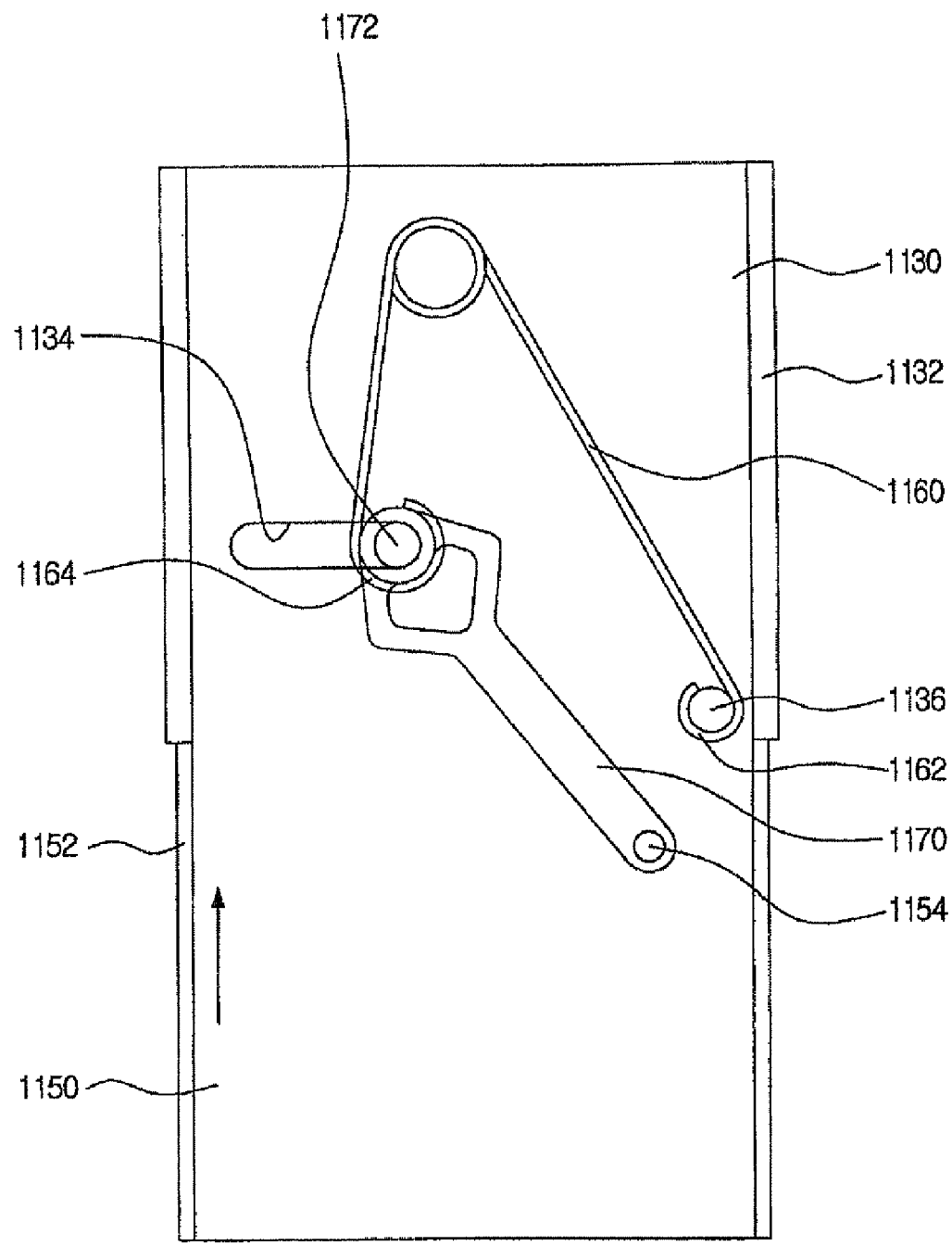
FIGS. 2-7 are cross-sectional views of the operation of a portable terminal according to the first embodiment of the present invention.
Figure 5:
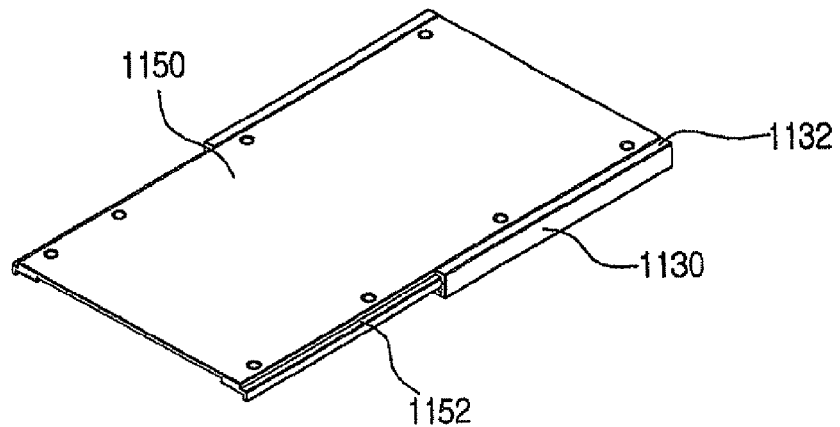
Figure 5:
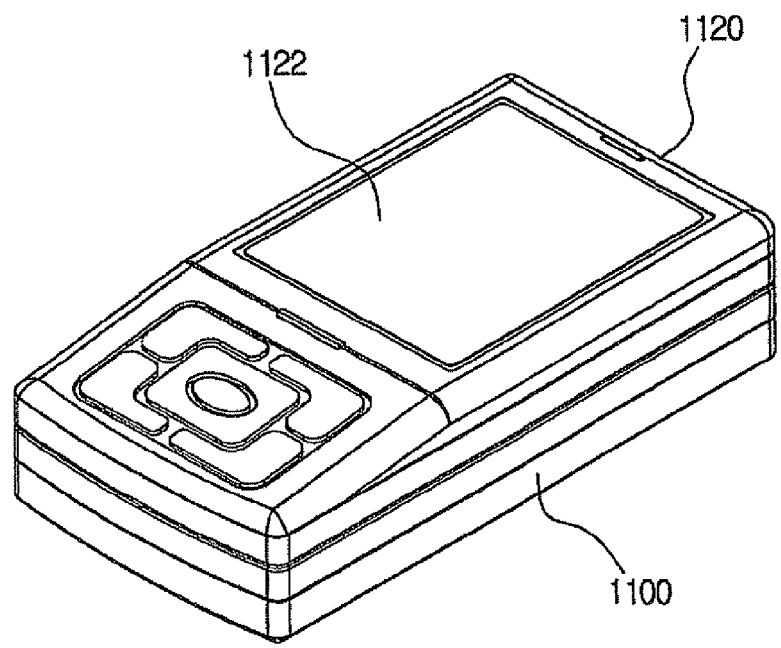

First, as to FIGS. 2 and 5, when the portable terminal is closed, the sub body (1120) equipped with the liquid crystal screen (1122) becomes put upon the main body (1100) and closed into thereof. At this time, the slide plate (1150) coupled to the sub body (1120) maintains the closed position by the pushing force of the rotating arm (1170) while receiving the elasticity power of the torsion spring (1160).

In order to open the terminal under this condition, if the sub body (1120) is pushed by hand, the sub body (1120) slides along with the slide plate (1150). At this time, the guide rib (1132) placed at the main body (1100) guides the guide slit of the slide plate (1150), so that the slide plate (1150) can conduct the straight-line motion smoothly.

Figure 3:
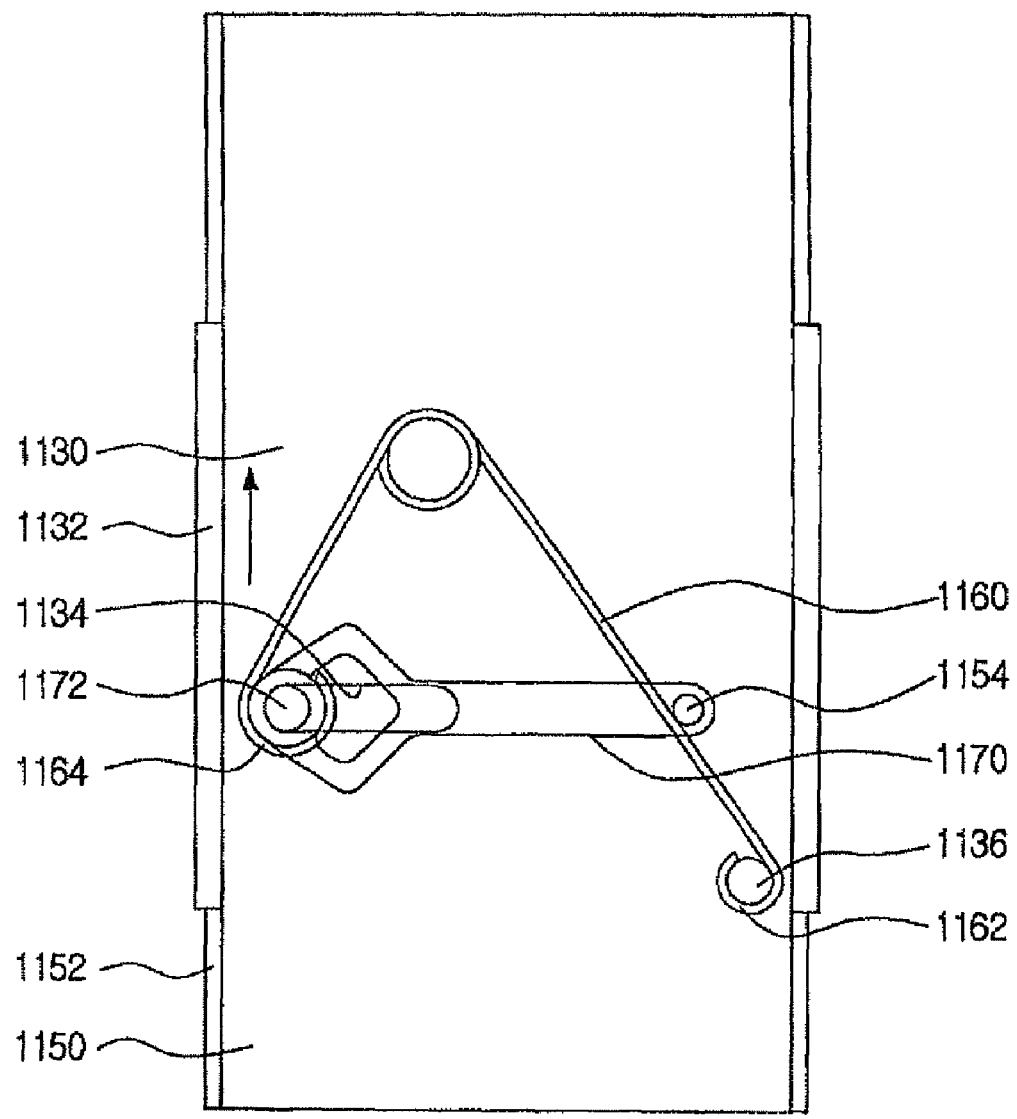
Figure 6:
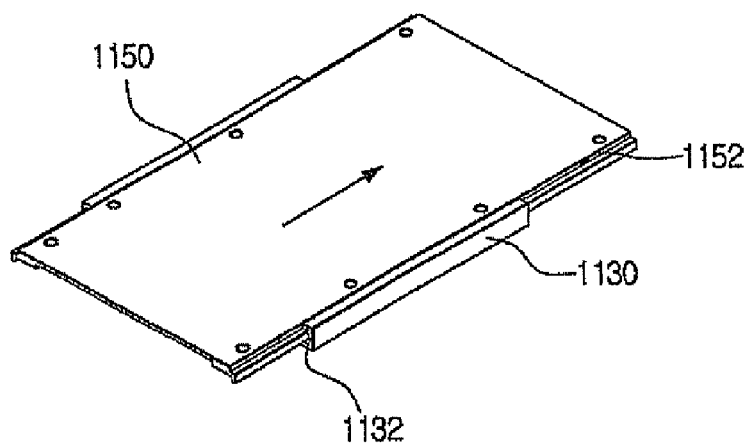
Figure 6:
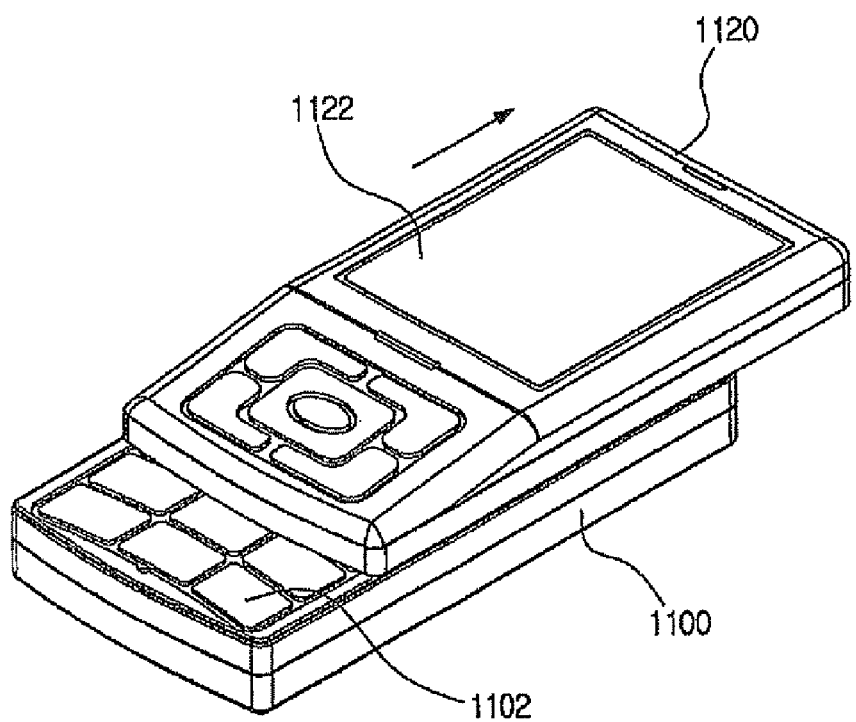

As to FIGS. 3 and 6, as the slide plate (1150) begins to be opened, it pushes one end of the rotating arm (1170), and the rotating arm (1170) pushes the second ring part (1164) of the torsion spring (1160) and extends it. Thereafter, the elongated hole (1134) formed at the main plate (1130) guides the guide pin (1172) of the rotating arm (1170) to move perpendicular to the direction of the moving of the slide plate (1150).

At first, the sub body (1120) should be pushed by force, but if the rotating arm (1170) passes the apex, it pushes again the slide plate (1150) in a direction of opening it by the elasticity power of the torsion spring (1160). From this moment, the slide plate (1150) automatically moves until it becomes into an open position without force.

Figure 4:
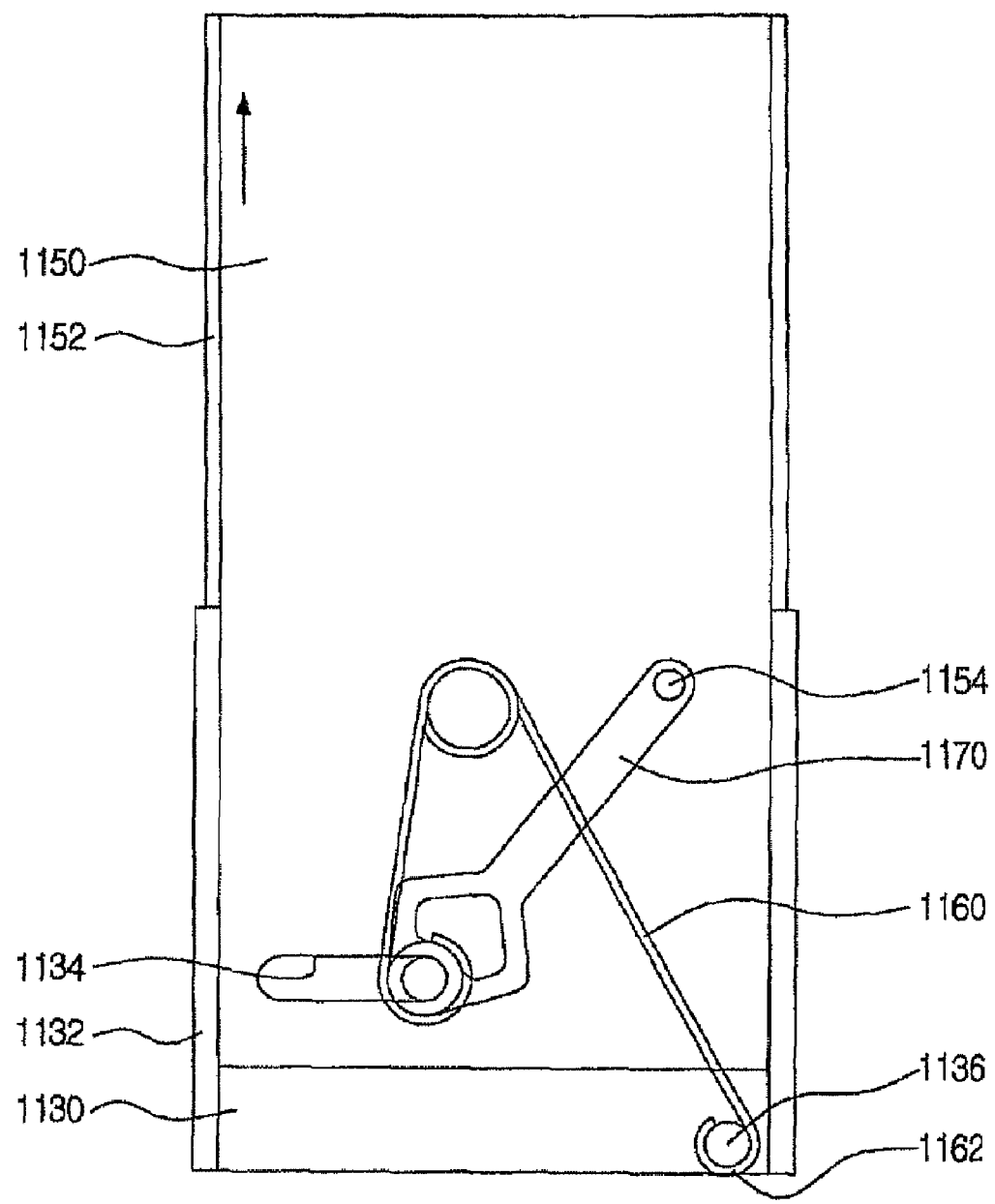
Figure 7:
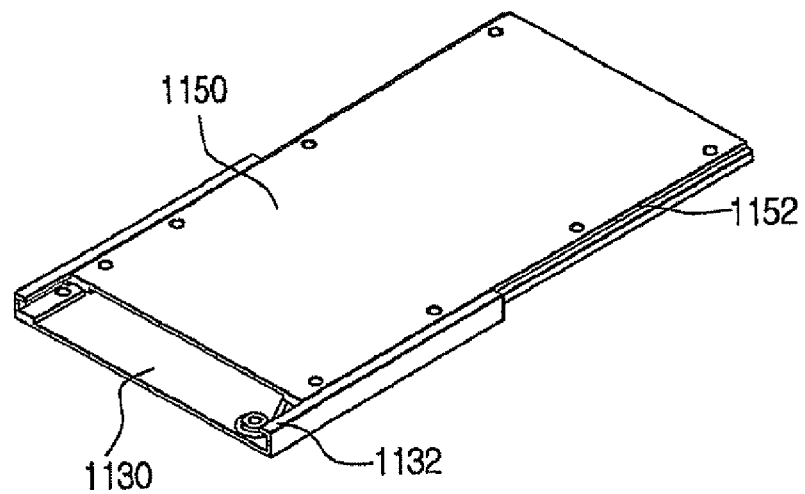
Figure 7:
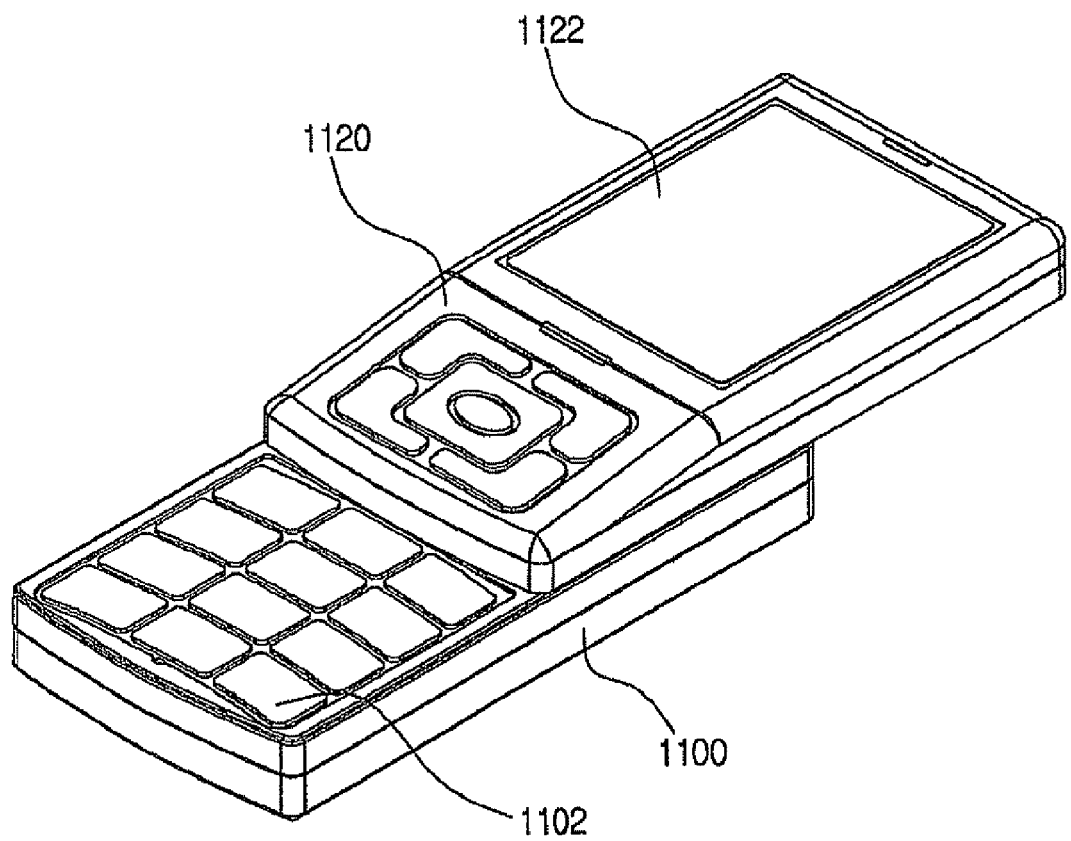

If the sub body (1120) is completely opened as shown in FIGS. 4 and 7, the rotating arm (1170) pulls back the slide plate (1150). Then, the slide plate (1150) stops and maintains the open position by the pushing force of the rotating arm (1170), which received the elasticity power of the torsion spring (1160).

If the sub body (1120) is opened, the liquid crystal screen (1122) turns on. Then, a user can use the essential function of a terminal.

Meanwhile, in order to close the terminal when the sub body (1120) is opened, the user should scrouge the sub body (1120) in a direction contrary to the above by hand. The closing movement of the sub body (1120) is conducted in reverse order to the above opening movement.

The sliding opening and closing device and the portable terminal having thereof according to the second embodiment of the present invention will be further described with reference to the drawings as below.

The constitutions of the elastic part and the power transformation member in the portable terminal according to the second embodiment are different from those according to the first embodiment.

Figure 8:
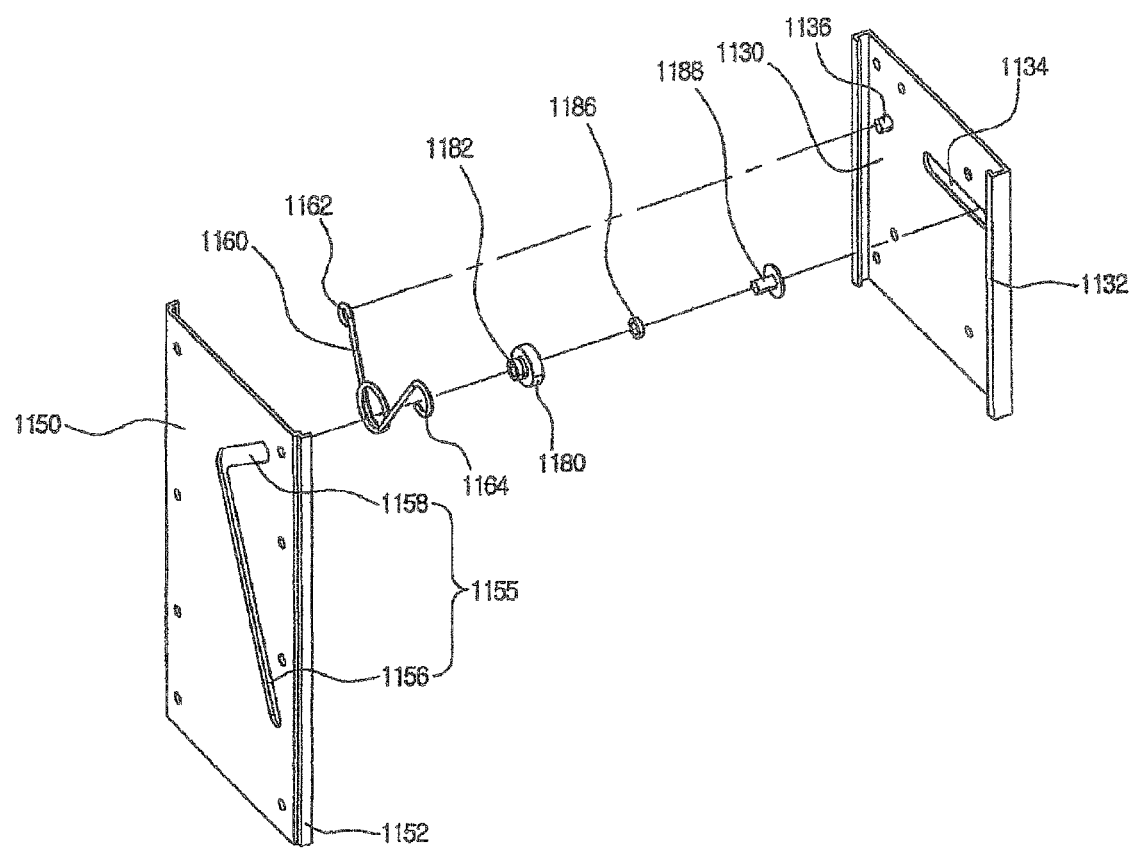
FIG. 8 is an exploded cross-sectional view of a portable terminal having the sliding opening and closing device according to a second embodiment of the present invention.

FIG. 8 is an exploded cross-sectional view of a portable terminal according to the second embodiment of the present invention.

First, a torsion spring (1160), which is an elastic member, is placed in a position of applying an elasticity power in a direction of being widened. A first ring part (1162) formed at one end of the torsion spring (1160) is coupled to a first boss formed at the main plate (1130), a power transformation member is coupled to a second ring part (1164) formed at the other end of the torsion spring (1160).

Then, the power transformation member comprises a moving block which is fixed to the elastic part to receive the elastic force; a cam groove (1155) formed at the slide plate (1150) and includes a first cant (1156) supplying a force in the direction of opening the slide plate (1150) after receiving the elasticity power of the moving block and a second cant (1158) supplying a force in a direction of closing the slide plate (1150). Thus, the first cant (1156) is connected to the second cant (1158) forming a cant angle in a symmetric direction.

The moving block comprises a cam shaft being coupled to the elastic part and having a boss part (1182) coupled to be slidable to the cam groove (1155); a bushing (1186) being coupled to be slidable to an elongated hole (1134) which is formed at the main plate (1130) in a direction of supplying an elasticity power of the elastic member; and a screw (1188) which penetrates into the bushing (1186) and coupled to the cam shaft (1180).

The operation of the second embodiment will be described below.

Figure 9:
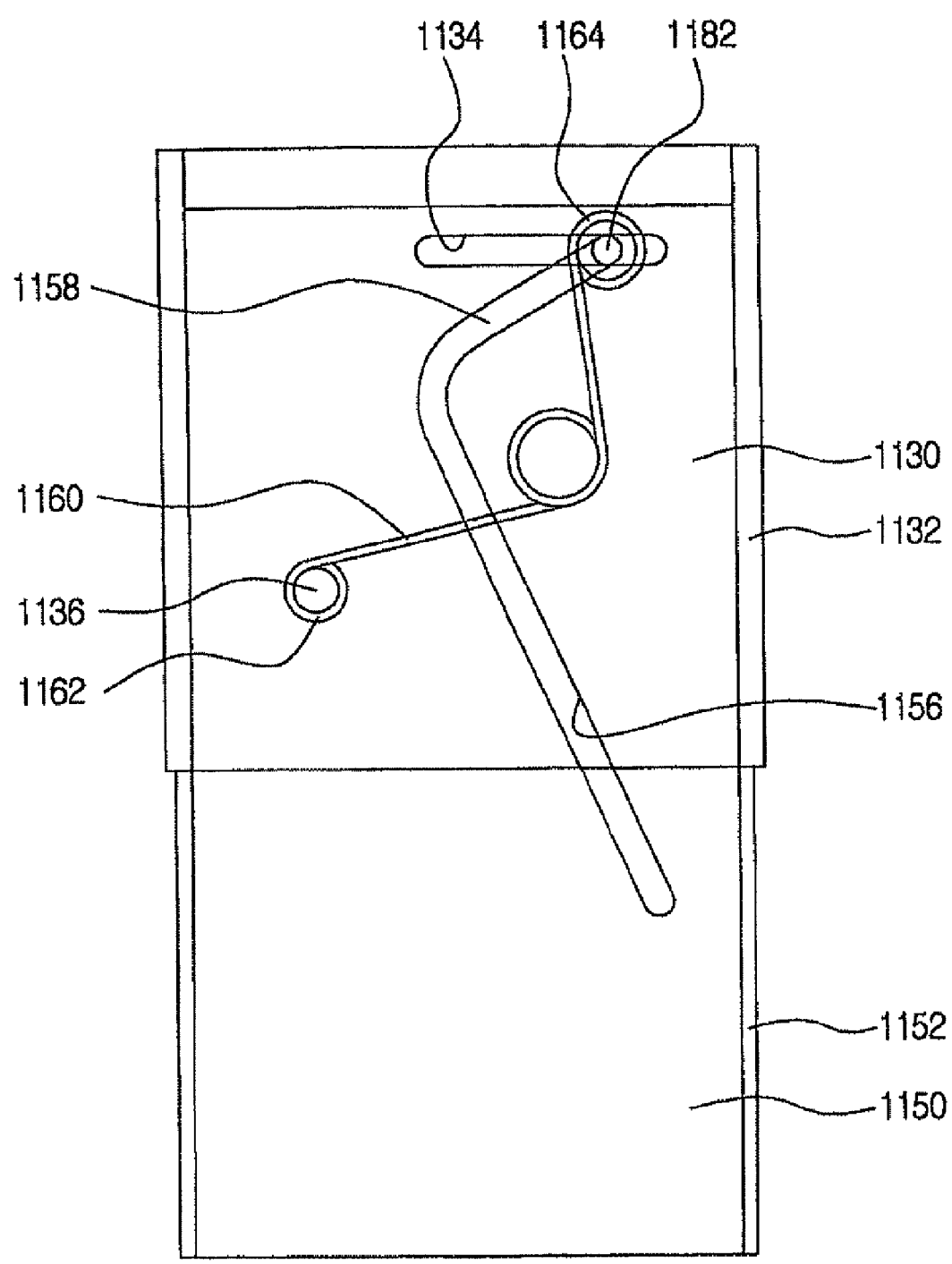
FIGS. 9-11 are cross-sectional views of the operation of a portable terminal according to the second embodiment of the present invention.
Figure 10:
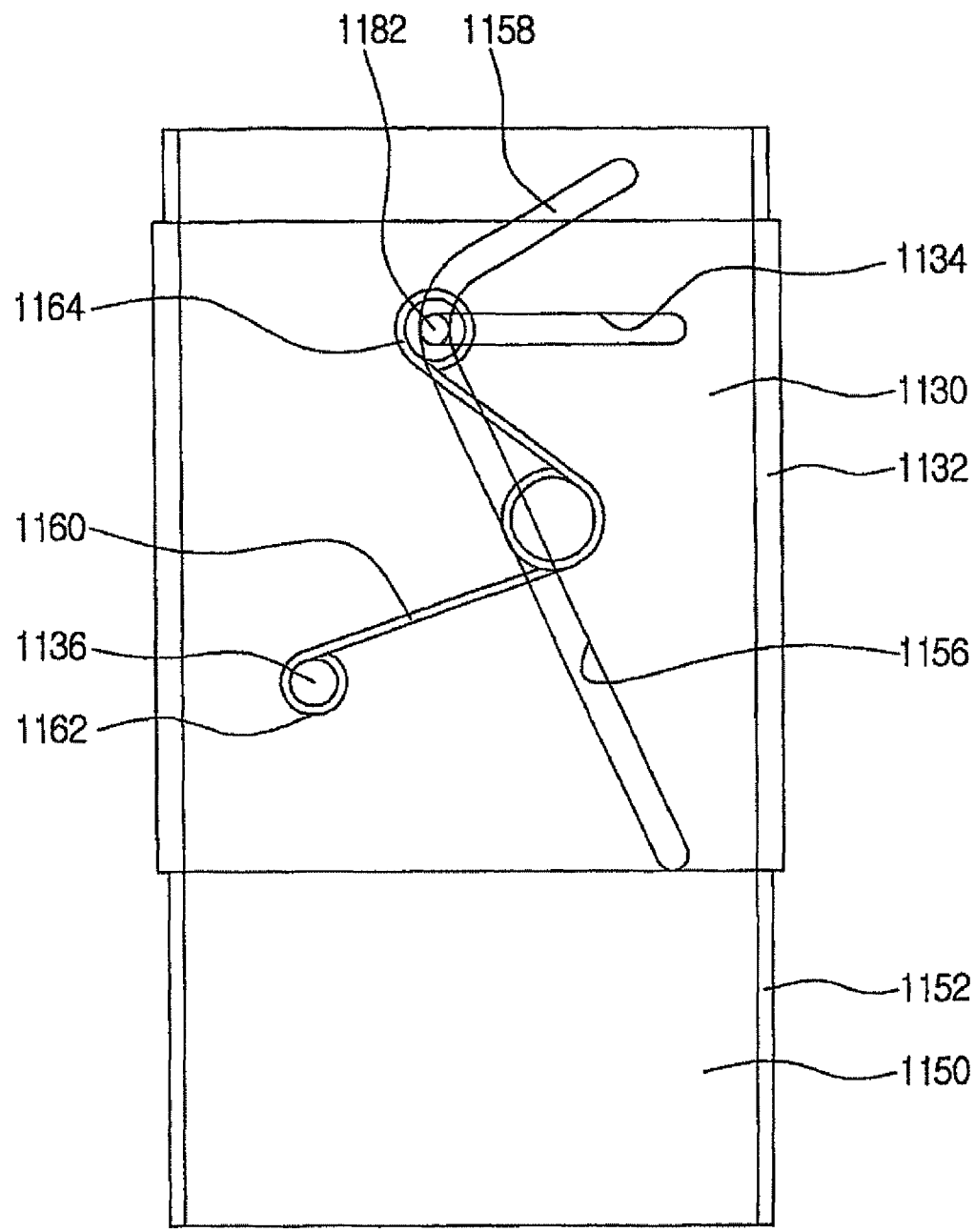
Figure 11:
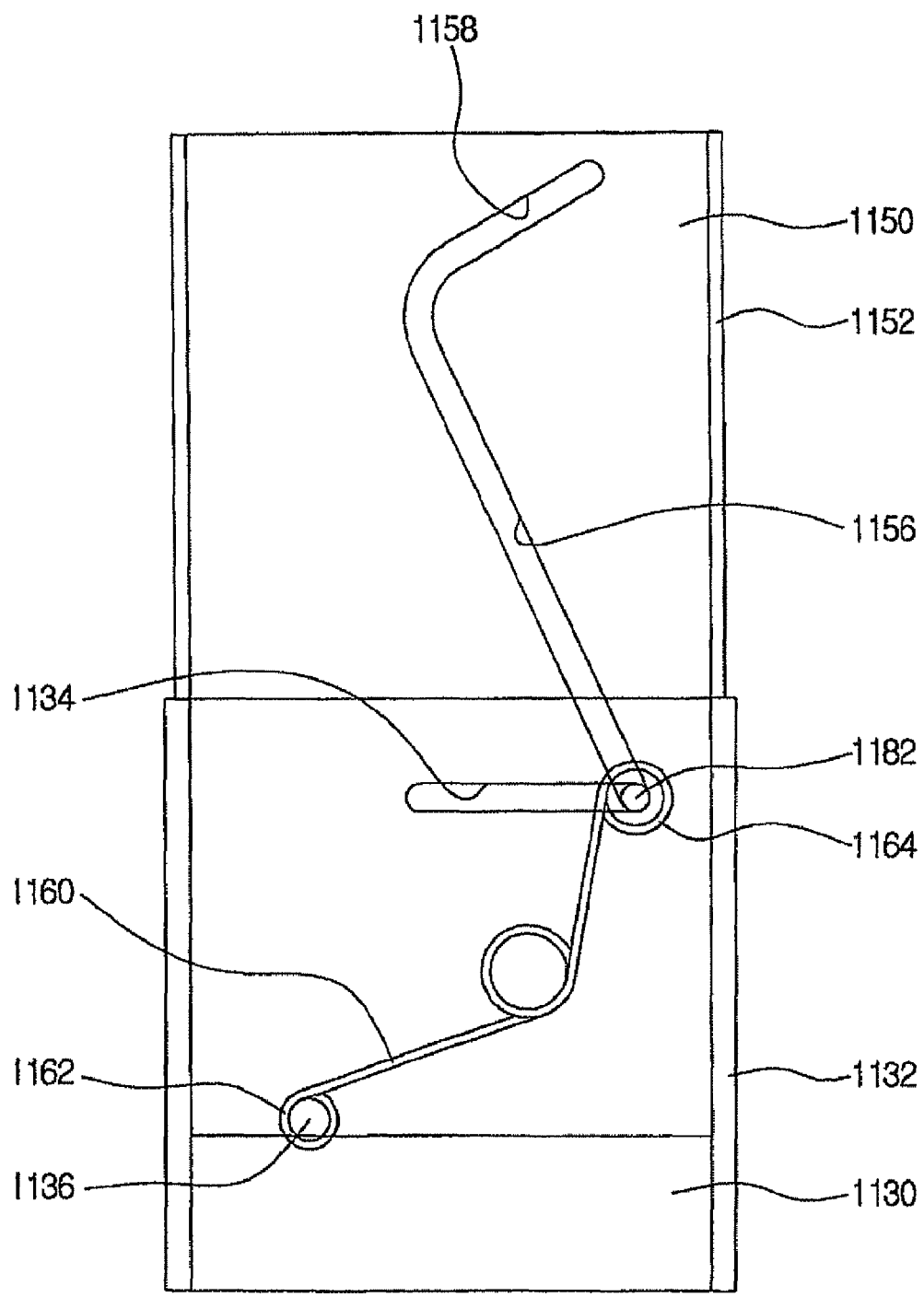

FIGS. 9-11 are cross-sectional views of the operation of the portable terminal shown in FIG. 8.

First, when the terminal is closed as shown in FIG. 9, the sub body (1120) equipped with the liquid crystal screen (1122) gets superposed and closed into the main body (1100). At this time, the slide plate (1150) coupled to the sub body (1120) maintains a closed position by the pressure that the boss part (1182) of the cam shaft (1180), which receives the elasticity power of the torsion spring (1160), presses the second cant (1158) of the cam groove (1155).

In order to open the terminal under such condition, if the sub body (1120) is pushed by hand, the sub body (1120) slides along with the slide plate (1150). At this time, the guide rib (1132) formed at the main body (1100) guides the guide slit (1152) of the slide plate (1150) and helps the slide plate (1150) to conduct the straight-line motion smoothly.

If the slide plate (1150) begins to be opened as shown in FIG. 10, the second cant (1158) of the slide plate (1150) pushes the boss part (1182) of the cam shaft (1180) to make the second ring part (1164) of the torsion spring (1160) narrowed and tensed. Then, the elongated hole (1134) formed at the main plate (1130) guides the bushing (1186), which moves together with the cam shaft (1180), to move in a direction perpendicular to the movement of the slide plate (1150).

At first, the sub body (1120) should be pushed by force, but if the cam shaft (1180) passes the second cant (1158) and is inputted into the first cant (1156), it pushes again the slide plate (1150) in a direction of opening it by the elasticity power of the torsion spring (1160). Thus, from this moment, the slide plate (1150) automatically moves until it becomes into an open position without force.

If the sub body (1120) is completely opened as shown in FIG. 11, the cam shaft (1180) is hung in the end of the first cant (1156) and pulls the slide plate (1150). Then, the slide plate (1150) stops and maintains the open position by the pushing force of the cam shaft (1180), which receives the elasticity power of the torsion spring (1160), that pushes the first cant (1156).

If the sub body (1120) is opened, the liquid crystal screen (1122) turns on. Then, a user can use the essential function of a terminal.

Meanwhile, in order to close the terminal when the sub body (1120) is opened, the user should scrouge the sub body (1120) in a direction contrary to the above by hand. The closing movement of the sub body (1120) is conducted in reverse order to the above opening movement.

The sliding opening and closing device and the portable terminal having thereof according to the third embodiment of the present invention will be further described with reference to the drawings below.

Figure 12:
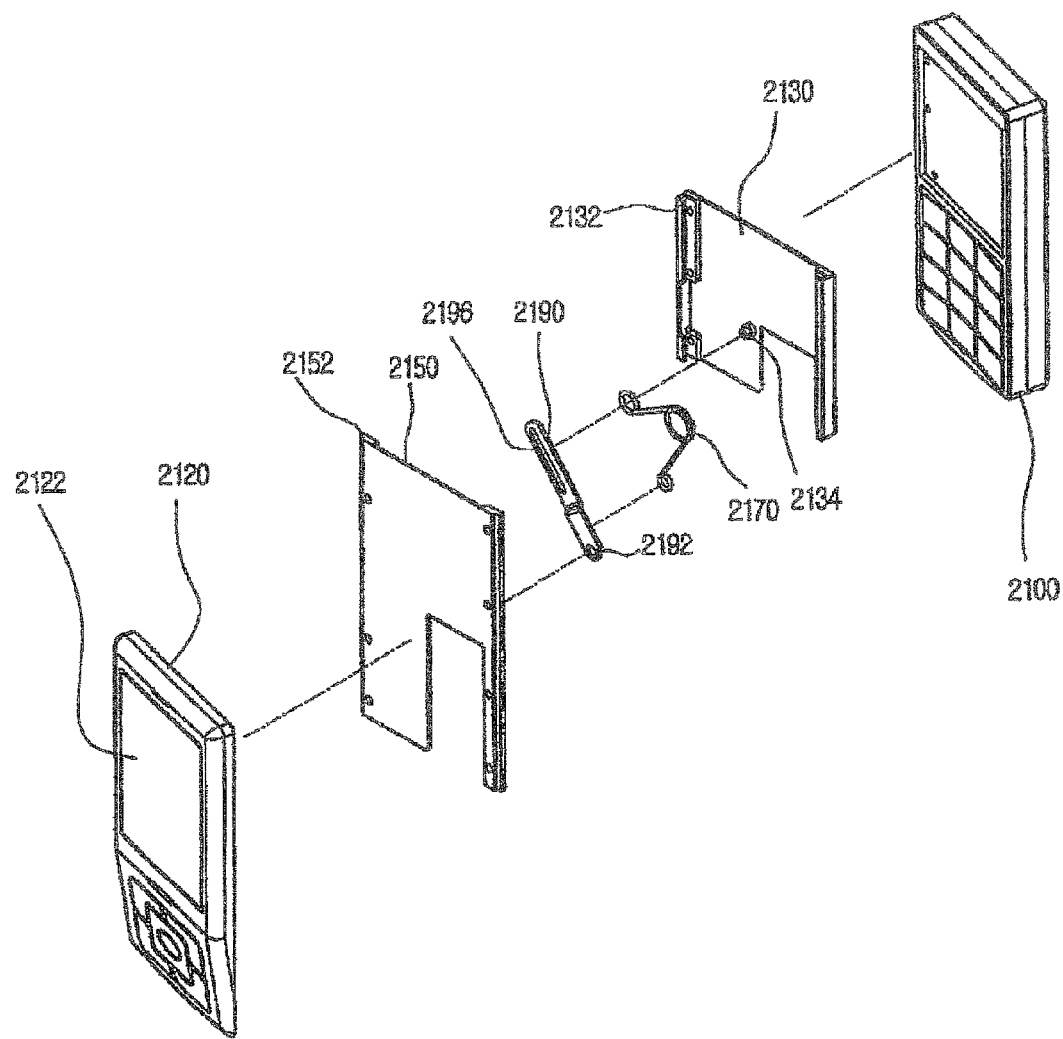
FIG. 12 is an exploded cross-sectional view of a portable terminal having the sliding opening and closing device according to a third embodiment of the present invention.

FIG. 12 is an exploded cross-sectional view of a portable terminal having the sliding opening and closing device according to the third embodiment of the present invention.

Figure 13:
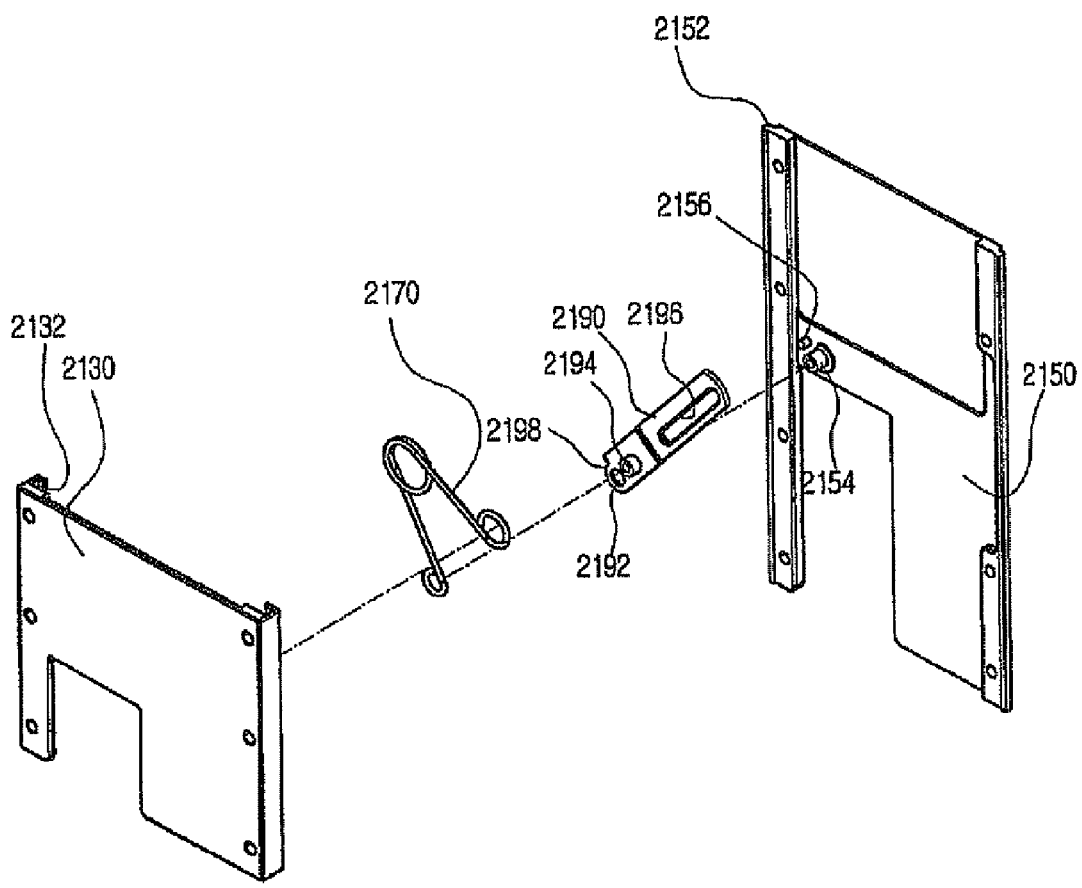
FIG. 13 is an exploded cross-sectional view of the sliding opening and closing device from a different angle from that shown in FIG. 12.

FIG. 13 is an exploded cross-sectional view of the sliding opening and closing device different from the angle shown in FIG. 12;

A keypad is placed on a first body (2100) composing a portable terminal, and a main board executing various functions is installed in the main body (2100). Also, a liquid crystal screen (2122) is placed on a second body (2120), which is electrically connected to the first body (2100) through a flexible PCB.

A main plate (2130) is coupled to the main body (2100), and a slide plate (2150) is coupled to the second body (2120) and connected to be slidable in one direction to the main plate (2130).

For this purpose, a guide slit (2152) is formed at the slide plate (2150), and a guide rib (2132) is formed at the main plate (2130), which guides the guide slit (2152) to be slidable along a designated path.

The power transformation member is composed of a link (2190), wherein a first end is coupled to be pivotable to the slide plate (2150), and a second end is coupled to the main plate (2130) to enable the straight-line movement at a predetermined distance and pivot.

The link (2190) comprises a first shaft hole (2192) at a first end thereof, which is coupled to be rotatable to a first rotating shaft (2154) projecting from the slide plate (2150); and an elongated hole (2196) at a second end thereof, which provides space in which a second rotating shaft (2134) projecting from the main plate (2130) can move.

The elongated hole (2196) formed at the link (2190) enables the first end of the link (2190) to be near or to be far from the second rotating shaft (2134).

The opening and closing device according to this embodiment limits the moving distance of the slide plate (2150) by making the end of the elongated hole (2196) to be hung by the second rotating shaft (2134) when the slide plate (2150) is closed into and opened from the main plate (2130).

Also, this embodiment additionally forms a second boss (2156) at the slide plate (2150), and a fitting part (2198) at the link (2190) for limiting a rotation of the link (2190) by making the link (2190) to be hung in the second boss (2156) before the slide plate (2150) arrives at the position where the slide plate (2150) is closed completely into the main plate (2130), thereby controlling the moving distance in the direction of closing the slide plate (2150) to be shorter than the moving distance in the direction of opening the slide plate (2150).

By making the pushing width of opening the second body (2120) to be smaller than that of closing it, the opening operation of the second body (2120) can be facilitated.

The elastic part is a torsion spring (2170), in which one end thereof is fixed to the first boss (2194) formed at the link (2190) between the first shaft hole (2192) and the elongated hole (2196), and the other end is coupled to be rotatable to the second rotating shaft (2134) and generates the elasticity power in a direction of being widened.

By fixing one end of the torsion spring (2170) to a first boss (2194) at the link (2190) without fixing it to the first rotating shaft (2154), the degree of transformation of the torsion spring (2170) can be diminished compared to the moving distance of the slide plate (2150). Due to this constitution, the elasticity power of the torsion spring (2170) can be less aged by accumulated fatigue due to repeated action.

The operation of the third embodiment will be described below.

Figure 14:
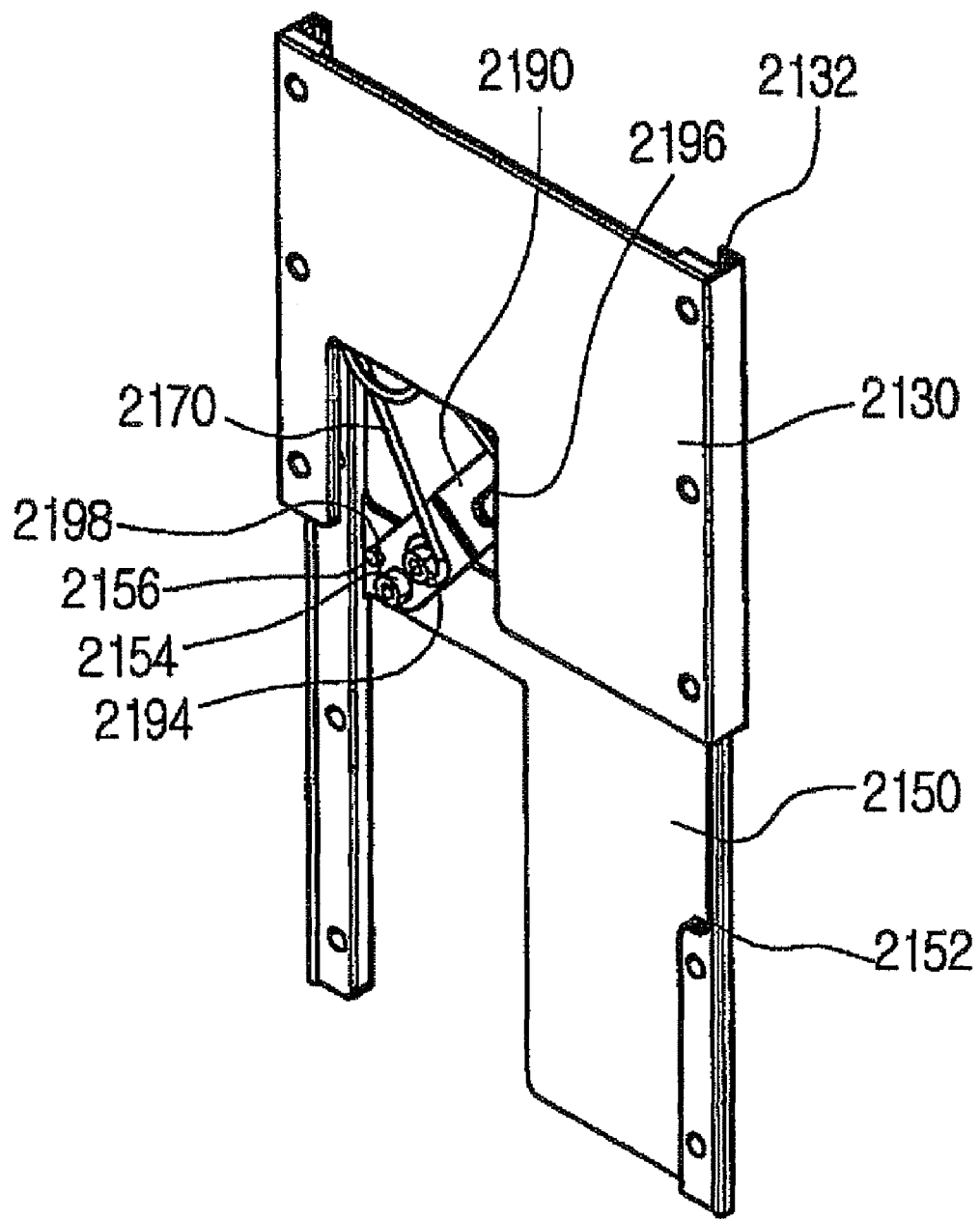
FIG. 14 is a cross-sectional view showing a closed position of the opening and closing device shown in FIG. 13.
Figure 15:
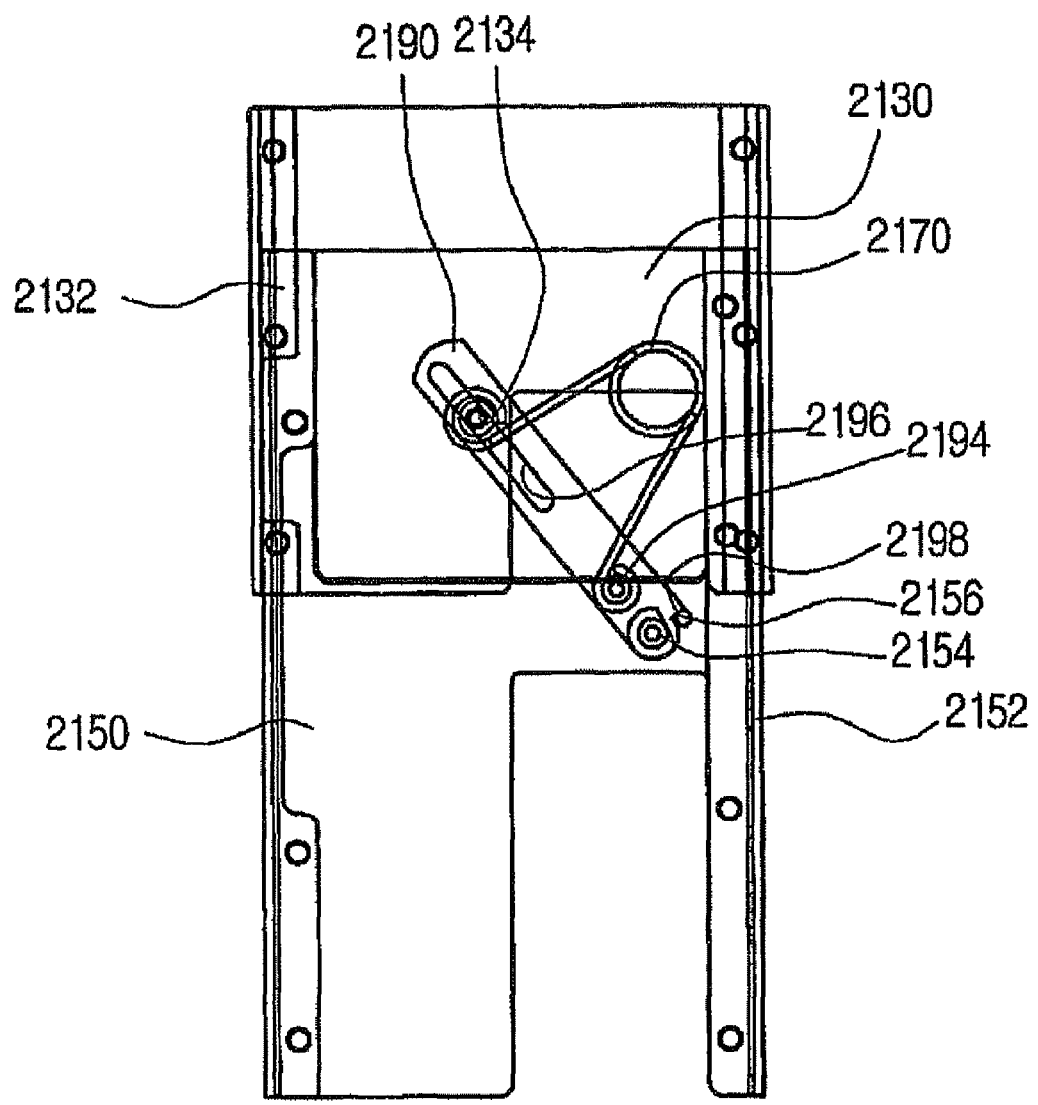
FIG. 15 is a transverse cross-sectional view of the sliding opening and closing device shown in FIG. 14.

First, FIG. 14 is a cross-sectional view showing a closed position of the opening and closing device shown in FIG. 13; and FIG. 15 is a transverse cross-sectional view of FIG. 14.

When the terminal is in the closed position, the second body (2120) equipped with the liquid crystal screen (2122) gets superposed and closed into the first body (2100). At this time, the slide plate (2150) coupled to the second body (2120) maintains the closed position by the pushing force of the link (2190), which receives the elasticity power of the torsion spring (2170).

In order to open the terminal under this condition, if the second body (2120) is pushed by hand, the second body (2120) slides along with the slide plate (2150). At this time, the guide rib (2132) formed at the first body (2100) guides the guide slit (2152) of the slide plate (2150), so that the slide plate (2150) can conduct the straight-line motion smoothly.

As the slide plate (2150) begins to be opened, it pushes one end of the link (2190). Then, the link (2190) rotates around the second rotating shaft (2134), while compressing the torsion spring (2170). Also, the elongated hole (2196) formed at the link (2190) helps the link (2190) to move perpendicular to the moving direction of the slide plate (2150), so that the link (2190) can pass the direction where the radius of rotation becomes narrowed.

At first, the second body (2120) should be pushed by force, but if the link (2190) passes the spot being parallel with the second rotating shaft (2134), it pushes again the slide plate (2150) in a direction of opening it by the elasticity power of the torsion spring (2170). Thus, from this moment, the slide plate (2150) automatically moves until it becomes an open position without force.

Figure 16:
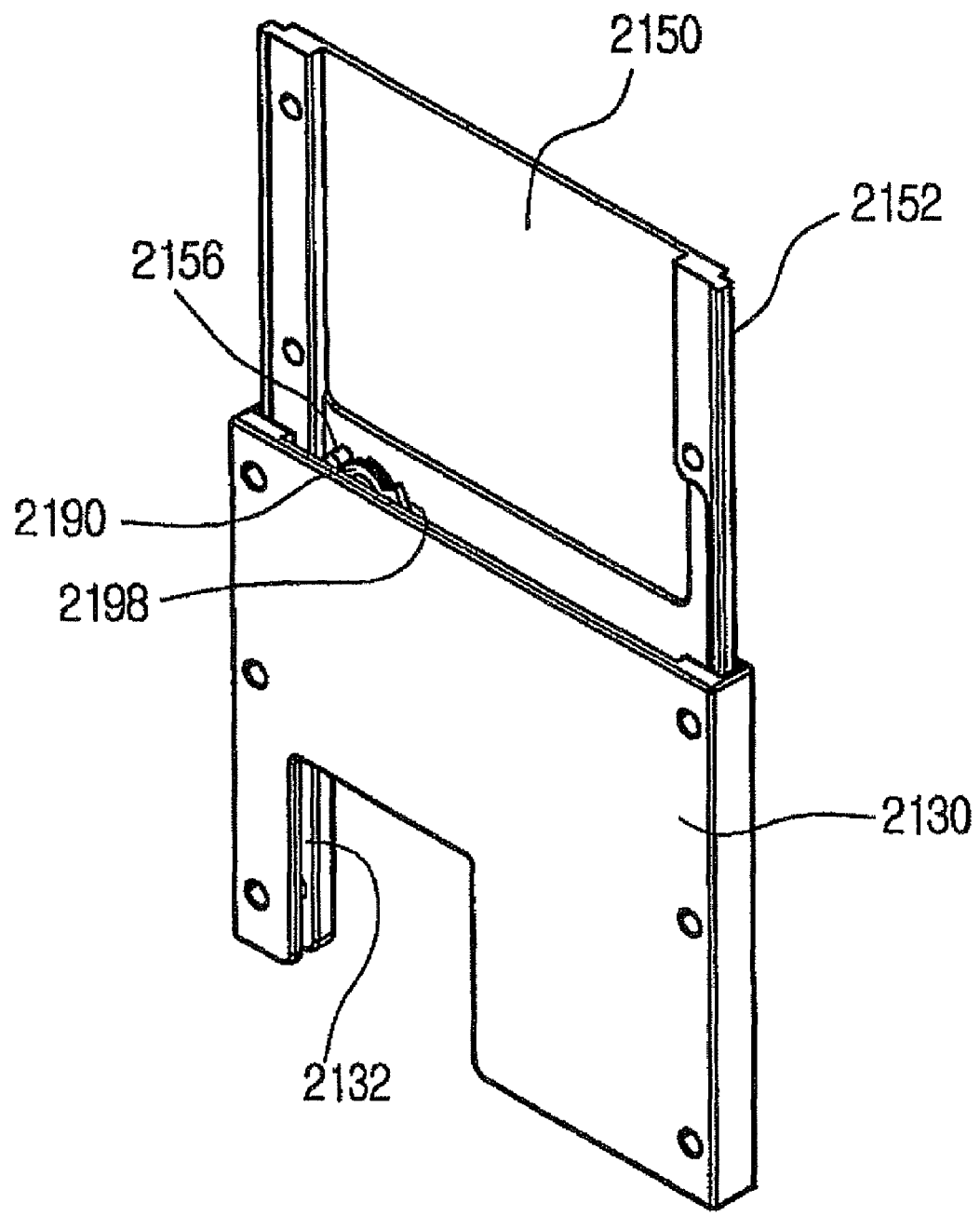
FIG. 16 is a cross-sectional view showing an open position of the opening and closing device shown in FIG. 14.
Figure 17:
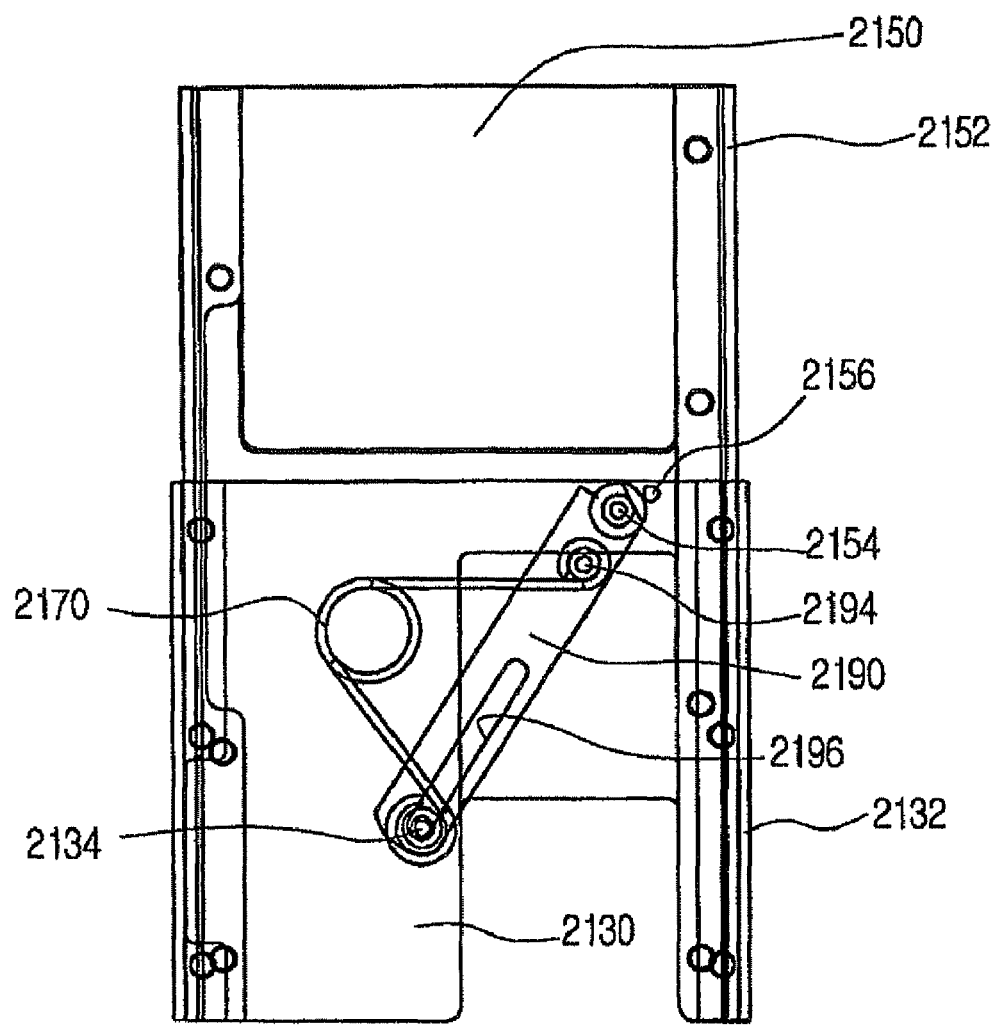
FIG. 17 is a transverse cross-sectional view of the sliding opening and closing device shown in FIG. 16.

FIG. 16 is a cross-sectional view showing an open position of the slide plate shown in FIG. 14; and FIG. 17 is a transverse cross-sectional view of FIG. 16.

If the second body (2120) is completely opened, the end of the elongated hole (2196) formed at the link (2190) is hung in the second rotating shaft (2134), and the slide plate (2150) stops. At the same time, the slide plate (2150) maintains the open position by the pushing force of the link (2190), which receives the elasticity power of the torsion spring (2170).

If the second body (2120) is opened, the liquid crystal screen (2122) turns on. Then, a user can use the essential function of the terminal.

Meanwhile, in order to close the terminal when the second body (2120) is opened, the second body (2120) should be scrouged in a direction contrary to the above by hand. The closing movement of the second body (2120) is conducted in reverse order to the above opening movement.

Then, the second body (2120) reaches the closed position; the fitting part (2198) of the link (2190) is hung by the second boss (2156) and limits the rotation of the link (2190), which results in the stop of the slide plate (2150) and the second body (2120).

At this time, the slide plate (2150) still maintains the closed position by the pushing force of the link (2190), which receives the elasticity power of the torsion spring (2170).

The sliding opening and closing device and the portable terminal having thereof according to the fourth embodiment of the present invention will be further described with reference to the drawings below.

Figure 18:
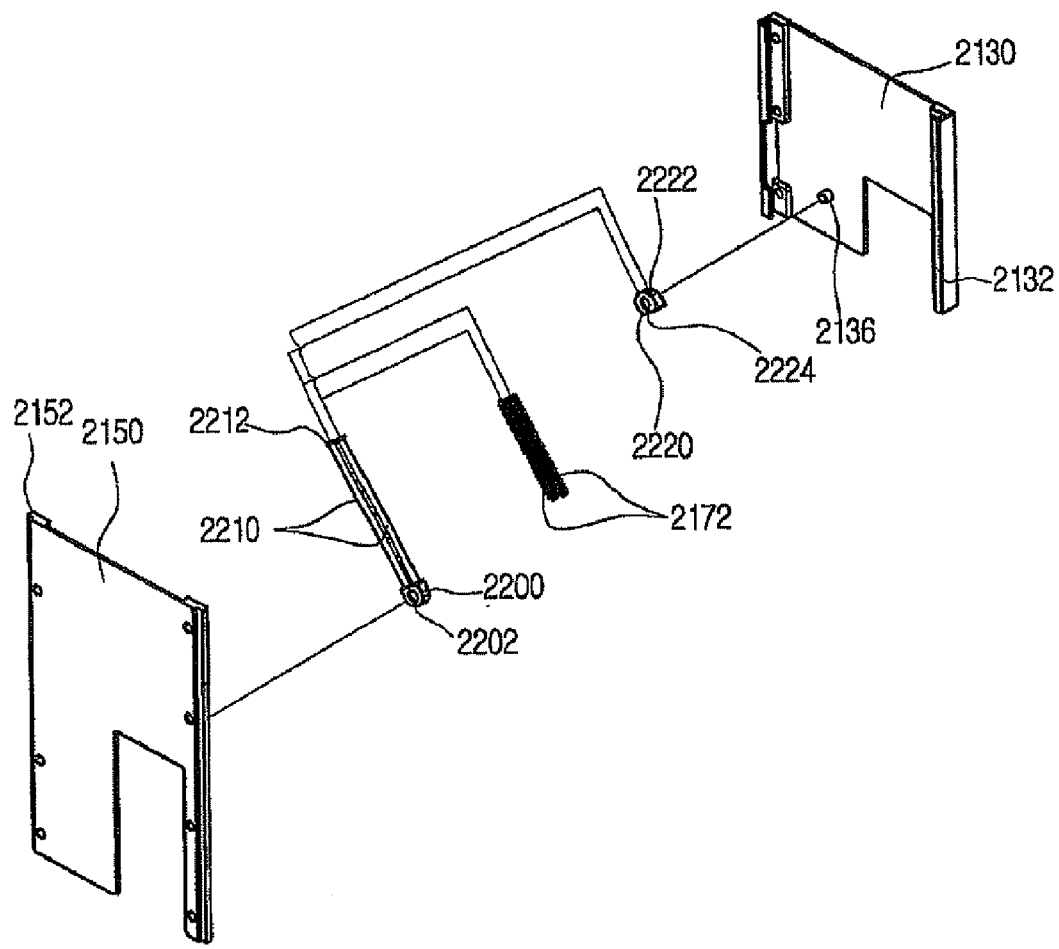
FIG. 18 is an exploded cross-sectional view of a portable terminal having the sliding opening and closing device according to a fourth embodiment of the present invention.
Figure 19:
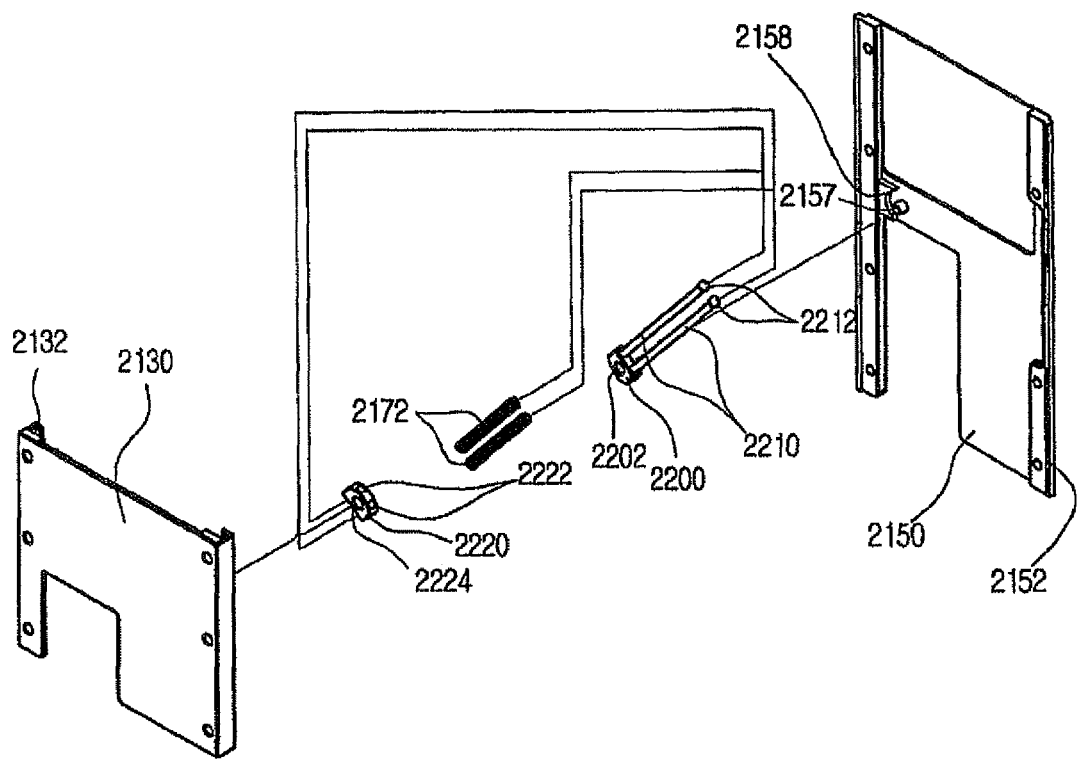
FIG. 19 is an exploded cross-sectional view of the sliding opening and closing device from a different angle from that shown in FIG. 18.

FIG. 18 is an exploded cross-sectional view of the sliding opening and closing device according to the fourth embodiment of the present invention; and FIG. 19 is an exploded cross-sectional view of the sliding opening and closing device from a different angle from that shown in FIG. 18.

The power transformation member of the fourth embodiment has a different constitution from that of the third embodiment.

The power transformation member according to the fourth embodiment comprises a first block (2200) forming a second shaft hole (2202) which is coupled to be rotatable to a third rotating shaft (2157) projecting from the slide plate (2150); at least one shaft part (2210) fixed to the first block (2200); and a second block (2220) forming a third shaft hole (2224) which is coupled to be rotatable to the second boss (2136) formed in the slide plate (2150).

The shaft part (2210) slides in the penetrating hole (2222), which enables the first block (2200) to be near or to be far from the guide shaft (2224).

A fitting piece (2212) is fixed at the shaft part (2210), which has penetrated the penetrating hole (2222), to be hung in the second block (2220) at the closed and open positions of the slide plate (2150), thereby limiting the moving distance of the slide plate (2150).

This embodiment additionally forms the first block (2200) as a non-circular form, and a fitting boss (2158) at the slide plate (2150) for limiting a rotation of the first block (2200) before the slide plate (2150) arrives at the position where the slide plate (2150) is closed completely into the main plate (2130), thereby controlling the moving distance in the direction of closing the slide plate (2150) to be shorter than the moving distance in the direction of opening the slide plate (2150).

By making the pushing width of opening the second body (2120) to be smaller than that of closing it, the opening operation of the second body (2120) can be facilitated.

The elastic part is a compression spring (2172), which is coupled to the shaft part (2210) and generates the elasticity power in a direction where the first block (2200) and the second block (2220) become distant from each other. The fitting part (2198) can be provided by forming a swage at the shaft part (2210) and coupling it to a coupling means such as a nut.

Meanwhile, if the length of the compression spring (2172) becomes short by the first block (2200) and the second block (2220) being formed large, the degree of transformation of the compression spring (2172) can be diminished compared to the moving distance of the slide plate (2150). Due to this constitution, the elasticity power of the compression spring (2172) can be less aged by accumulated fatigue due to repeated action.

The operation of the fourth embodiment will be described below.

Figure 20:
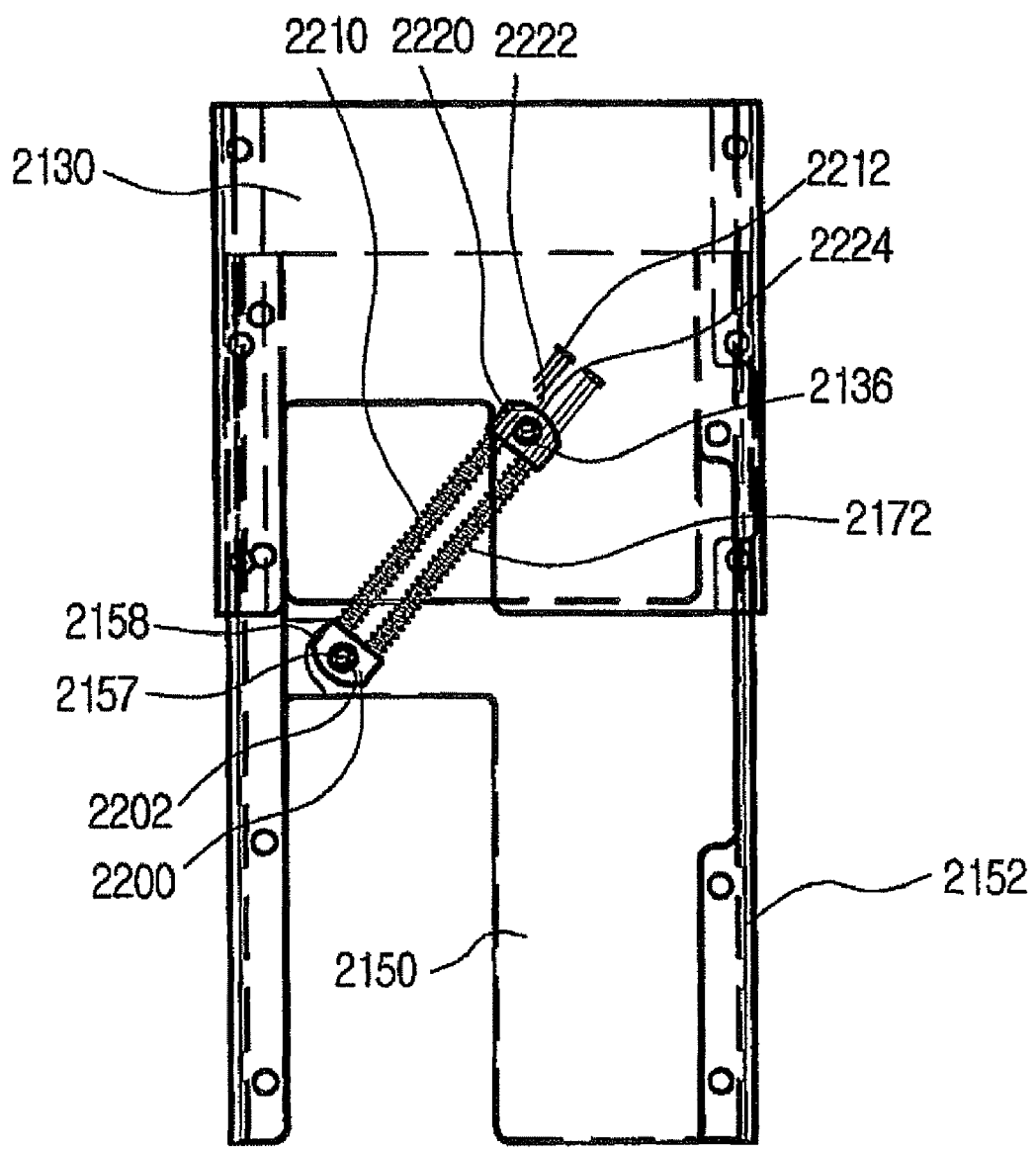
FIG. 20 is a transverse cross-sectional view showing a closed position of the opening and closing device shown in FIG. 19.
Figure 21:
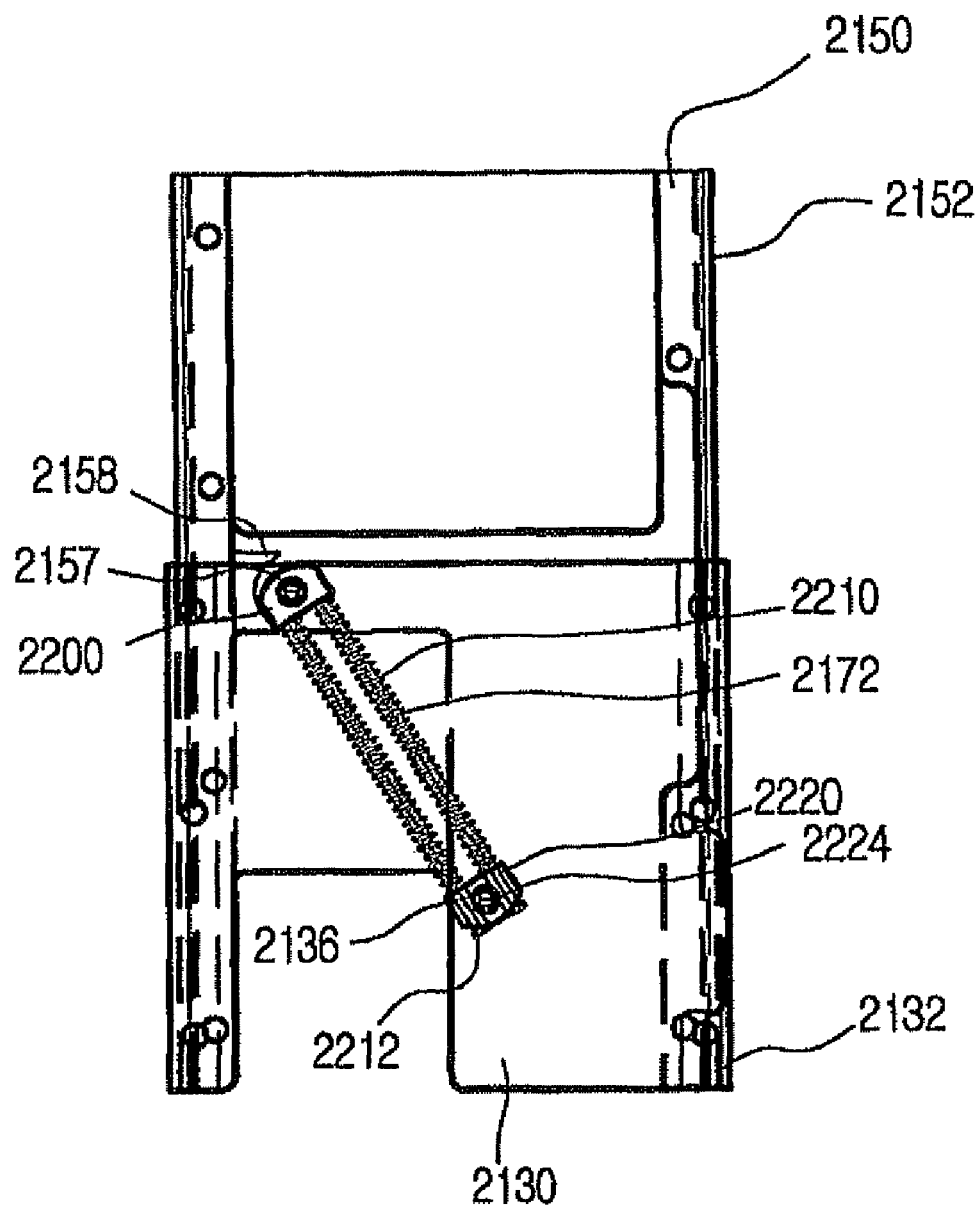
FIG. 21 is a transverse cross-sectional view showing an open position of the opening and closing device shown in FIG. 19.

First, FIG. 20 is a transverse cross-sectional view showing an open position of the opening and closing device shown in FIG. 19.

When the terminal is closed, the second body (2120) equipped with the liquid crystal screen (2122) gets superposed and closed into the first body (2100). At this time, the slide plate (2150) coupled to the second body (2120) maintains a closed position by the pushing force of the first block (2200), which receives the elasticity power of the compression spring (2172).

In order to open the terminal under such condition, if the second body (2120) is pushed by hand, the second body (2120) slides along with the slide plate (2150). At this time, the guide rib (2132) formed at the first body (2100) guides the guide slit (2152) of the slide plate (2150) and helps the slide plate (2150) to conduct the straight-line motion smoothly.

As the slide plate (2150) begins to be opened as shown in FIGS. 3 and 6, it pushes one end of the first block (2200). Then, the first block (2200) rotates around the guide shaft (2224), while compressing the compression spring (2172). Also, the shaft part (2210) moves perpendicular to the moving direction of the slide plate (2150) in the penetrating hole (2222) formed at the second block (2220), so that the first block (2200) can pass the direction where the radius of rotation of the shaft part (2210) becomes narrowed.

At first, the second body (2120) should be pushed by force, but if the first block (2200) passes the spot being parallel with the guide shaft (2224), it pushes again the slide plate (2150) in a direction of opening it by the elasticity power of the compression spring (2172). Thus, from this moment, the slide plate (2150) automatically moves until it becomes an open position without force.

If the second body (2120) is completely opened, the fitting part (2198) coupled to the shaft part (2210) is hung in the second block (2220), and the slide plate (2150) stops. At the same time, the slide plate (2150) maintains the open position by the pushing force of the first block (2200), which receives the elasticity power of the compression spring (2172).

If the second body (2120) is opened, the liquid crystal screen (2122) turns on. Then, a user can use the essential function of the terminal.

Meanwhile, in order to close the terminal when the second body (2120) is opened, the second body (2120) should be scrouged in a direction contrary to the above by hand. The closing movement of the second body (2120) is conducted in reverse order to the above opening movement.

Then, the second body (2120) reaches the closed position; the fitting piece (2212) coupled to the shaft part (2210) is hung by the second block (2220) and limits the rotation of the first block (2200), which results in the stop of the slide plate (2150) and the second body (2120).

At this time, the slide plate (2150) still maintains the closed position by the pushing force of the first block (2200), which receives the elasticity power of the compression spring (2172).

The sliding opening and closing device according to the fifth embodiment of the present invention will be further described with reference to the drawings in below.

Figure 22:
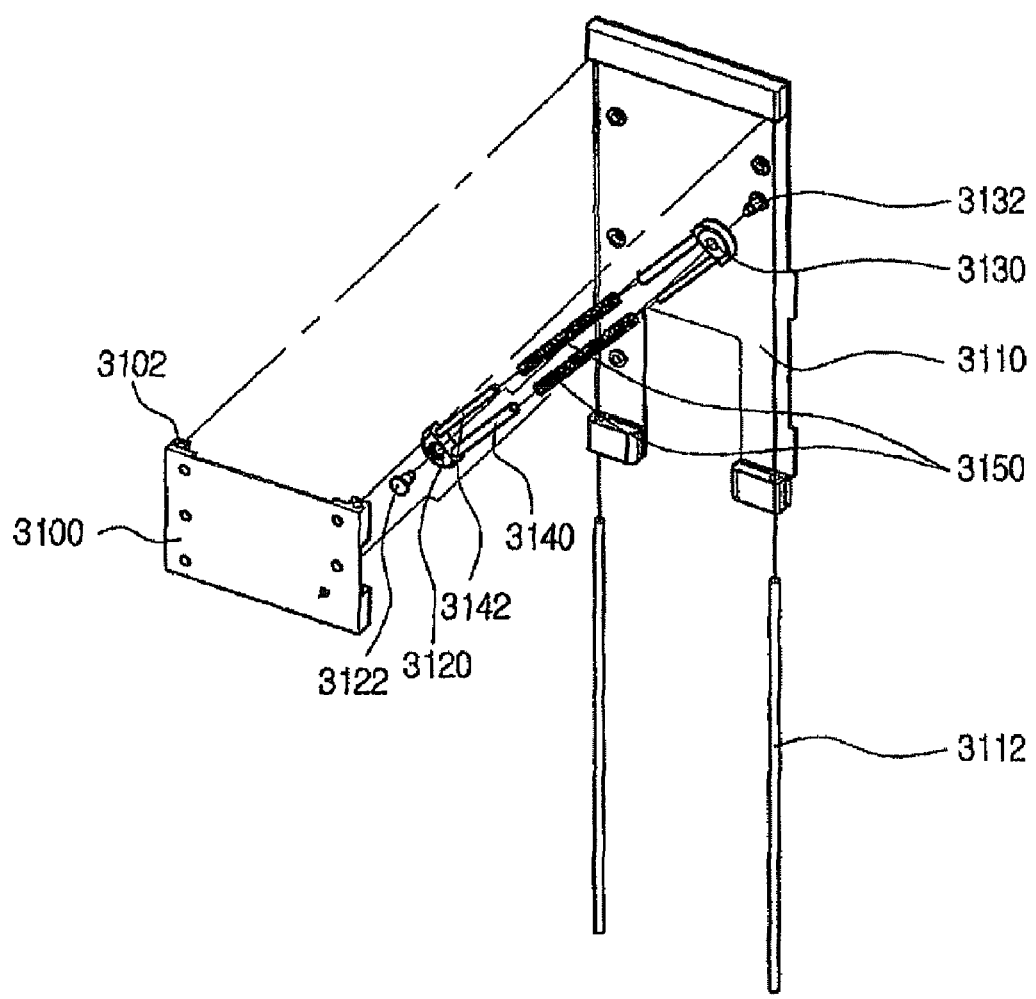
FIG. 22 is an exploded cross-sectional view of a portable terminal having the sliding opening and closing device according to a fifth embodiment of the present invention.

FIG. 22 is an exploded cross-sectional view of the sliding opening and closing device according to a fifth embodiment of the present invention.

A keypad is placed on a main body composing a portable terminal, and a main board executing various functions is installed in the main body. A liquid crystal screen is placed on a sub body, which is electrically connected to the main body through a flexible PCB.

A main plate (3130) is coupled to the main body, and a slide plate (3110) is coupled to the second body and connected to be slidable in one direction to the main plate (3100).

For the purpose, a guide shaft (3112) is formed in the slide plate (3110), and a guide hole (3102) is formed in the main plate (3100), to which the guide shaft (3112) is coupled to be slidable.

A first block (3120) is coupled to one spot of the main plate (3100) to be rotatable by a first hinge shaft (3122).

A second block (3130) is coupled to a second spot of the slide plate (3110), of which the moving path is not identical with that of the first spot, to be rotatable by a second hinge shaft (3132).

Based on the point of inflection in the moving course of the slide plate (3110), at a closed position of the slide plate (3110), the second block (3130) is positioned in a direction of closing into the first block (3120), so that the elasticity power of the elastic part can affect in a direction of closing the slide plate (3110).

While at an open position of the slide plate (3110), the second block (3130) is positioned in a direction of opening from the first block (3120), so that the elasticity power of the elastic part can affect in a direction of closing the slide plate (3110).

The second block (3130) is installed at the place where the moving distance of the slide plate (3110) when being opened can be shorter than the moving distance of the slide plate (3110) when being closed. Thus, the opening operation of the second body and the slide plate (3110) is capable of being rapidly conducted.

A bar member connects the first block (3120) and the second block (3130) to be flexible.

The bar member comprises a female shaft (3140) which is fixed to one side of the first block (3120), and the length of which is a shorter than the beeline between the first block (3120) and the second block (3130); and a male shaft (3142) which is fixed to the second block (3130), and the length of which is shorter than the beeline between the first block (3120) and the second block (3130) and is slidable in the female shaft (3140) during the opening and the closing of the slide plate (3110). In addition, in order to supplement the connection strength, the female shaft (3140) is placed at the second block (3130) and the male shaft (3142) is placed at the first block (3120).

An elastic part is coupled to the bar member and generates an elasticity power in a direction of extending the first block (3120) and the second block (3130).

The elastic part is composed of two compression springs (3150) inserted to the bar member.

Meanwhile, a stopper (not shown) is provided in order to limit the movement of the slide plate (3110) at the position where the slide plate (3110) is completely closed or completely opened.

The operation of the fifth embodiment will be explained in below.

Figure 23:
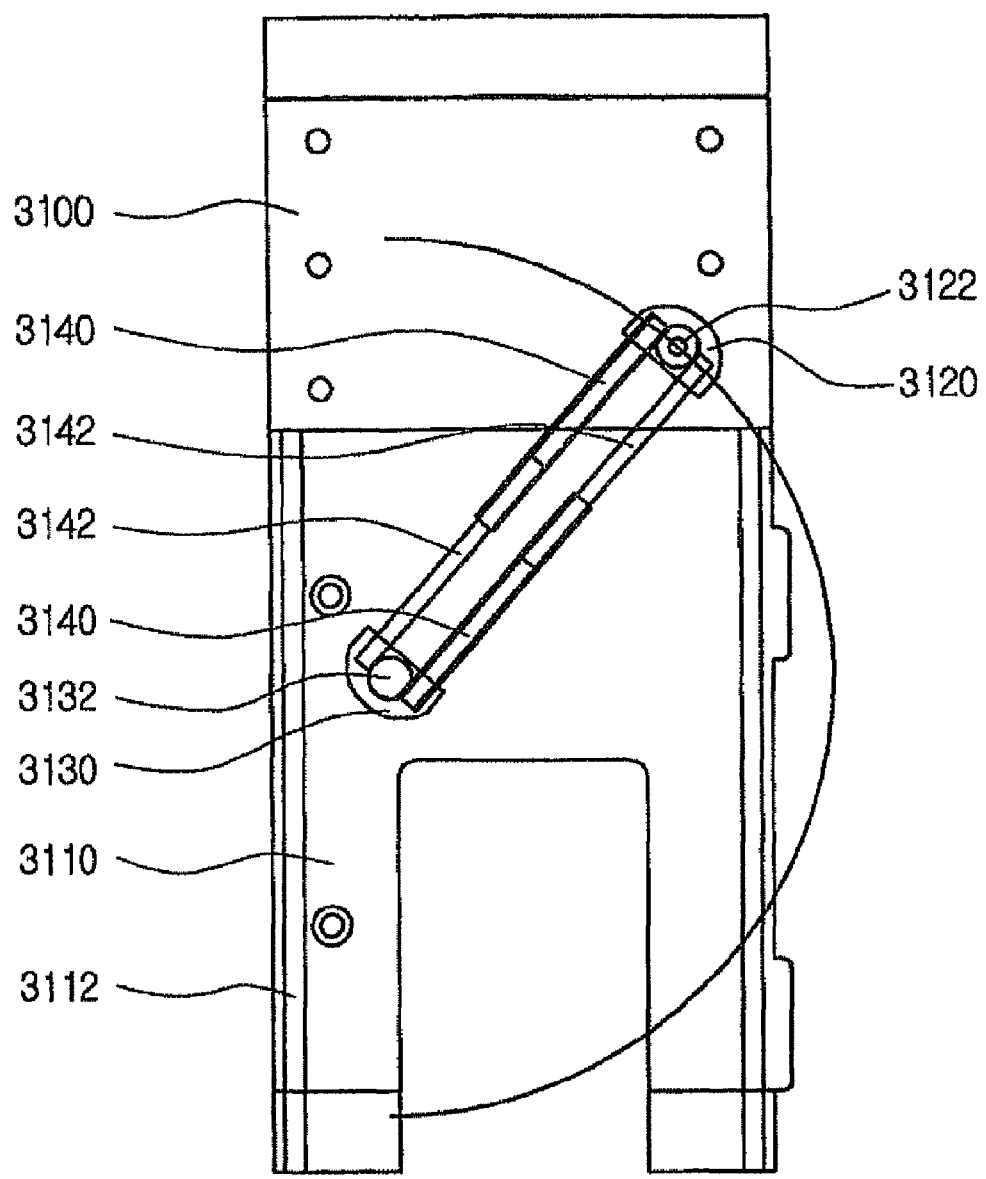
FIG. 23 is a cross-sectional view showing a closed position assembly of the opening and closing device shown in FIG. 22.

When the second body of the terminal is closed into the first body as shown in FIG. 23, the second body equipped with the liquid crystal screen gets superposed and closed into the main body. At this time, the slide plate (3110) coupled to the second body maintains a closed position by the pushing force of the second block (3130), which receives the elasticity power of the compression spring (3150).

In order to open the terminal under such condition, if the second body is pushed by hand, the second body slides along with the slide plate (3110). At this time, the guide shaft (3112) fixed to the slide plate (3110) moves along the guide hole (3102) of the main plate (3100) and helps the slide plate (3110) to conduct the straight-line motion smoothly.

As the slide plate (3110) begins to be opened, it pushes the second block (3130) to make the interval between the first block (3120) and the second block (3130) to be narrowed. Accordingly, the compression spring (3150) becomes compressed and its elasticity power gets increased, which prevents the slide plate (3110) and the second body from being opened.

Figure 24:
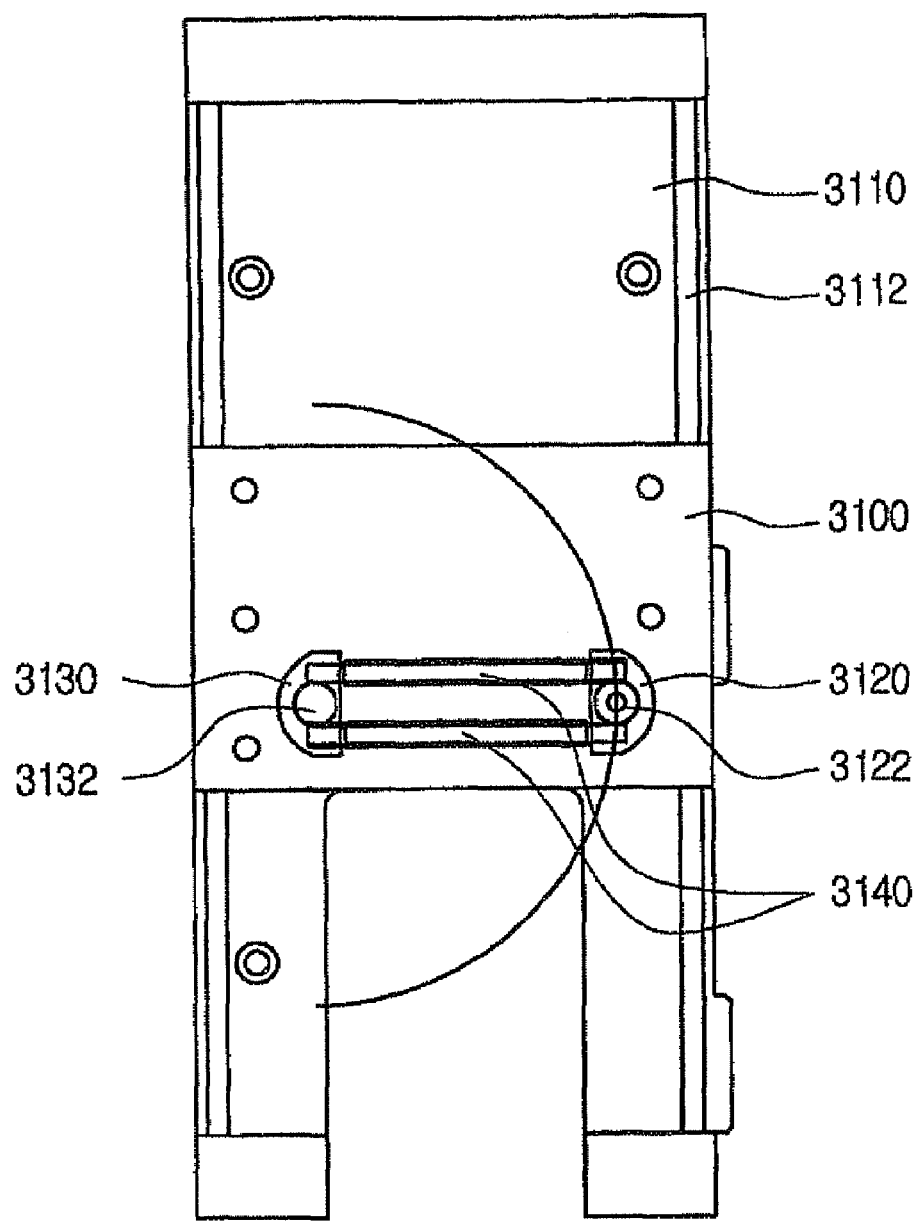
FIG. 24 is a cross-sectional view showing a partially open position of a slide plate in the opening and closing device shown in FIG. 23.
Figure 25:
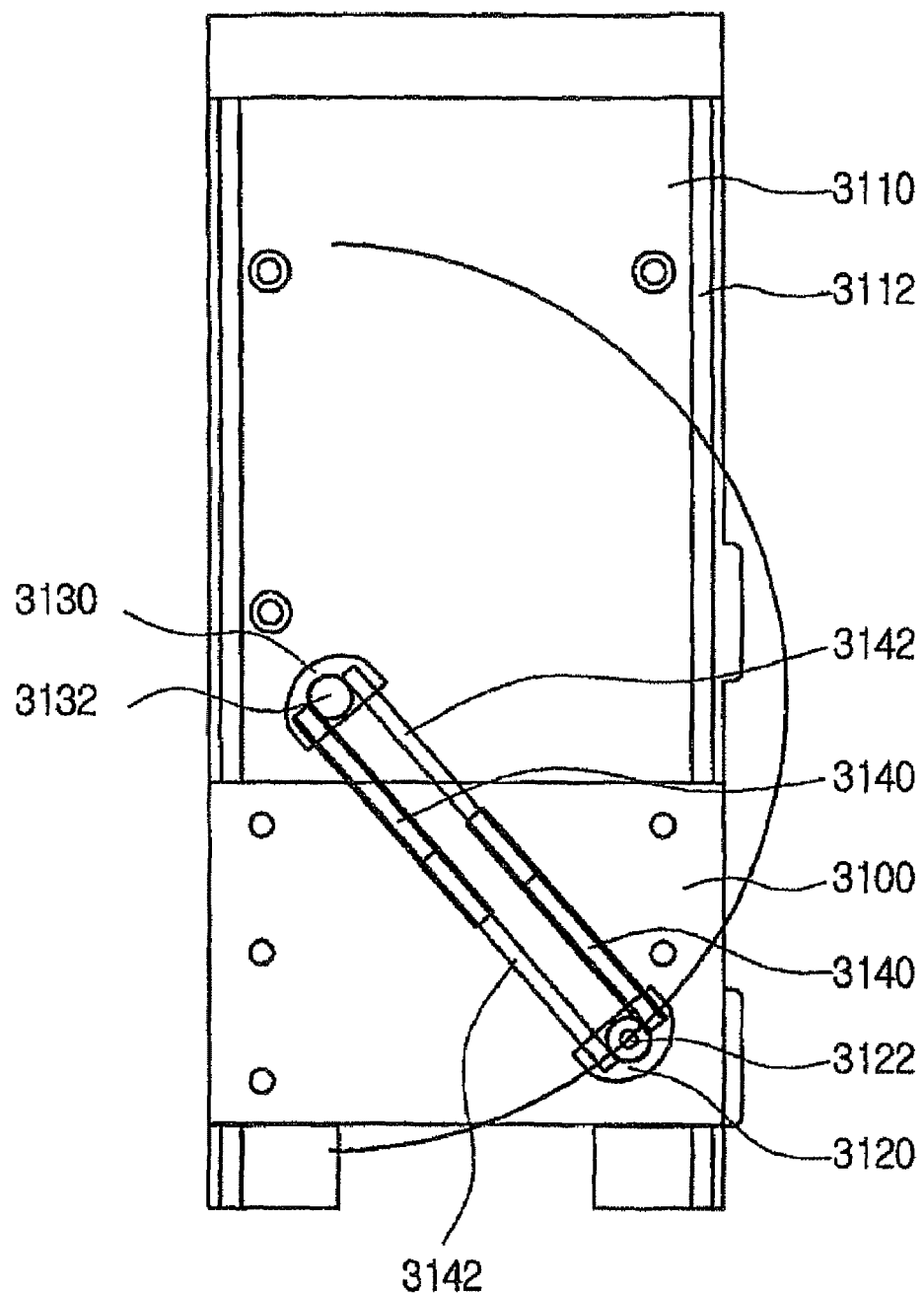
FIG. 25 is a cross-sectional view showing a completely open position of the slide plate in the opening and closing device shown in FIG. 23.

If the slide plate (3110) overcomes the preventing force and continues to move until it passes the inflection point as shown in FIG. 24, the second block (3130) pushes the slide plate (3110) in a direction of opening it by the elasticity power of the compression spring (3150). Thus, from this moment, the slide plate (3110) automatically moves until it becomes an open position without force.

Since the distance from the closing position of the slide plate (3110) to the inflection point is shorter than that from the opening position thereof to the inflection point, the operation for opening the slide plate (3110) and the second body are conducted easily.

If the second body is completely opened as shown in FIG. 24, the slide plate (3110) maintains the open position by the pushing force of the second block (3130), which receives the elasticity power of the compression spring (3150).

If the second body is opened, the keypad becomes exposed. Then, a user can use the essential function of a terminal.

Meanwhile, in order to close the terminal when the second body is opened, the user should scrouge the second body in a direction contrary to the above by hand. The closing movement of the second body is conducted in reverse order to the above opening movement.

The sliding opening and closing device and the portable terminal having thereof according to the second embodiment of the present invention will be further described with reference to the drawings in below.

Thereafter, if the second body reaches the closed position, the slide plate (3110) maintains the closed position by the pushing force of the second block (3130), which receives the elasticity power of the compression spring (3150).

The sliding opening and closing device according to the sixth embodiment of the present invention will be further described with reference to the drawings in below.

Figure 26:
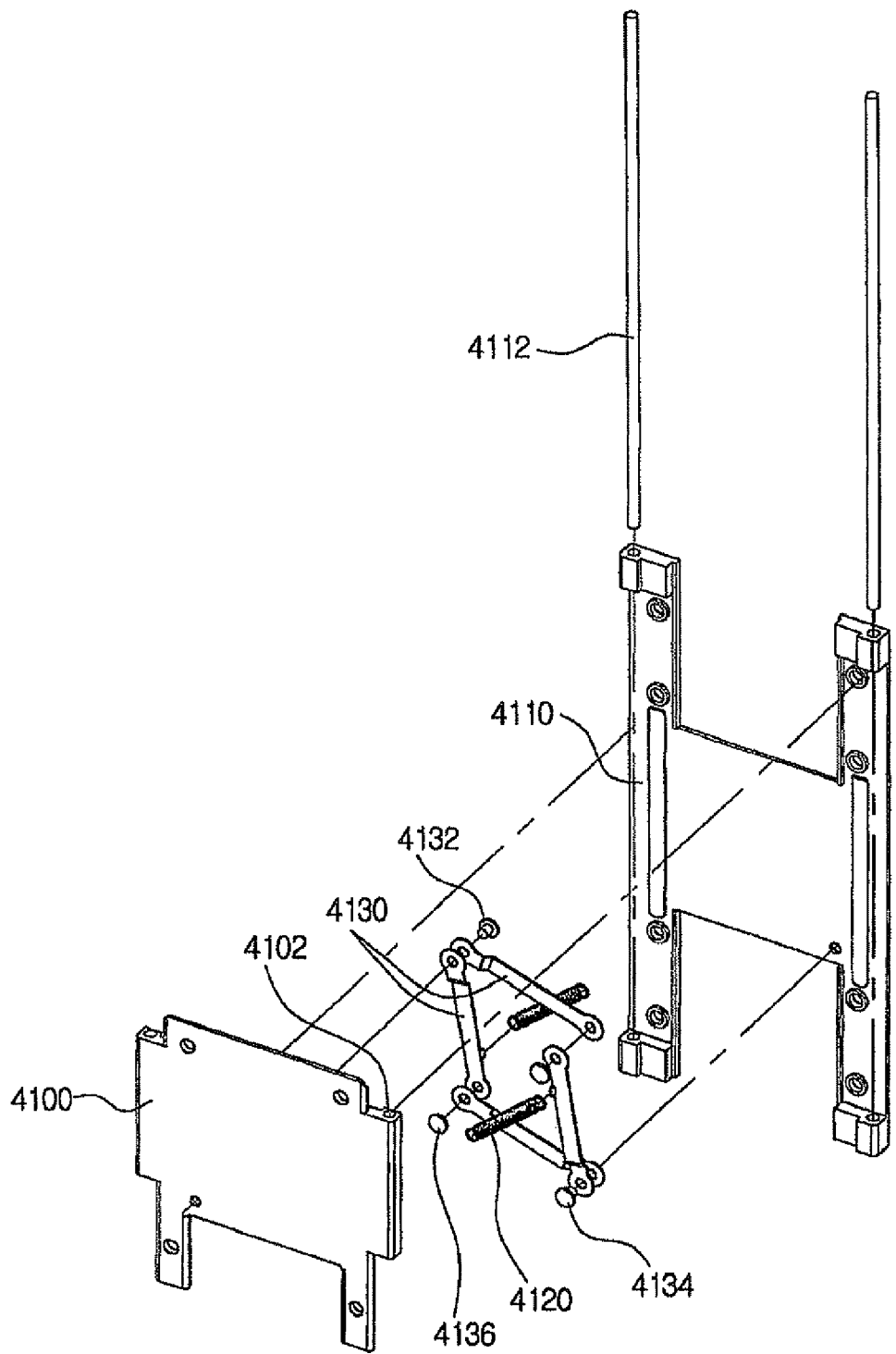
FIG. 26 is an exploded cross-sectional view of a portable terminal having the sliding opening and closing device according to a sixth embodiment of the present invention.

FIG. 26 is an exploded cross-sectional view of the sliding opening and closing device according to this embodiment of the present invention.

A keypad is placed on a main body composing a portable terminal, and a main board executing various functions is installed in the main body. A liquid crystal screen is placed on a second body, which is electrically connected to the first body through a flexible PCB.

A main plate (4100) is coupled to the first body, and a slide plate (4110) is coupled to the second body and connected to be slidable in one direction to the main plate (4100).

For the purpose, a guide shaft (4112) is fixed to the slide plate (4110), and a guide hole (4102) is formed in the main plate (4100), to which the guide shaft (4112) is coupled to be slidable.

The elastic part is composed of a tension spring (4120), which generates a tension force.

The power transformation member is composed of at least two link rows, which connect a first spot of the main plate (4100) to a second spot of the slide plate (4110), each of which is composed of at least two links (4130) having one or more refraction points. The at least two links which receive the tension of the tension spring (4120) and generate an elasticity power in a direction of extending the first and the second spots.

Each of the link rows is composed of two links (4130), which are refracted by a refracting pin (4136). Also, at a first spot, one end of the links (4130) composing each link row is coupled to be rotatable to the main plate (4100) by a first fixing pin (4132); and at a second spot, the other end of the links (4130) composing each link row is coupled to be rotatable to the slide plate (4110) by a second fixing pin (4134).

The power transformation member, based on the point of inflection in the moving course of the slide plate (4110), at a closed position of the slide plate (4110), it supplies the elasticity power in a direction of closing the slide plate (4110); while at an open position of the slide plate (4110), it supplies the elasticity power in a direction of opening the slide plate (4110).

Also, the power transformation member is placed in the position where the moving distance in the direction of opening the slide plate (4110) to be shorter than the moving distance in the direction of closing the slide plate (4110). By making the pushing width of opening the second body to be smaller than that of closing it, the opening operation of the second body can be facilitated.

The elastic part is composed of two compression springs (3150) inserted to the bar member.

Meanwhile, a stopper (not shown) is provided in order to limit the movement of the slide plate (4110) at the position where the slide plate (4110) is completely closed into the main plate (4100) and completely opened therefrom.

The operation of the sixth embodiment will be explained in below.

Figure 27:
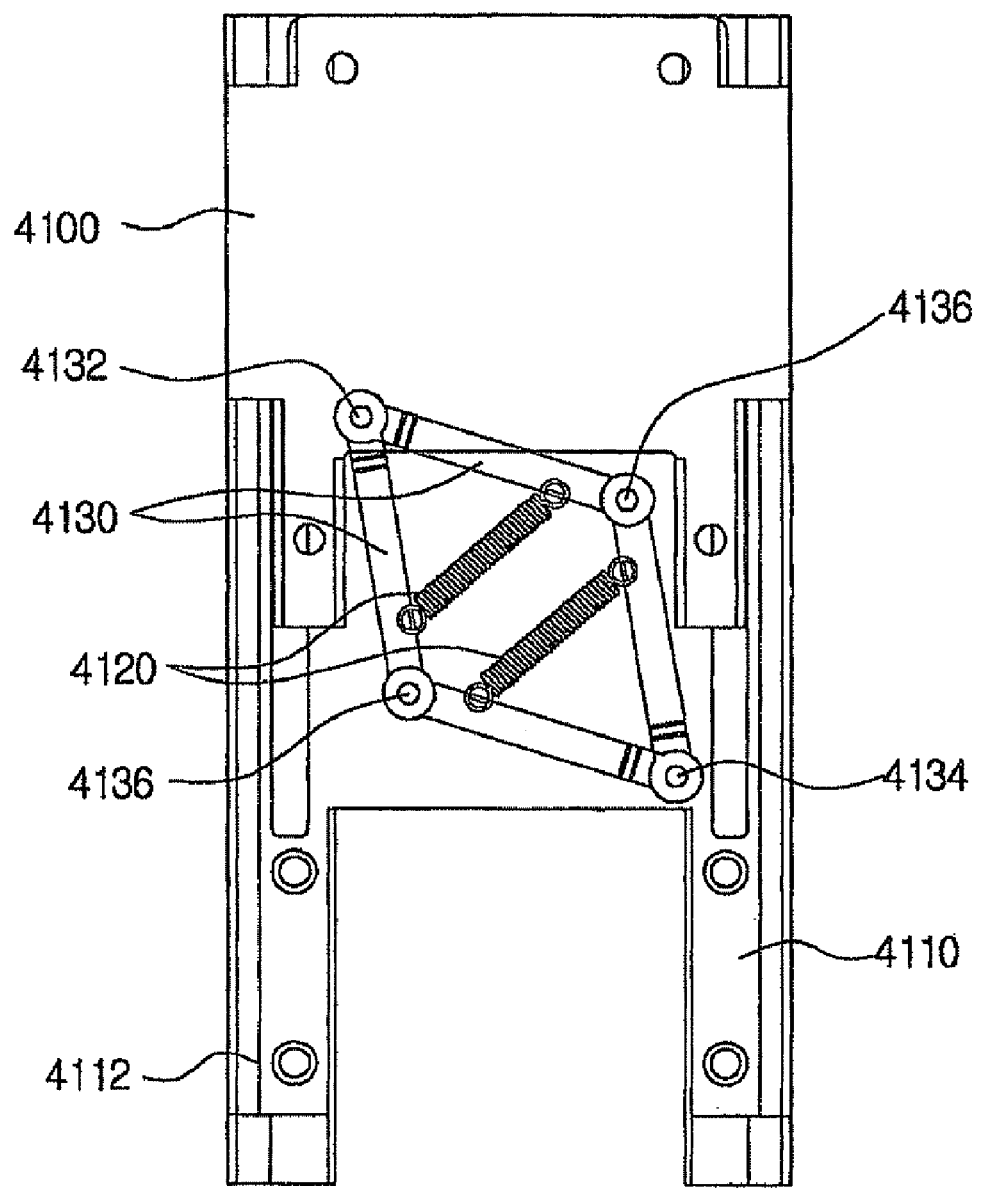
FIG. 27 is a cross-sectional view showing a closed position assembly of the opening and closing device shown in FIG. 26.

When the second body of the terminal is closed into the first body as shown in FIG. 27, the second body equipped with the liquid crystal screen gets superposed and closed into the main body. At this time, the slide plate (4110) coupled to the second body maintains a closed position by the pushing force of the link (4130), which receives the elasticity power of the tension spring (4120).

In order to open the terminal under this condition, if the second body is pushed by hand, it slides along with the slide plate (4110). At this time, the guide shaft (4112) fixed to the slide plate (4110) moves along the guide hole (4102) of the main plate (4100) and helps the slide plate (4110) to conduct the straight-line motion smoothly.

As the slide plate (4110) begins to be opened, the main plate (4100) and the slide plate push both ends of the link (4130) to make the interval between the first fixing pin (4132) and the second fixing pin (4134) to be narrowed. Accordingly, the tension spring (4120) becomes expanded and its elasticity power gets increased, which prevents the slide plate (4110) and the second body from being opened.

Figure 28:
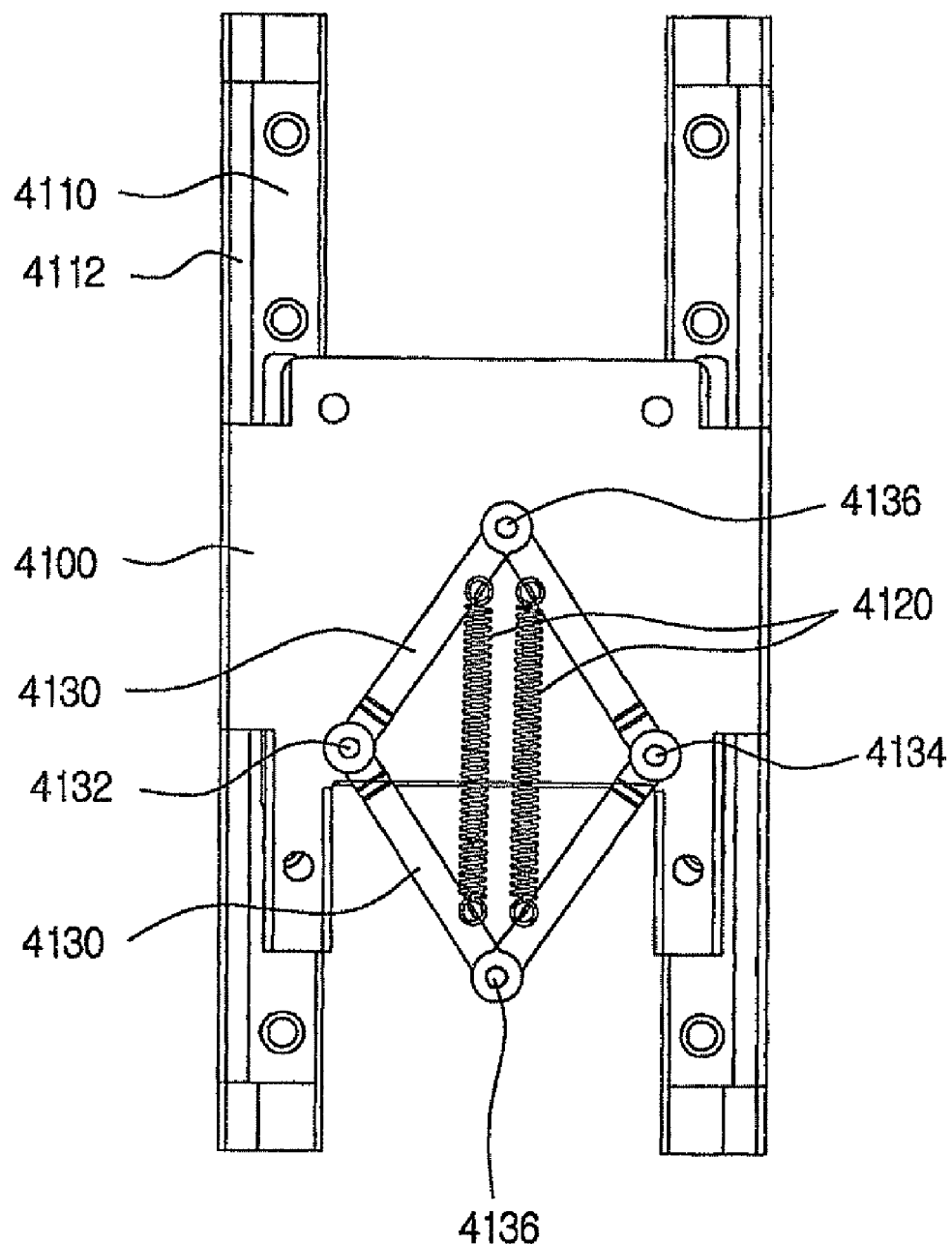
FIG. 28 is a cross-sectional view showing a partially open position of the slide plate in the opening and closing device shown in FIG. 27.

If the slide plate (4110) overcomes the preventing force and continues to move until it passes the inflection point as shown in FIG. 28, the link (4130) pushes the slide plate (4110) in a direction of opening it by the elasticity power of the tension spring (4120). Thus, from this moment, the slide plate (4110) automatically moves until it becomes an open position without force.

Since the distance from the closing position of the slide plate (4110) to the inflection point, which receives the elasticity power in the direction where the slide plate (4110) is opened, is shorter than that from the remaining distance, the operation for opening the slide plate (4110) and the second body are conducted easily.

Figure 29:
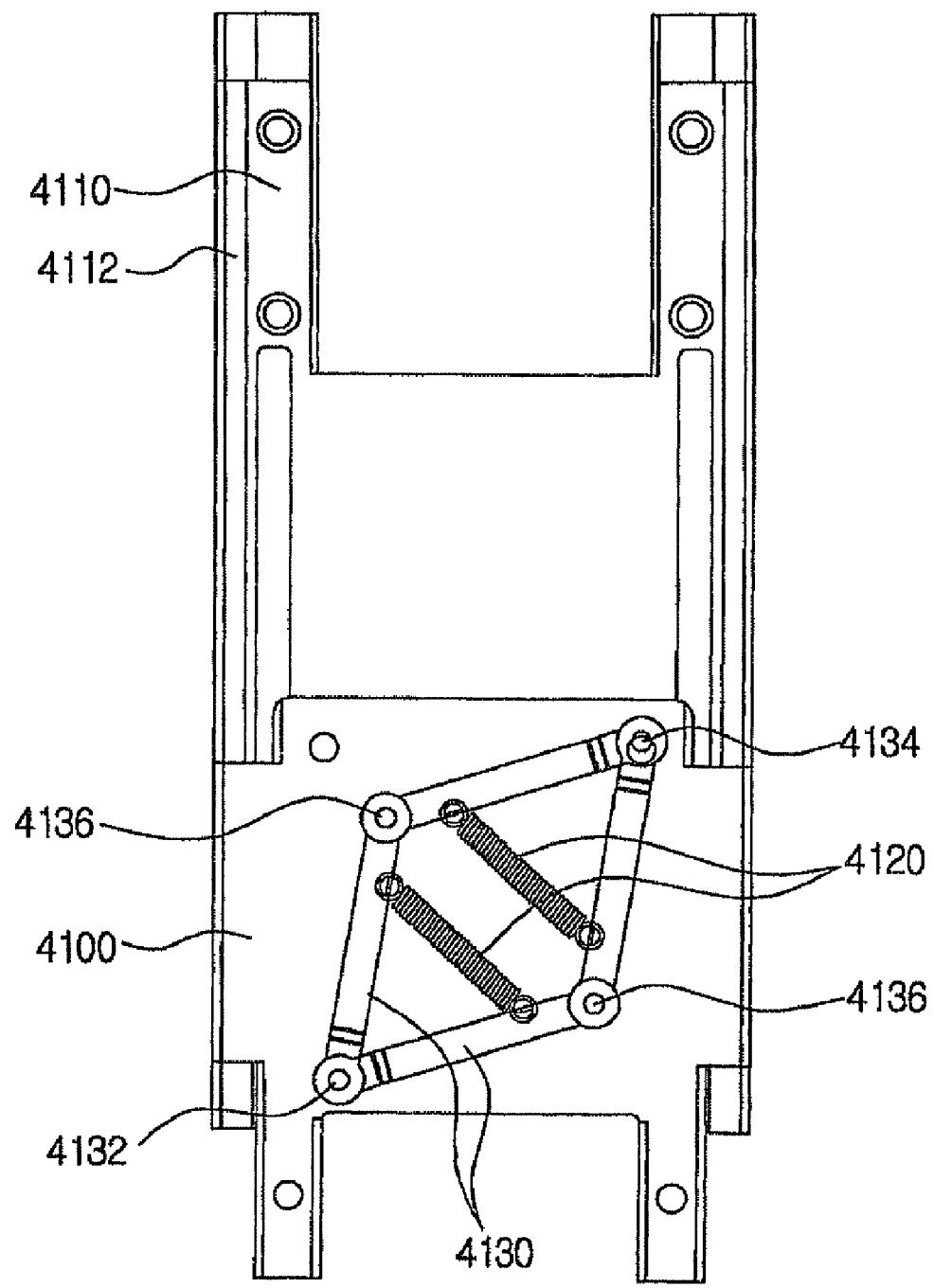
FIG. 29 is a cross-sectional view showing a completely open position of the slide plate in the opening and closing device shown in FIG. 28.

If the second body is completely opened as shown in FIG. 29, the slide plate (4110) maintains the open position by the pushing force of the link (4130), which receives the elasticity power of the tension spring (4120).

If the second body is opened, the keypad becomes exposed. Then, a user can use the essential function of a terminal.

Meanwhile, in order to close the terminal when the second body is opened, the user should scrouge the second body in a direction contrary to the above by hand. The closing movement of the second body is conducted in reverse order to the above opening movement.

Thereafter, if the second body reaches the closed position, the slide plate (4110) maintains the closed position by the pushing force of the link (4130), which receives the elasticity power of the tension spring (4120).

The sliding opening and closing device and the terminal having thereof according to a seventh embodiment of the present invention will be further described with reference to the drawings in below.

Figure 30:
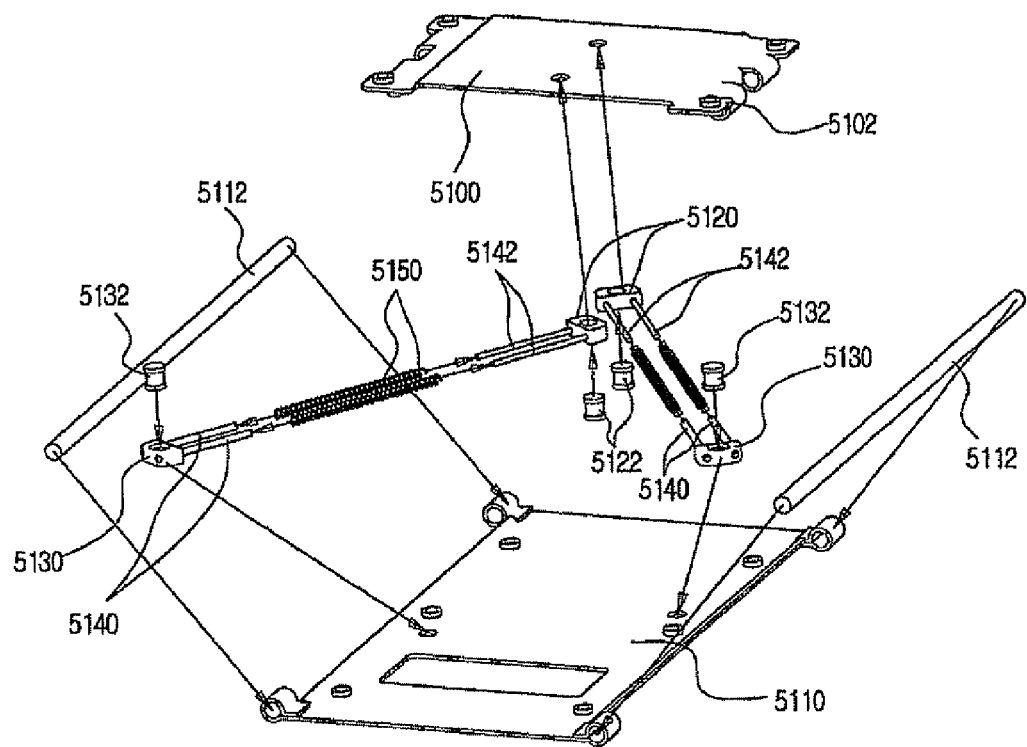
FIG. 30 is an exploded cross-sectional view of a portable terminal having the sliding opening and closing device according to a seventh embodiment of the present invention.

FIG. 30 is an exploded cross-sectional view of a portable terminal according to the seventh embodiment of the present invention.

A keypad is placed on a main body (5010) composing a portable terminal, and a main board executing various functions is installed in the main body. A liquid crystal screen is placed on a sub body (5020), which is electrically connected to the main body (5010) through a flexible PCB.

A main plate (5100) is coupled to the main body (5010), and a slide plate (5110) is coupled to the sub body (5020) and connected to be slidable in one direction to the main plate (5100).

For this purpose, a guide shaft (5112) is fixed to the slide plate (5110), and a shaft holder (5102) is formed at the main plate (5100), to which the guide shaft (5112) is coupled to be slidable.

A first elastic means and a second elastic means are installed in order to control the operation of the slide plate in the portable terminal.

The first elastic means is provided wherein one end of which is supported by the main plate (5100), and the other end of which is supported by the slide plate (5110). Based on the inflection point, it supplies an elasticity power in a direction of closing the slide plate (5110) and a first side direction perpendicular to the moving direction of the slide plate (5110) when the slide plate (5110) is near to the closed position, while it supplies an elasticity power in a direction of opening the slide plate (5110) and the first side direction when the slide plate (5110) is near to the open position.

The second elastic means is provided wherein one end of which is supported by the main plate (5100), and the other end of which is supported by the slide plate (5110). Based on the inflection point, it supplies an elasticity power in a direction of closing the slide plate (5110) and a second side direction contrary to the first side direction when the slide plate (5110) is near to the closed position, while it supplies an elasticity power in a direction of opening the slide plate (5110) and the second side direction when the slide plate (5110) is near to the open position.

The reason why the first and the second elastic means are placed to generate each elasticity power in different directions based on the direction where the slide plate (5110) moves is as follows: If only one elastic means is used or two elastic means generate a force in the identical side direction, the slide plate (5110) applies a partial force toward the main plate (5100), which causes damage or abrasion of the guide shaft (5112) and the shaft holder (5102) in a short term. By unifying the inflection point of the first and the second elastic means, the operation of the slide plate (5110) can be facilitated.

Meanwhile, the first block (5120) comprised in the first and the second elastic means is coupled to be rotatable to a first spot of the main plate (5100) by a first hinge shaft (5122).

Then, the second block (5130) is coupled to be rotatable to a second spot of the main plate (5100), which is not consistent with the moving path of the first spot, by a second hinge shaft (5132).

The second block (5130) is placed on a closed position into the first block (5120) when the slide plate (5110) is closed based on the inflection point in the moving path of the slide plate (5110), so that the elasticity power of the elastic part can affect in the direction of closing the slide plate (5110).

Likewise, the second block (5130) is placed on an open position from the first block (5120) when the slide plate (5110) is opened, so that the elasticity power of the elastic part can affect in the direction of opening the slide plate (5110).

Also, the second block is installed at the place where the moving distance of the slide plate (5110) when being opened can be shorter than the moving distance of the slide plate (5110) when being closed.

Meanwhile, a guide shaft (5112) connects the first block (5120) and the second block (5130) to be flexible.

The guide shaft (5112) comprises a female shaft (5140) which is fixed to one side of the first block (5120) or the second block (5130), and which has a shorter length than the beeline between the first block (5120) and the second block (5130); and a male shaft (5142) which is fixed to the second block (5130), and which has a shorter length than the beeline between the first block (5120) and the second block (5130) and is slidable in the female shaft (5140) during the opening and the closing of the slide plate (5110). In addition, in order to supplement the connection strength, the female shaft (5140) is placed at the second block (5130) and the male shaft (5142) is placed at the first block (5120).

Meanwhile, an elastic part is coupled to the guide shaft (5112) and generates an elasticity power in a direction of extending the first block (5120) and the second block (5130).

The elastic part is composed of two compression springs (5150) inserted to the guide shaft (5112).

Meanwhile, a stopper (not shown) is provided in order to limit the movement of the slide plate (5110) at the position where the slide plate (5110) is completely closed into and completely opened from the main plate (5100).

The operation of this embodiment will be explained in below.

Figure 31:
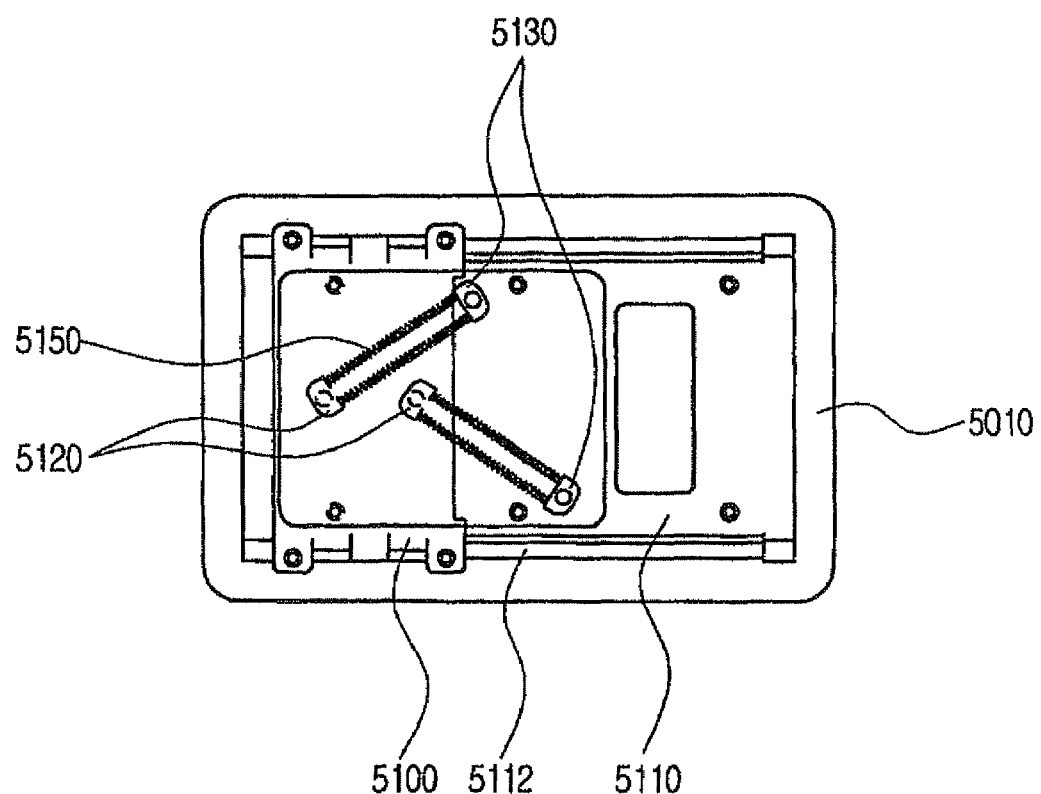
FIG. 31 is a transverse cross-sectional view showing a closed position assembly of the portable terminal having the opening and closing device shown in FIG. 30.
Figure 32:
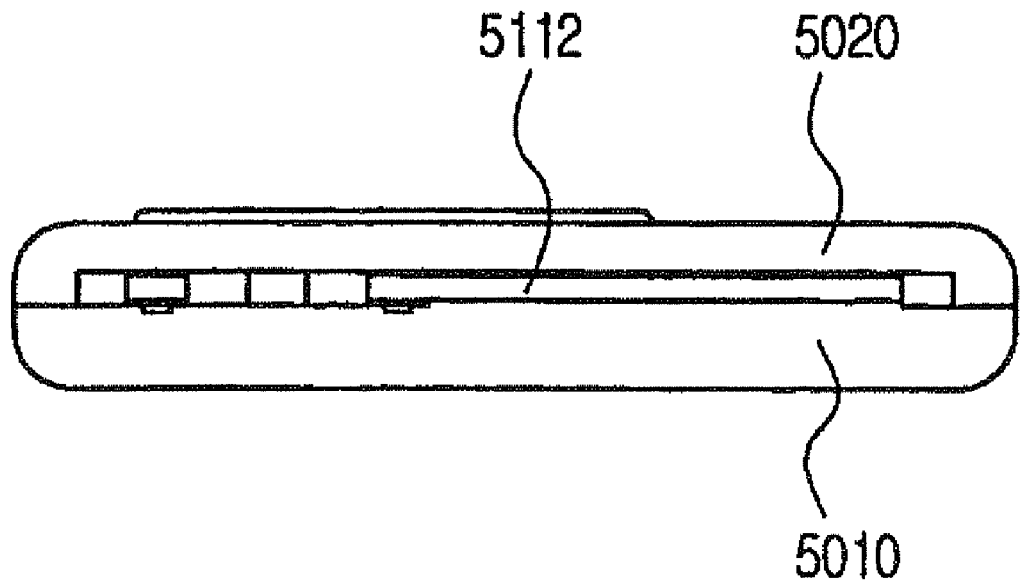
FIG. 32 is a vertical cross-sectional view of the portable terminal shown in FIG. 31.

FIG. 31 is a transverse cross-sectional view showing a closed position of the portable terminal. FIG. 32 is a vertical cross-sectional view of FIG. 31.

When the sub body (5020) is closed into the main body (5010), the sub body (5020) equipped with the liquid crystal screen gets superposed and closed into the main body (5010). At this time, the slide plate (5110) coupled to the sub body (5020) maintains a closed position by the pushing force of the two second blocks (5130), which receive the elasticity power of the compression spring (5150).

In order to open the terminal under this condition, if the sub body (5020) is pushed by hand, it slides along with the slide plate (5110). At this time, the guide shaft (5112) fixed to the slide plate (5110) moves along the guide shaft holder (5102) of the main plate (5100) and helps the slide plate (5110) to conduct the straight-line motion smoothly.

As the slide plate (5110) begins to be opened, it pushes the second block (5130) to make the interval between the first block (5120) and the second block (5130) to be narrowed. Accordingly, the compression spring (5150) becomes compressed and its elasticity power gets increased, which prevents the slide plate (5110) and the sub body (5020) from being opened.

Figure 33:
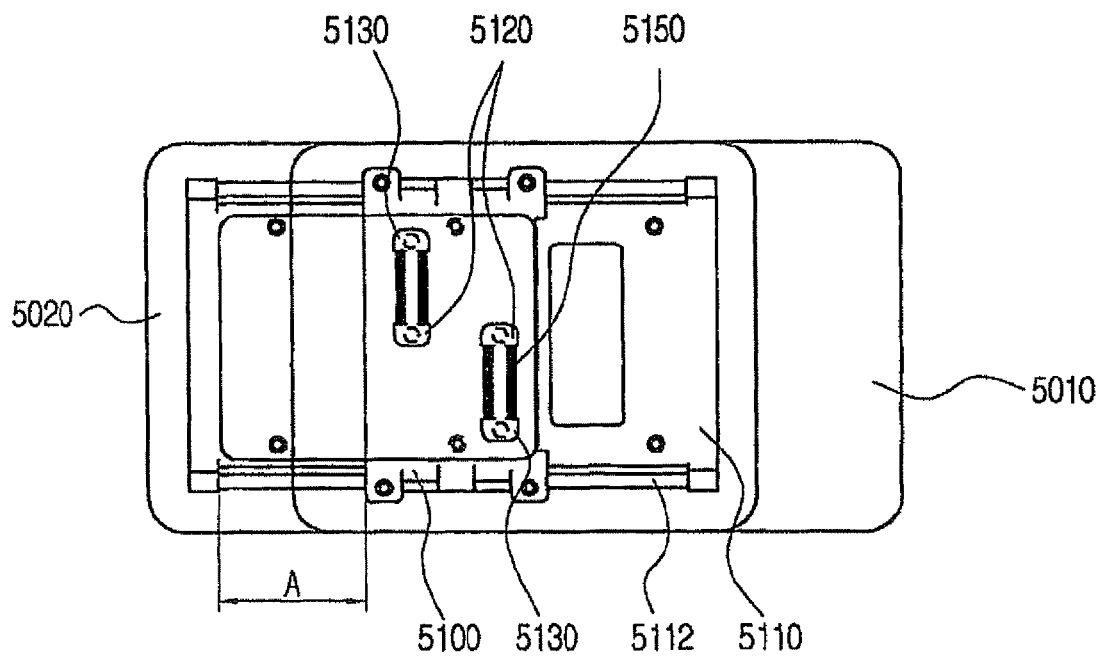
FIG. 33 is a transverse cross-sectional view of the portable terminal shown in FIG. 31, wherein the sub body of the portable terminal is opened to the point of inflection.
Figure 34:
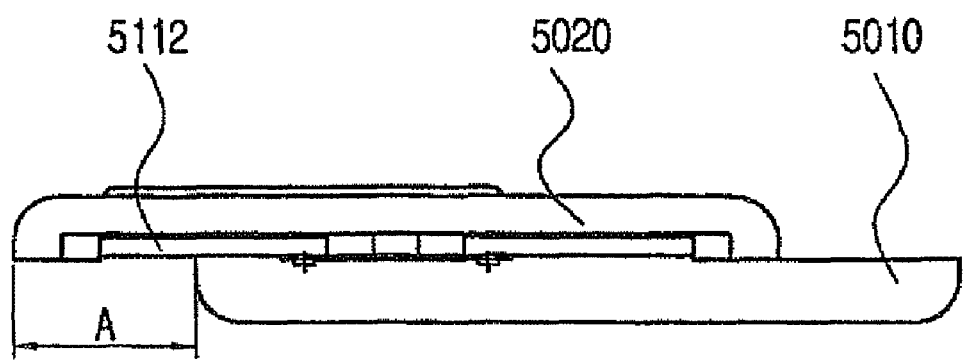
FIG. 34 is a vertical cross-sectional view of the portable terminal shown in FIG. 33.

FIG. 33 is a transverse cross-sectional view of the portable terminal shown, wherein the sub body of the portable terminal is opened to the point of inflection. FIG. 34 is a vertical cross-sectional view of FIG. 33.

If the slide plate (5110) overcomes the preventing force and continues to move until it passes the inflection point, the second block (5130) pushes the slide plate (5110) in a direction of opening it by the elasticity power of the compression spring (5150). Thus, from this moment, the slide plate (5110) automatically moves until it becomes an open position without applying a force to the sub body (5020) and the slide plate (5110).

Since the distance from the closing position of the slide plate (5110) to the inflection point is shorter than that from the opening position thereof to the inflection point, the operation for opening the slide plate (5110) and the sub body (5020) are conducted easily.

Figure 35:
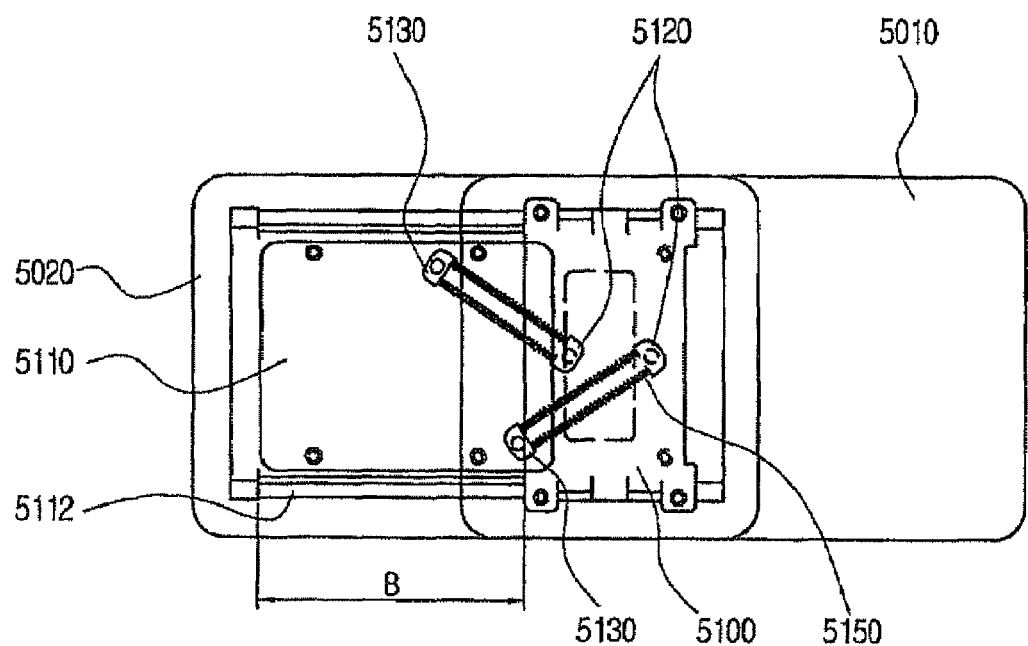
FIG. 35 is a transverse cross-sectional view showing a completely open position of the slide plate in the portable terminal shown in FIG. 31.
Figure 36:
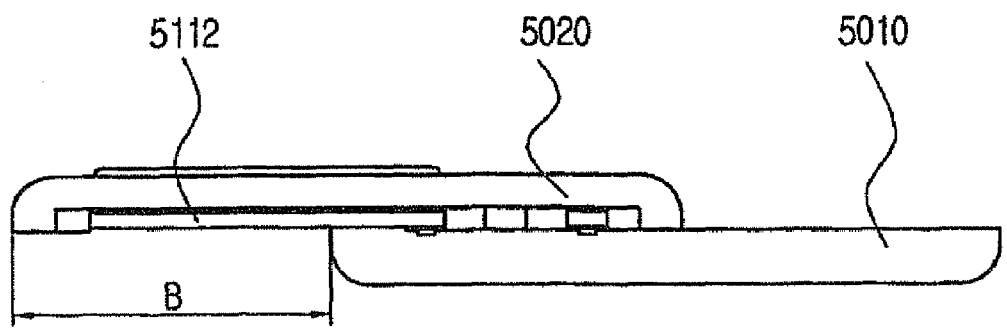
FIG. 36 is a vertical cross-sectional view of the portable terminal shown in FIG. 35.

FIG. 35 is a transverse cross-sectional view showing a completely open position of the sub body in the portable terminal. FIG. 36 is a vertical cross-sectional view of FIG. 35.

If the sub body (5020) is completely opened, the slide plate (5110) maintains the open position by the pushing force of the second block (5130), which receives the elasticity power of the compression spring (5150).

If the sub body (5020) is opened, the keypad becomes exposed. Then, a user can use the essential function of a terminal.

Meanwhile, in order to close the terminal when the sub body (5020) is opened, the user should scrouge the sub body (5020) in a direction contrary to the above by hand. The closing movement of the sub body (5020) is conducted in reverse order to the above opening movement.

Then, if the sub body (5020) reaches the closed position, the slide plate (5110) maintains the closed position by the pushing force of the second block (5130), which receives the elasticity power of the compression spring (5150).

The portable terminal having the sliding opening and closing device according to an eighth embodiment of the present invention will be further described with reference to the drawings in below.

Figure 37:
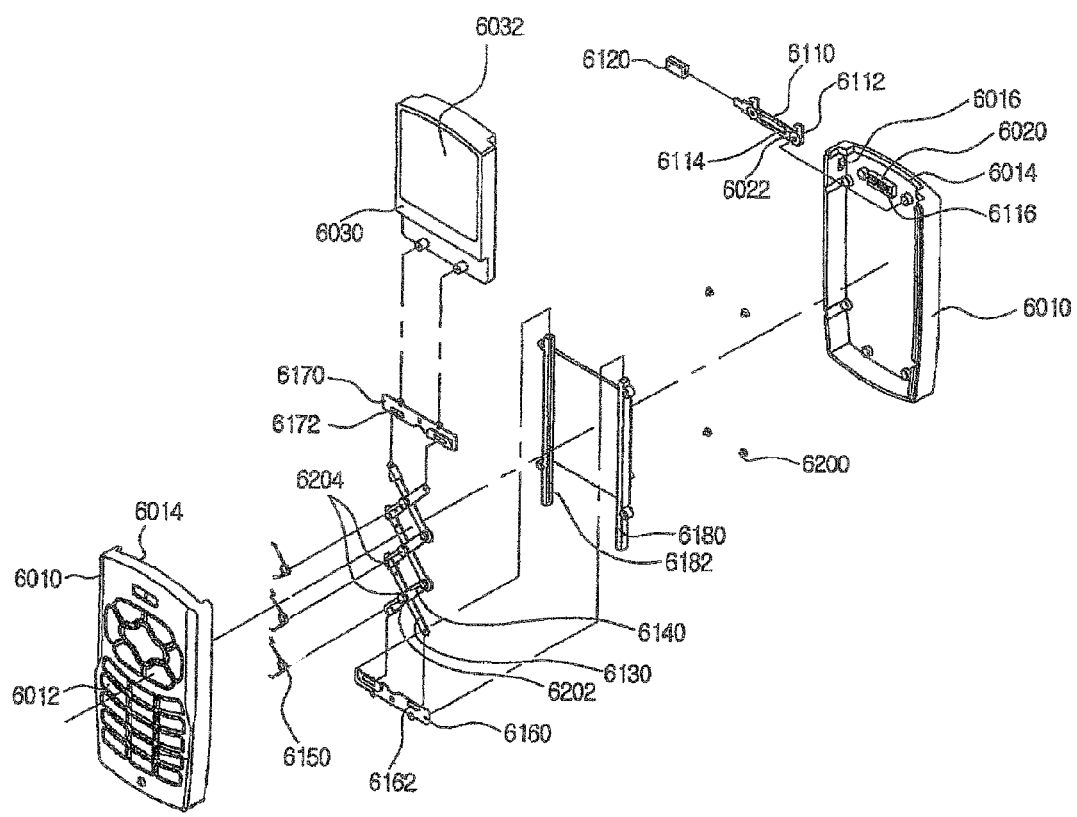
FIG. 37 is an exploded cross-sectional view of a portable terminal having the sliding opening and closing device according to an eighth embodiment of the present invention.
Figure 38:
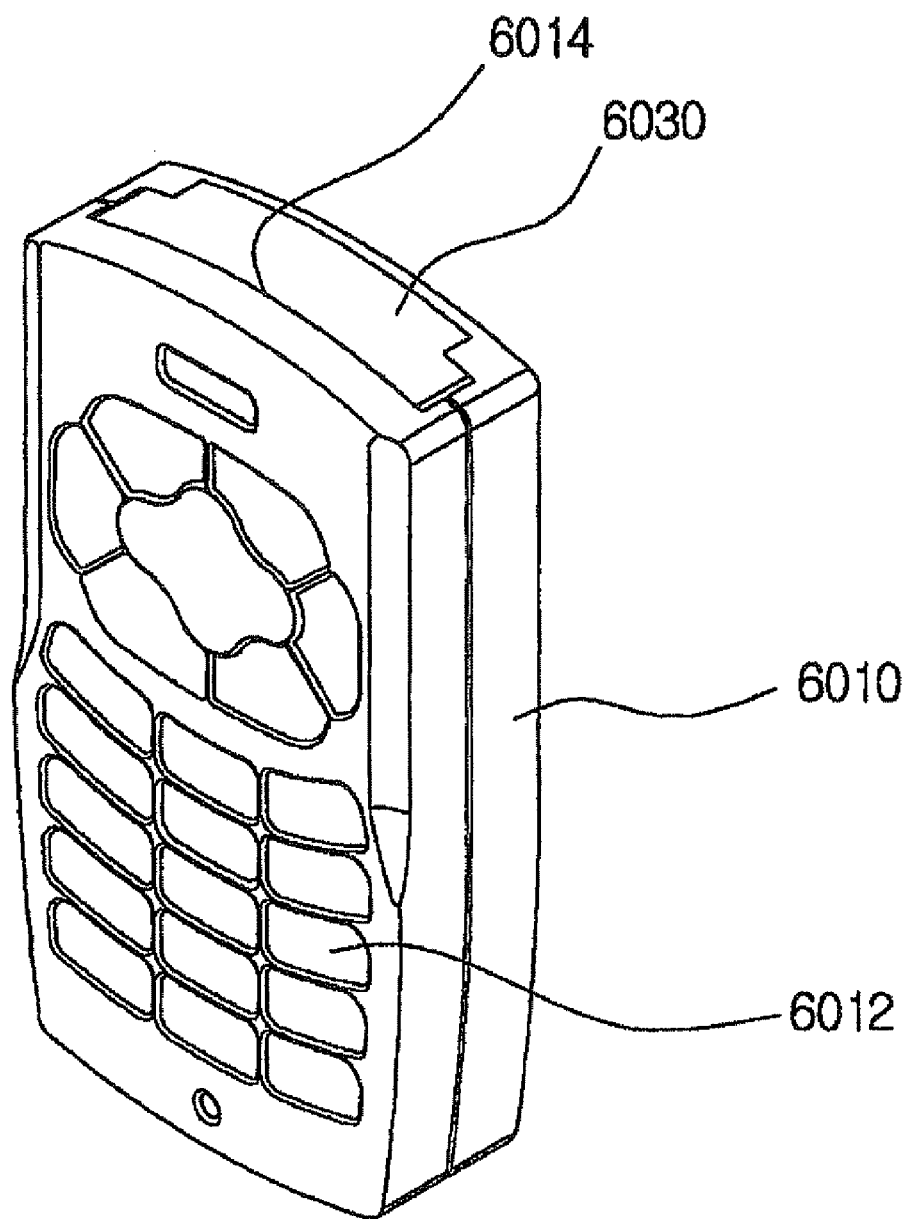
FIG. 38 is a cross-sectional view of an assembly of the portable terminal shown in FIG. 37.
Figure 39:
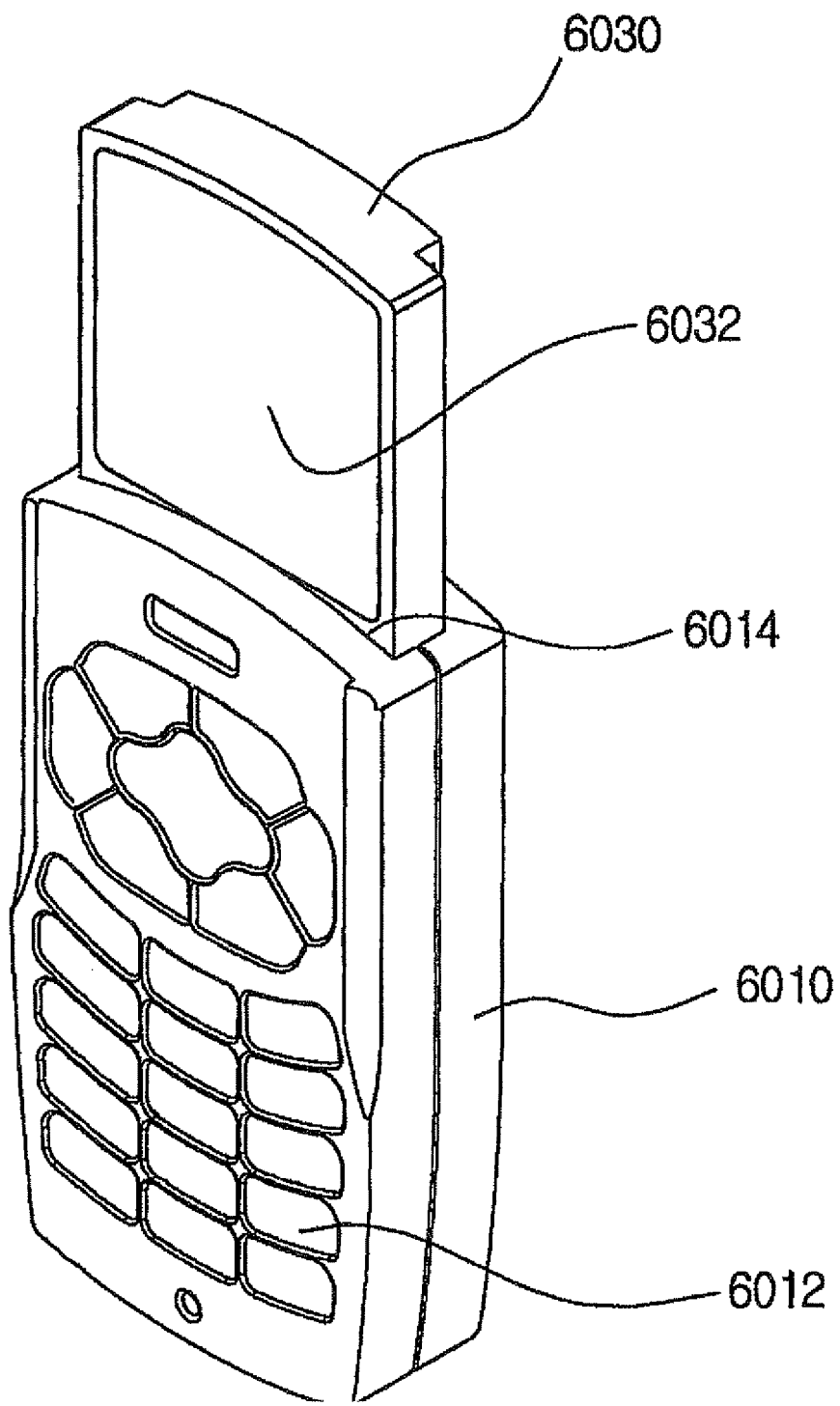
FIG. 39 is a cross-sectional view of the portable terminal shown in FIG. 38, wherein the sub body is outputted.

FIG. 37 is an exploded cross-sectional view of the portable terminal according to the eighth embodiment of the present invention. FIG. 38 is a cross-sectional view of an assembly of the portable terminal shown in FIG. 37. FIG. 39 is a cross-sectional view of the portable terminal shown in FIG. 38, wherein the sub body is outputted.

A keypad (6012) is placed on a main body (6010), and a main board executing various functions is installed in the main body (6010).

Also, a liquid crystal screen (6032) is placed on a sub body (6030), which is electrically connected to the main body (6010) through a flexible PCB.

A receipts space (6014) is formed from the side direction to the inside of the main body (6010), to which the sub body (6030) comes in and out of the receipts space (6014). In other words, when the terminal is closed, the sub body (6030) is partially or completely inserted into the receipts space (6014). When the terminal is opened, the sub body (6030) escapes from the receipts space (6014) so that the liquid crystal screen (6032) placed at the sub body (6030) can be exposed entirely. Thus, when the terminal is not being used, the liquid crystal screen (6032) is not exposed. Hence, the liquid crystal screen (6032) can be protected from the outside contact.

Meanwhile, the stoppering part fixes the sub body (6030) when it is inserted into the receipts space (6014) of the main body (6010).

The sliding bar (6110) of the stoppering part comprises a hook (6112) hung in the fitting boss (6034) formed at the sub body (6030) and a first elongated hole (6114) in a sliding direction, and one end of the sliding bar (6110) appears from the inside to the outside of the main body (6010). For this purpose, a penetrating hole (6016) is formed at the main body (6010), through which one end of the sliding bar (6110) passes, and a button (6120) is coupled to one end of the sliding bar (6110) at the outside.

A first pin (6022), which is coupled to the first elongated hole (6114), is formed at the main body (6010).

Also, a compression spring is placed in a direction where the fitting boss (6034) hangs the hook (6112), so that it can flip the sliding bar (6110). In order to guide the compression spring (6116), a fixing part (6020) is installed in the main body (6010).

Meanwhile, one end of the cross bar (6130) of the elastic part is supported by the main body (6010), and the other end thereof is supported by the sub body (6030). Also, the second cross bar (6140) is placed to be crossed with the first cross bar (6130), one end of which is supported by the main body (6010) and the other end of which is supported by the sub body (6030).

Also, a second pin (6202) is coupled to the center area of the first cross bar (6130) and the second cross bar (6140), so that the first cross bar (6130) and the second cross bar (6140) can be rotated relatively around the second pin (6202).

In addition, a torsion spring (6150) is placed at the second pin (6202), so that the first cross bar (6130) and the second cross bar (6140) can apply the elasticity power in a direction of pushing the sub body (6030).

At least two elastic parts are installed in serial and expand the moving distance of the sub body (6030). For this purpose, one end of the first cross bar (6130) constituting one elastic part is connected to be rotatable to one end of the second cross bar (6140) constituting another elastic part by using a third pin (6204). Also, a first bracket (6160), which is coupled to one end of the first cross bar (6130) and one end of the second cross bar (6140), is provided. The first bracket (6160) is fixed to the main body (6010) by a screw (6200). A pair of second elongated holes (6162) is formed at the first bracket (6160). By using a fourth pin (6206), one end of the first cross bar (6130) and one end of the second cross bar (6140) are coupled to the second elongated holes (6162). Since the fourth pin (6206) can flow as long as the length of the second elongated holes (6162), relative rotation of the first cross bar (6130) and the second cross bar (6140) is possible.

Also, a second bracket (6170), which is coupled to another end of the first cross bar (6130) and another end of the second cross bar (6140), is provided. The second bracket (6170) is fixed to the sub body (6030) by the screw (6200). A pair of third elongated holes (6172) is formed at the second bracket (6170). By using the fourth pin (6206), another end of the first cross bar (6130) and another end of the second cross bar (6140) are coupled to the third elongated holes (6172). Since the fourth pin (6206) can flow as long as the length of the third elongated holes (6172), relative rotation of the first cross bar (6130) and the second cross bar (6140) is possible.

In addition, a pair of guide rails (6180) is fixed to both sides in the main body (6010) respectively. At the guide rails (6180), a guide groove (6182) is formed to which both ends of the first bracket (6160) and the second bracket (6170) are coupled to be slidable. The guide rails (6180) are fixed to the main body (6010) by using the screw (6200).

The function of the main board placed at the main body (6010) is established in such a manner that when the sub body (6030) of such terminal is exposed to the outside, the liquid crystal screen (6032) turns on; and when the sub body (6030) is inserted into the receipts space (6014) of the main body (6010), the liquid crystal screen (6032) turns off.

The operation of this embodiment will be explained in below.

Figure 40:
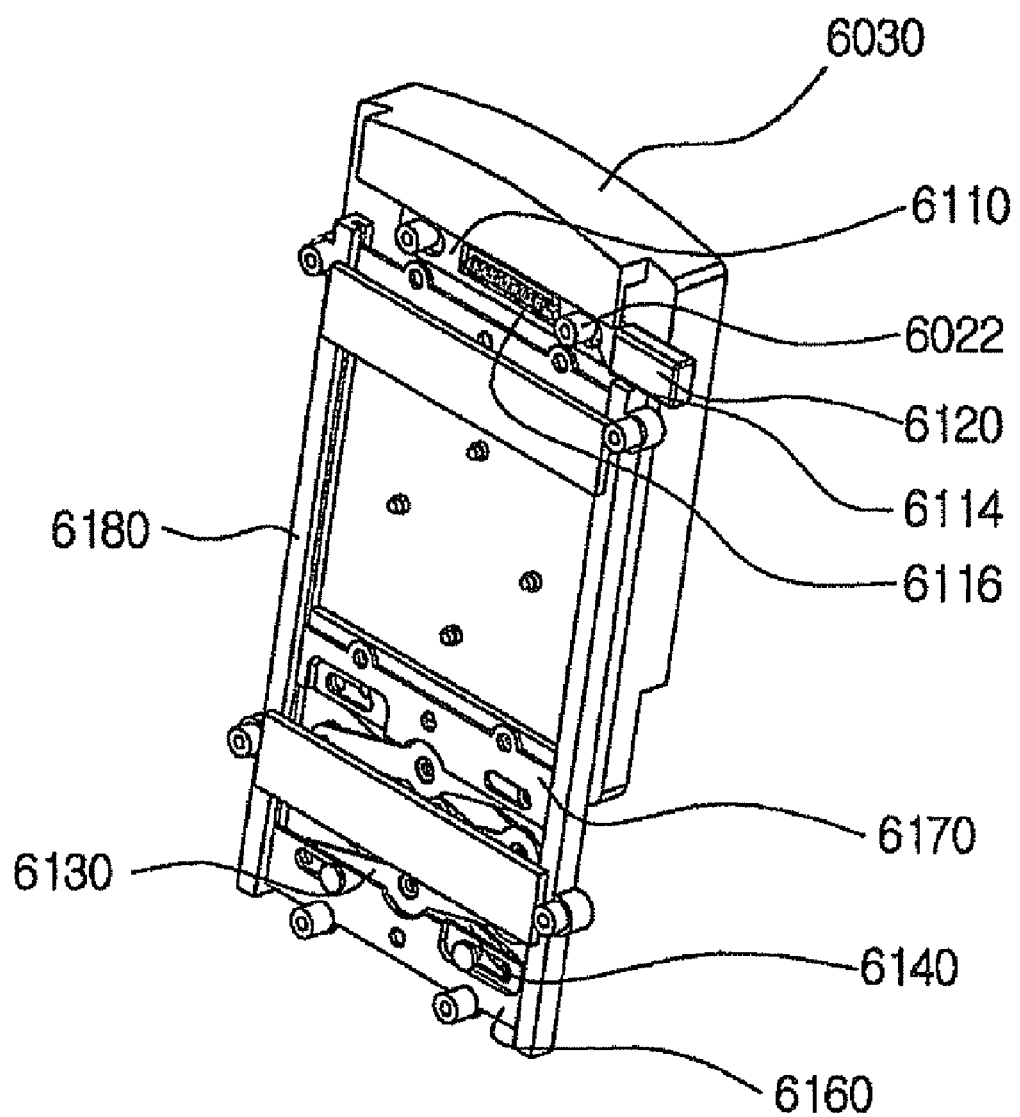
FIGS. 40 and 41 are exploded cross-sectional views showing a closed position of the portable terminal shown in FIG. 37.
Figure 41:
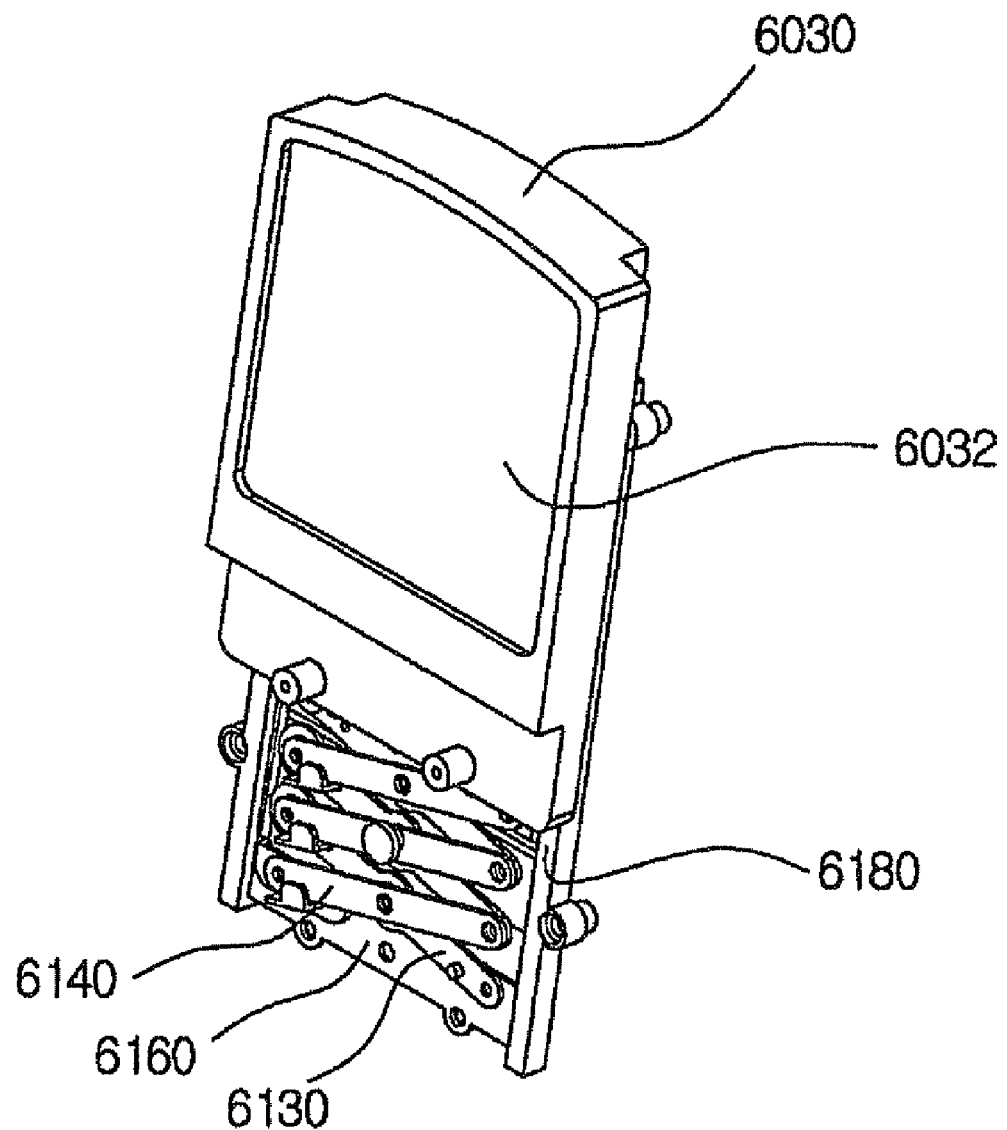
Figure 42:
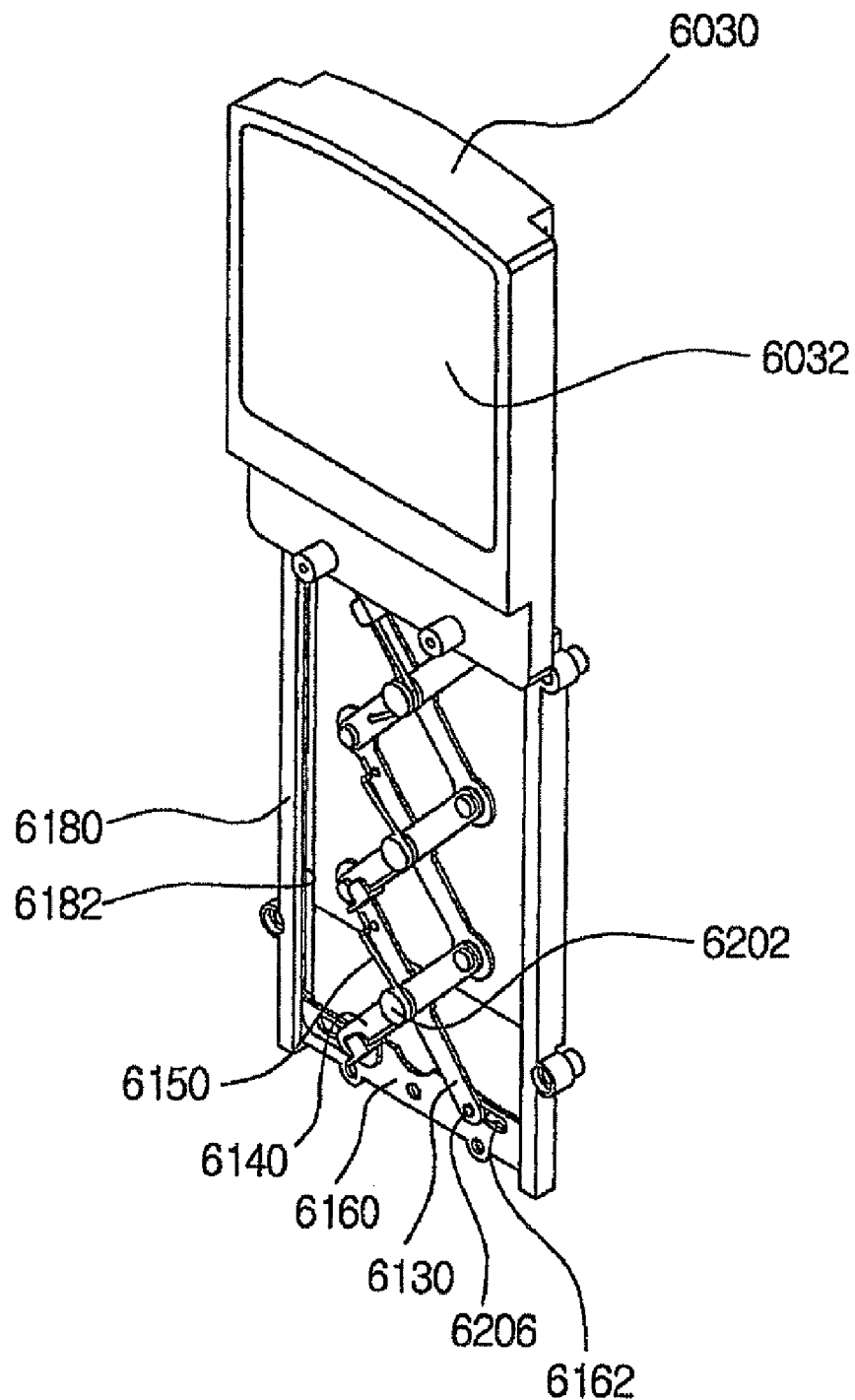
FIGS. 42 and 43 are disassembly cross-sectional views showing an open position of the portable terminal shown in FIG. 37.
Figure 43:
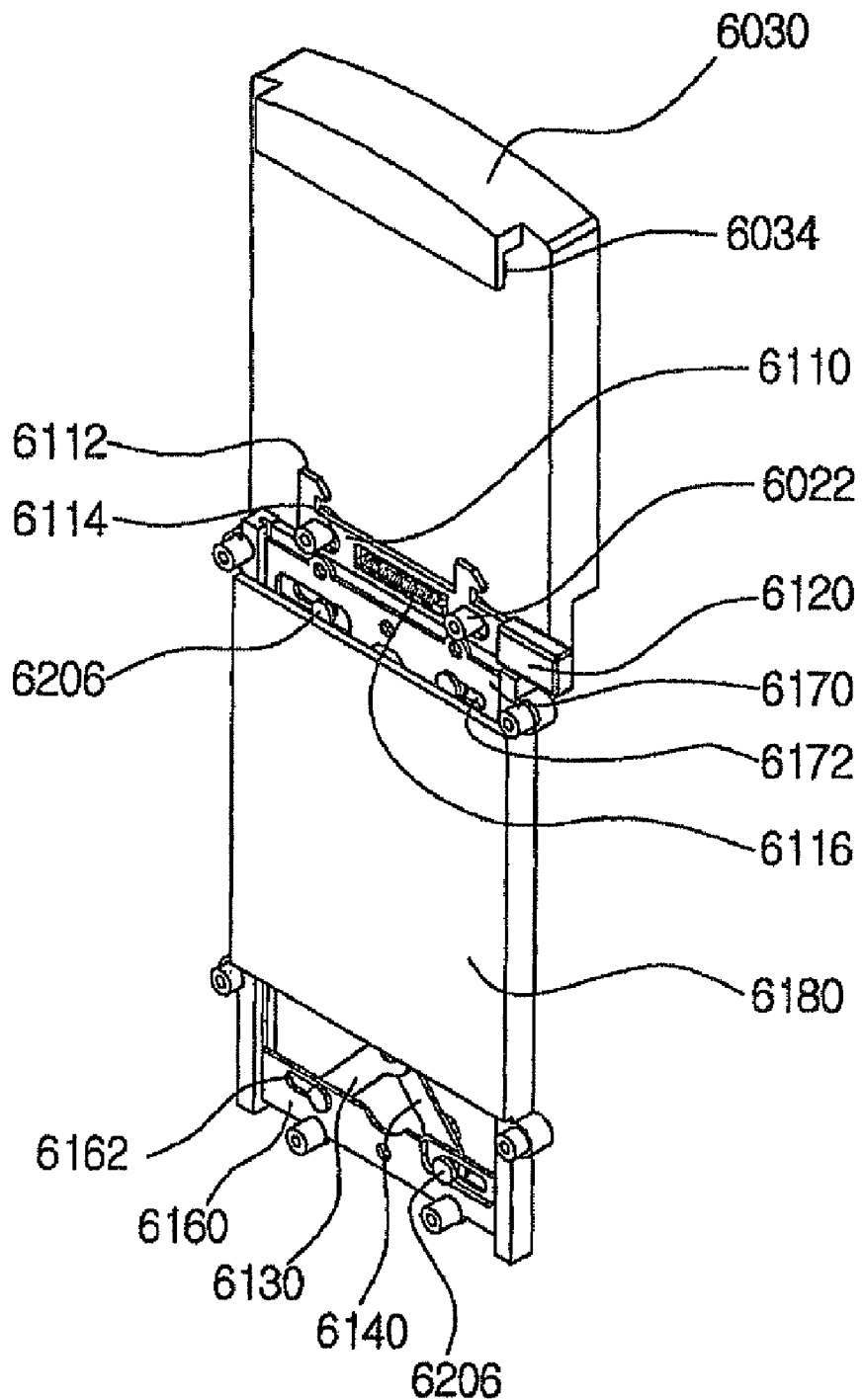

FIGS. 40 and 41 are exploded cross-sectional views showing a closed position of the terminal shown in FIG. 37. FIGS. 42 and 43 are disassembly cross-sectional views showing an open position of the terminal shown in FIG. 37.

First, when the terminal is closed, the sub body (6030) equipped with the liquid crystal screen (6032) is partially or wholly inserted into the receipts space (6014) of the main body (6010). At this time, the sub body (6030) compresses a plurality of the first crossbars (6130) and the second crossbars (6140) by the second bracket (6170). Accordingly, the torsion spring (6150) maintains the tensioned condition.

Also, the hook (6112) of the sliding bar (6110) is coupled to the fitting boss (6034) of the sub body (6030), and maintains the state in which the sub body (6030) is inserted into the receipts space (6014).

In order to output the sub body (6030) under this condition, a button (6120), which is protruded to the side surface of the main body (6010), is pressed. According to the press of the button (6120), the button (6120) and the sliding bar (6110) move together, and the hook (6112) is escaped from the fitting boss (6034). At this time, the first pin (6022) formed at the main body (6010) is inserted into the first elongated hole (6114) of the sliding bar (6110), so that it guides the sliding bar (6110) to conduct only the straight-line motion and not to deviate in other directions.

If the hook (6112) deviates from the fitting boss (6034), the sub body (6030) is outputted to the outside from the receipts space (6014) by the elasticity power of the first cross bar (6130) and the second cross bar (6140), which receive the elasticity power of a plurality of the torsion springs (6150). At this time, if the button (6120) is unhanded, the sliding bar (6110) is extruded back as it was by the elasticity power of the compression spring (6116).

If the sub body (6030) is escaped from the outside, the liquid crystal screen (6032) is exposed to the outside. Accordingly, the user can use the essential function of the terminal as he/she is watching the liquid crystal screen (6032).

Like the above, during the process that the sub body (6030) is slided and outputted to the outside, the first cross bar (6130) and the second cross bar (6140), which receive the elasticity power of the torsion spring (6150), automatically push the sub body (6030) by the press of the button (6120). Thus, the user can open the terminal only with one hand.

Also, even after the sub body (6030) is outputted, the first cross bar (6130) and the second cross bar (6140) continue to receive the elasticity power of the torsion spring (6150) and push the sub body (6030) in a direction of outputting it, and maintains the state in which the sub body (6030) is outputted. Thus, no stopper is required to fix the state in which the sub body (6030) is outputted.

Meanwhile, in order to close the terminal in the state that the sub body (6030) is outputted, the user should scrouge the sub body (6030) into the receipts space (6014).

By this action, the sub body (6030) is inputted into the receipts space (6014) as it pushes the first cross bar (6130) and the second cross bar (6140). Accordingly, the torsion spring (6150) gets tensed, and the first cross bar (6130) and the second cross bar (6140) rotate relatively and both ends thereof become extended as far as possible.

Then, if the sub body (6030) is sufficiently inserted into the receipts space (6014), the fitting boss (6034) formed at the sub body (6030) gets hung in the hook (6112) of the sliding bar (6110). Thus, the state wherein the sub body (6030) is installed in the receipts space (6014) is maintained.

The portable terminal having the sliding opening and closing device according to the ninth embodiment of the present invention will be further described with reference to the drawings in below.

Figure 44:
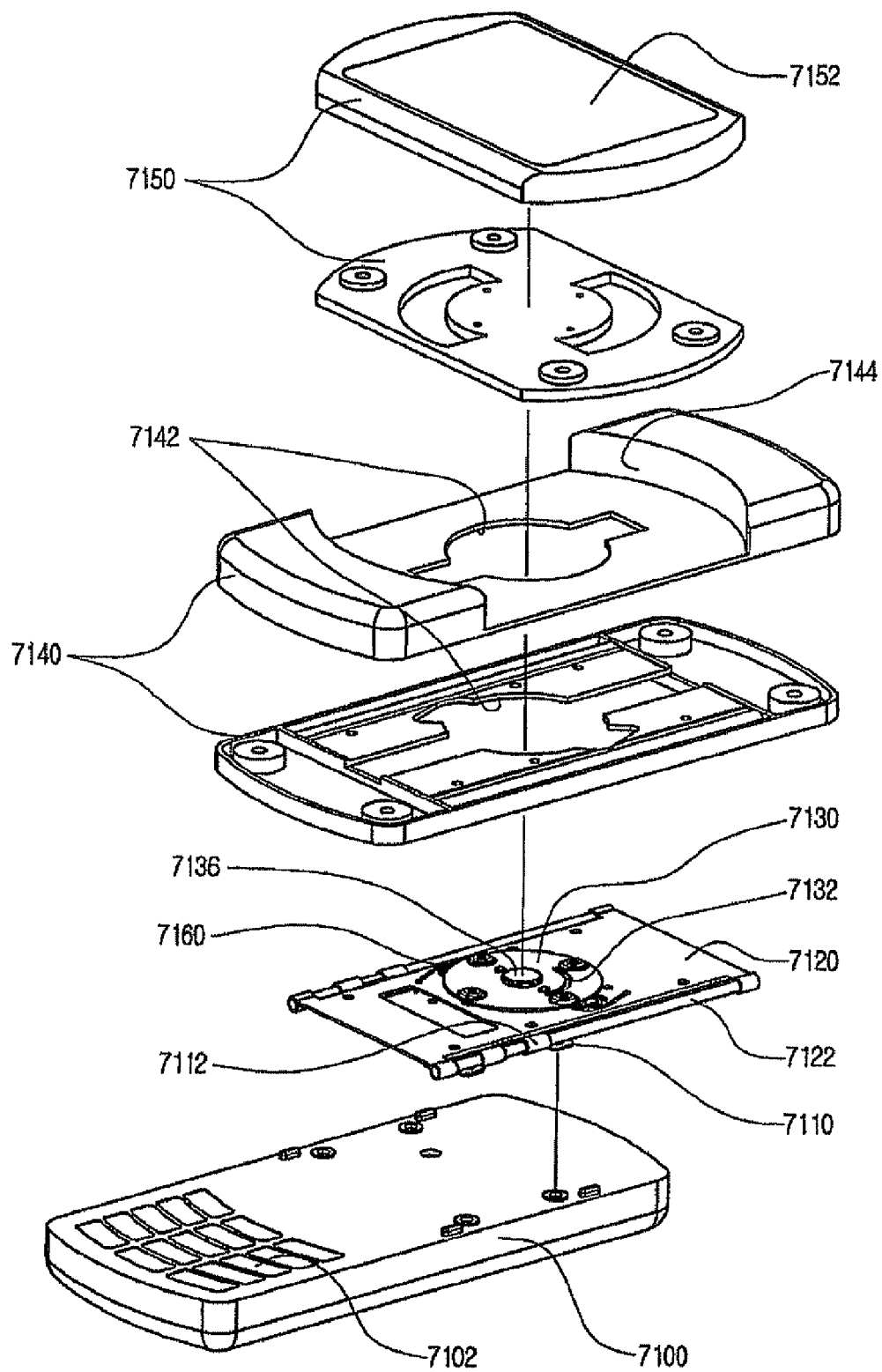
FIG. 44 is an exploded cross-sectional view of a portable terminal having the sliding opening and closing device according to a ninth embodiment of the present invention.
Figure 45:
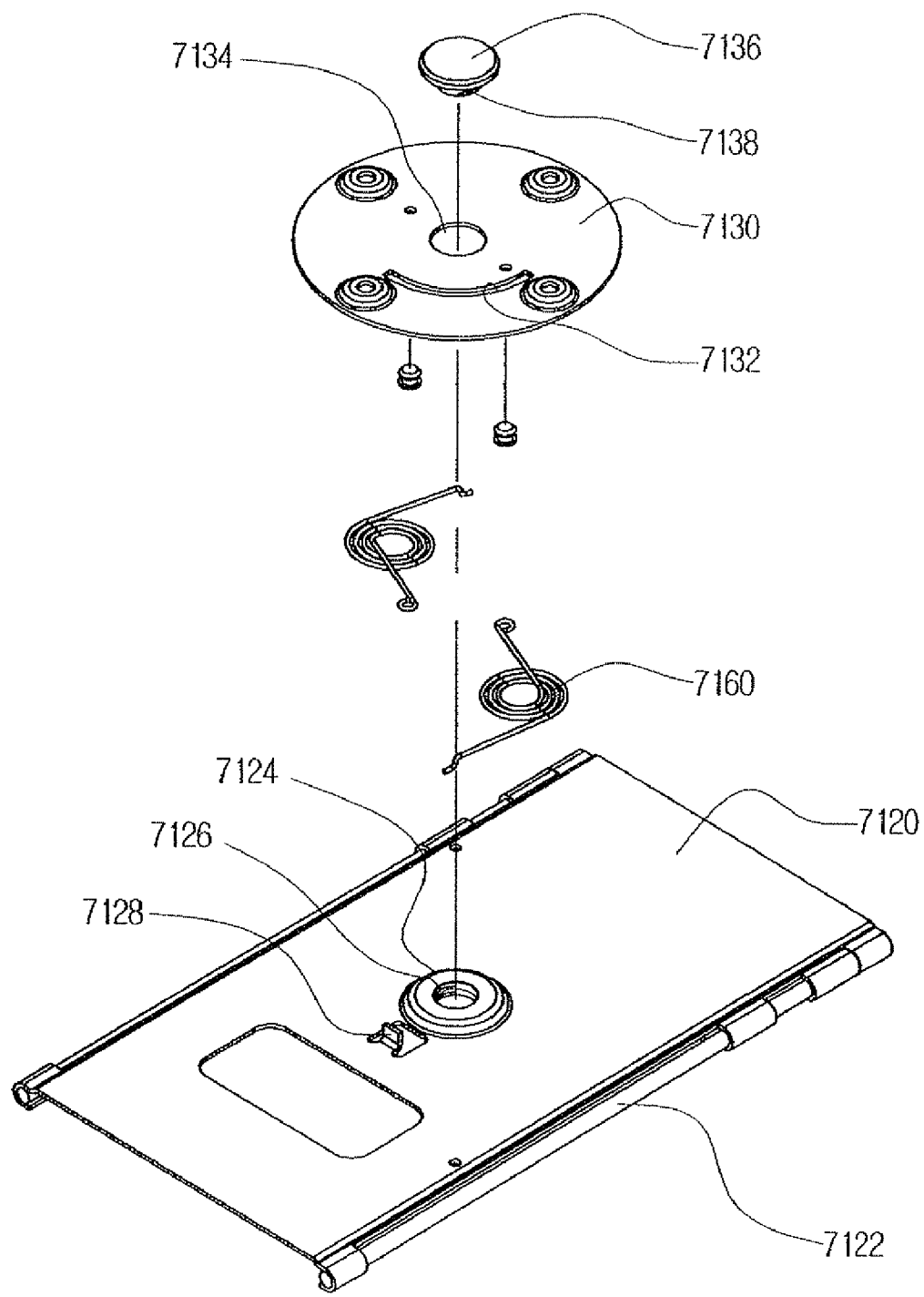
FIG. 45 is an exploded cross-sectional view of the essential parts of the portable terminal shown in FIG. 44.
Figure 46:
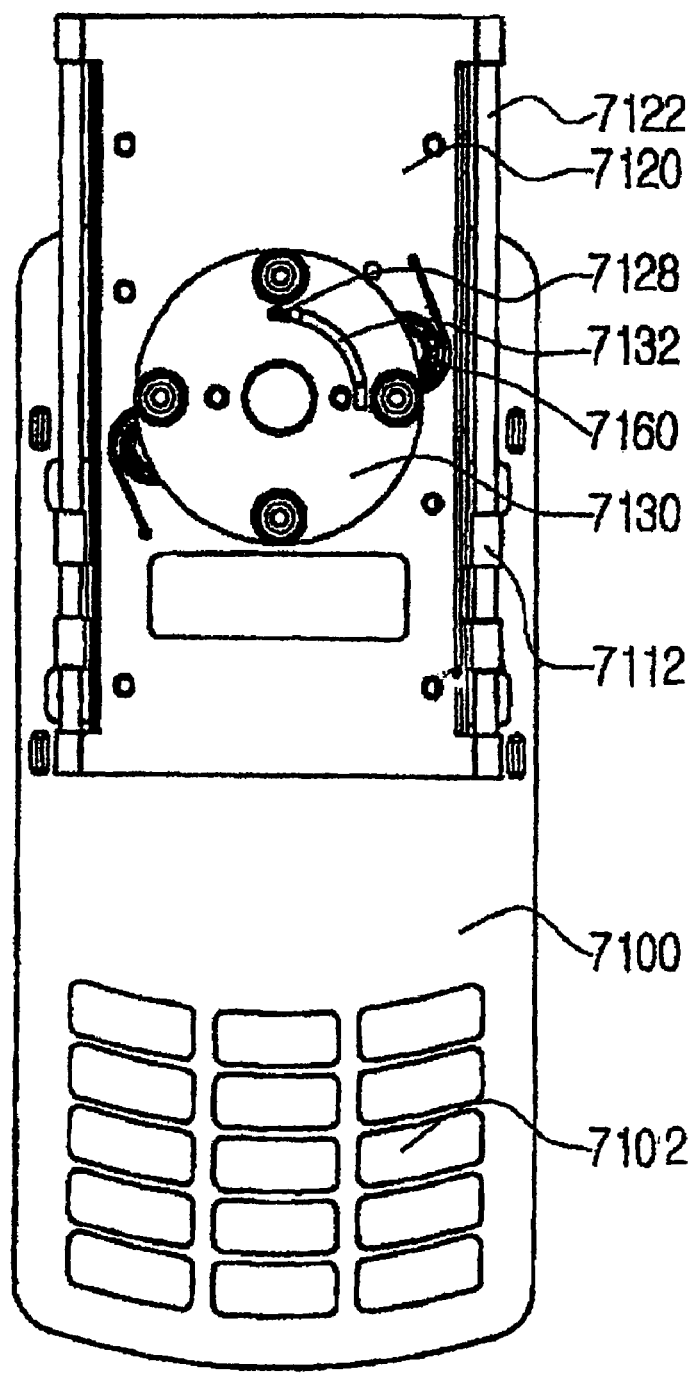
FIG. 46 is a top plan view of an assembly of the portable terminal shown in FIG. 44, wherein the sliding opening and closing device is cross-sectioned.

FIG. 44 is an exploded cross-sectional view of the communication terminal according to the ninth embodiment of the present invention; FIG. 45 is an exploded cross-sectional view of the essential parts of the communication terminal shown in FIG. 44; and FIG. 46 is a fragmentary view of an assembly of the communication terminal shown in FIG. 44.

The communication terminal shown in the figures comprises a main body (7100); a main plate (7110) which is coupled to the main body (7100); a slide plate (7120) which is coupled to be slidable to the main plate (7110); a rotating plate (7130) which is coupled to be rotatable to the slide plate (7120); a sub body (7140) which is fixed to the slide plate (7120); and a display device (7150) which is fixed to the rotating plate (7130) and rotates on the sub body (7140).

At the main body (7100), a keypad (7102) for controlling various functions is plated on the surface thereof, and a control circuit part is installed therein. A liquid crystal screen (7152), which receives a signal from the control circuit part and outputs it as an image, is mounted on the display device (7150).

At the sub body (7140), a penetrating part (7142) for passing the rotating plate (7130) is formed, and an equipping space (7144), in which the display device (7150) can rotate, is formed.

A coupling means such as the screw couples the main plate (7110) to the main body (7100), the slide plate (7120) to the sub body (7140), and the rotating plate (7130) to the display device (7150).

A slide shaft (7122) is fixed to the slide plate (7120), and a shaft holder (7112), which is coupled to be slidable to the slide shaft (7122), is formed at the main plate (7110). The slide shaft (7122) is made of metal, and has a fine surface with precise process.

A first elastic part is placed, which supplies an elasticity power in a direction of closing the slide plate (7120) when the slide plate (7120) is near to the closed position of the slide plate based on a particular spot on the moving course of the slide plate; and supplies an elasticity power in a direction of opening the slide plate when the slide plate (7120) is near to the open position of the slide plate based on a particular spot on the moving course of the slide plate (7120).

The first elastic part is composed of a torsion spring (7160), of which the main plate (7110) supports one end and the rotating plate (7130) supports the other end.

The torsion spring (7160) supplies an elasticity power to the rotating plate (7130) to maintain the initial condition when the rotating plate (7130) is not rotating, while it supplies an elasticity power to the rotating plate (7130) to continue to rotate when the rotating plate (7130) is rotating.

The winding part of the torsion spring (7160) is wound a plurality of times, so that its radius can become widened around a concentric circle. Accordingly, the height value of the torsion spring (7160) is minimized irrelevant to the winding number of the torsion spring (7160), thereby excluding limitation of the size and thickness of the terminal, and reducing limitation in design of the terminal.

Also, the point of inflection of the torsion spring (7160) in a direction of the elasticity power is positioned within ½ of the total movement distance of the main plate (7110) from the closed spot thereof. In other words, by making the distance from the open position of the sub body (7140) to the inflection point to be short, the sub body (7140) can be rapidly opened when the tone rings at the main body (7100).

The rotating plate (7130) rotates around the center axis (7136) which passes through the penetrating hole (7134) formed at the center of the rotating plate (7130), and which is coupled to the slide plate (7120).

At the slide plate (7120), a table part (7124) is formed to support the bottom of the center area of the rotating plate (7130).

A male shaft (7138) is formed at the center axis (7136), and a female shaft (7126), to which the male shaft (7138) is coupled, is formed at the center of the table part (7124).

Meanwhile, a rotation limiting means is provided to limit the rotation angle of the rotating plate (7130).

The rotation limiting means is composed of a rotation limiting boss (7128) which is formed at one side of either the slide plate (7120) or the rotating plate (7130), and which is inserted into the trajectory groove (7132) formed at the other side thereof.

The rotation-limiting boss (7128) contacts both ends of the trajectory groove (7132) respectively and controls the rotating plate (7130) not to rotate any more when it is rotating or is not rotating.

The operation of this embodiment will be explained in below.

Figure 47:
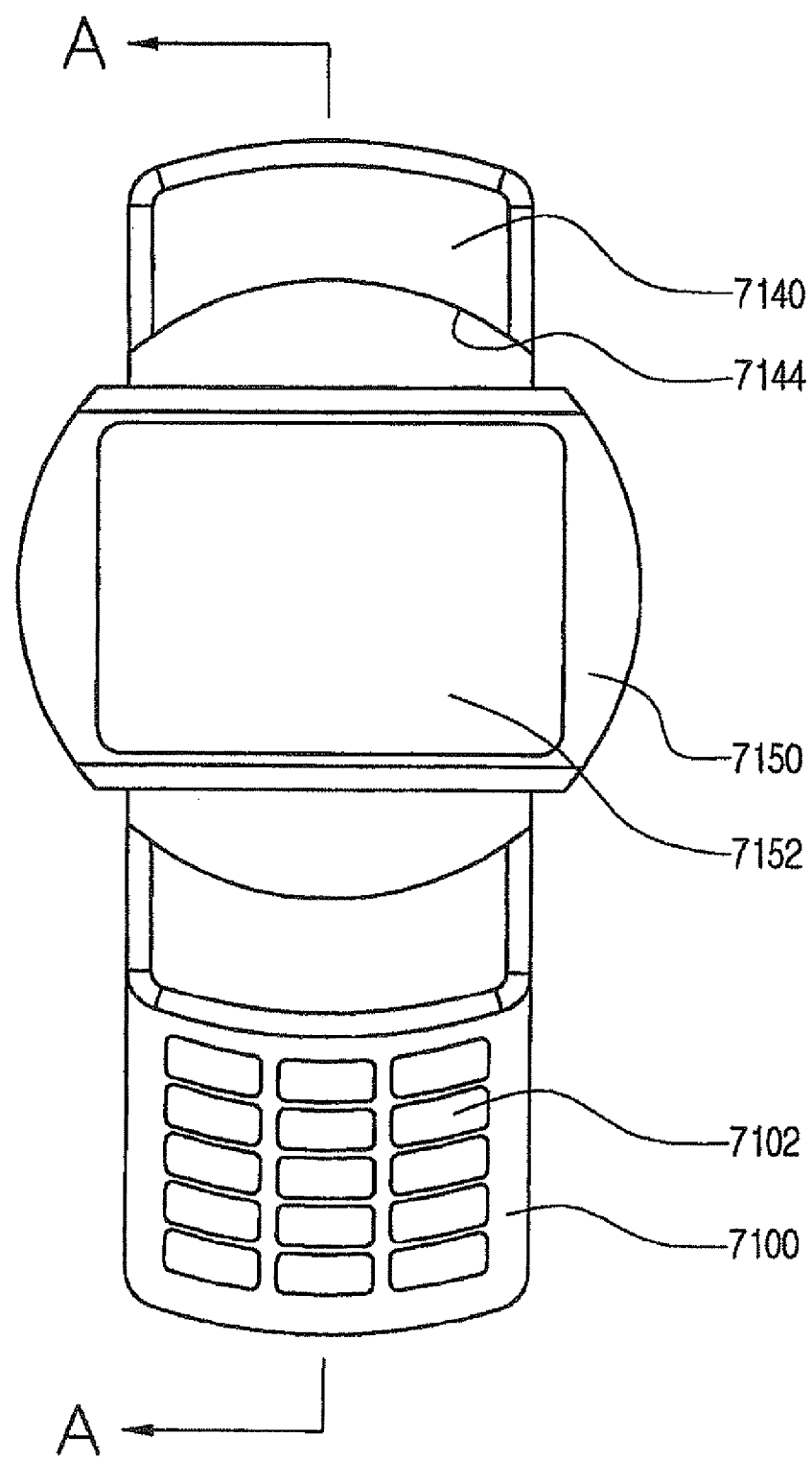
FIG. 47 is a top plan view of the state of using of the portable terminal shown in FIG. 46.
Figure 48:
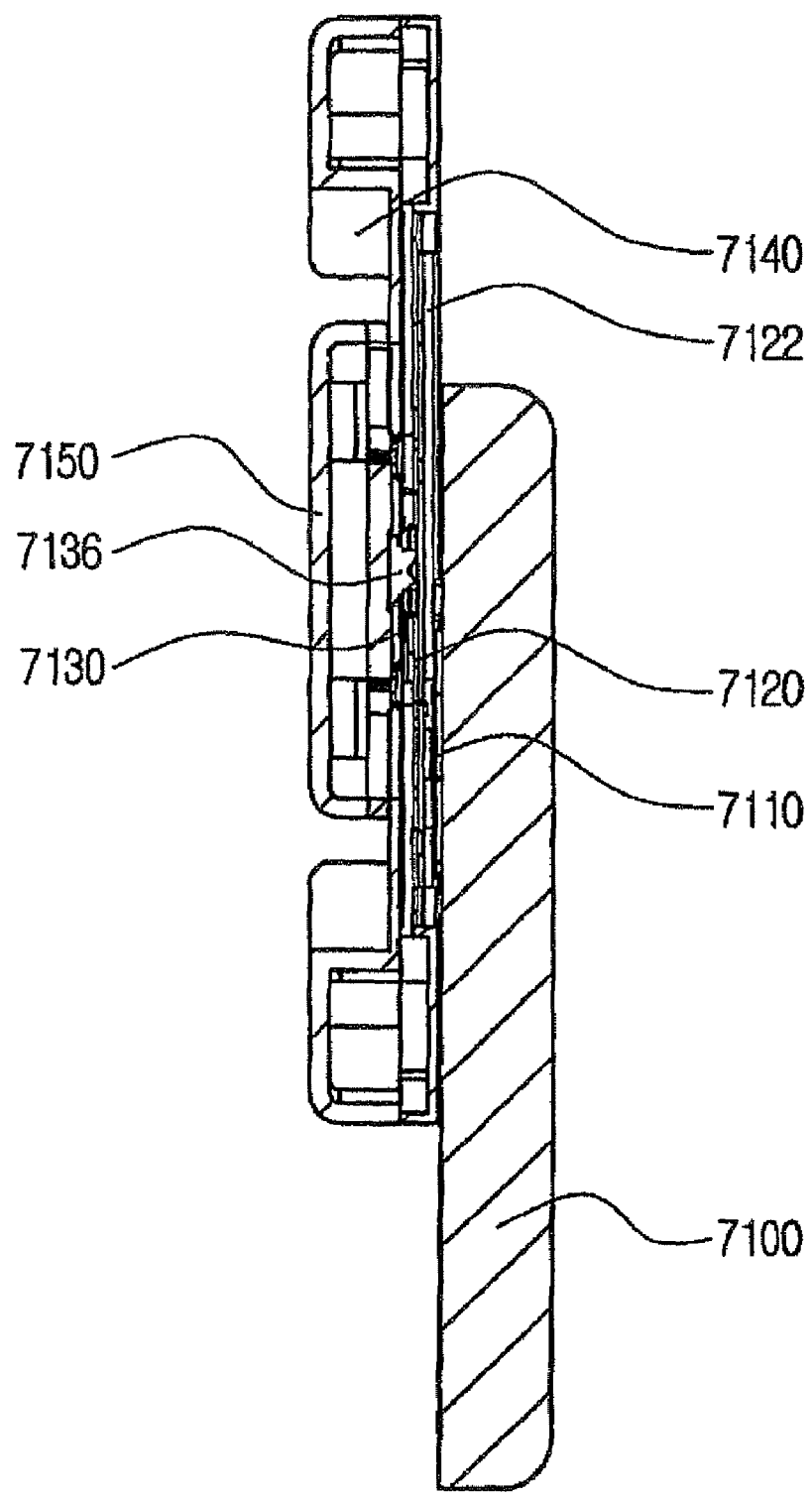
FIG. 48 is a vertical cross-section view of the portable terminal shown in FIG. 47.

FIG. 47 is a top plan view of the state of using of the communication terminal shown in FIG. 46; and FIG. 48 is a vertical cross-section view of FIG. 47.

When the communication terminal is closed, the sub body (7140) gets superposed and closed into the main body (7100) equipped with the keypad (7102). At this time, the slide plate (7120) coupled to the sub body (7140) maintains a closed position by the elasticity power of the torsion spring (7160).

The rotating plate (7130) coupled to the display device (7150) maintains the initial condition by receiving the elasticity power of the torsion spring (7160).

In order to open the communication terminal under this condition, if the sub body (7140) is pushed by hand, the sub body (7140) slides along with the slide plate (7120). At this time, the slide shaft (7122) fixed to the slide plate (7120) slides in the shaft holder (7112) of the main plate (7110).

At first, the sub body (7140) should be pushed by force, but if it passes the inflection point of the torsion spring (7160), the slide plate (7120) is pulled out in the direction of being opened by the elasticity power of the torsion spring (7160). From this moment, the sub body (7140) automatically moves until it becomes an open position without force.

Even when the sub body (7140) is completely opened, the elasticity power of the torsion spring (7160) continues to be applied to the slide plate (7120). Thus, the sub body (7140) maintains the open position.

If the sub body (7140) is opened, the keypad (7102) of the main body (7100) is opened. Then, the user can use the essential function of the communication terminal.

Meanwhile, in order to appreciate a film through the liquid crystal screen (7152) of the display device (7150) when the sub body (7140) is opened, the display device (7150) should be rotated by 90.degree. by hand.

Then, the rotating plate (7130) coupled to the display device (7150) rotates around the center axis (7136). After the display device (7150) rotates by 90.degree., the rotation limiting boss (7128) is hung in the end of the trajectory groove (7132) and limits rotation of the display device (7150). Thereafter, the torsion spring (7160) continues to push the rotating plate (7130) in a direction of the rotation, so that the display device (7150) can maintain the rotation state.

Like the above, if the display device (7150) rotates by 90 degrees, the liquid crystal screen (7152) mounted on the display device (7150) becomes long horizontally enough to be suitable to appreciate a film. Hence, the user can watch the proper screen of a film through the liquid crystal screen (7152).

Meanwhile, if the film appreciation through the liquid crystal screen (7152) is finished, the display device (7150) is rotated in a contrary direction to the above. Accordingly, the rotating plate (7130) rotates around the center axis (7136) in the contrary direction. After the display device (7150) is rotated by 90 degrees., the rotation limiting boss (7128) is hung in the end of the trajectory groove (7132) and limits rotation of the display device (7150).

The torsion spring (7160) continues to push the rotating plate (7130) to the initial position, so that the display device (7150) can maintain the initial condition.

Meanwhile, if the communication terminal should be closed when the sub body (7140) is opened, the user should scrouge the sub body (7140) by hand in a direction of closing it. The closed operation of the sub body (7140) is conducted in reverse order to the open operation.

Industrial Applicability

In the sliding opening and closing device according to the preferred embodiments of the present invention, which is constituted as the above, if it is applied to a portable terminal, the folder can be opened from and closed into the main body of the portable terminal. Also, with the superior operation capacity and durability of the sliding opening and closing device, the reliability can be enhanced.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable terminal having a sliding opening and closing device, comprising:
   a main body;
   a main plate which is coupled to said main body;
   a slide plate which is coupled to be slidable to said main plate;
   a rotating plate which is coupled to be rotatable to said slide plate;
   a sub body which is fixed to said slide plate; and
   a display device which is fixed to said rotating plate and rotatable relative to said sub body, wherein one of the slide plate and the rotating plate defines a trajectory groove; and wherein the other of the slide plate and the rotating plate includes a rotation limiting boss for engaging the trajectory groove to limit rotation of the slide plate relative to the rotating plate; at least one elastic part having one end supported by the main plate and another end supported by the rotating plate, so that the at least one elastic part can supply an elasticity power to said rotating plate to maintain the initial condition when said rotating plate is not rotating, while the at least one elastic part can supply an elasticity power to said rotating plate to continue to rotate when said rotating plate is rotating; wherein the point of inflection of the at least one elastic part in a direction of the elasticity power is positioned within ½ of the total movement distance of the main plate from the closed spot thereof, whereby the shorter distance from the open position of the sub body to the inflection point allows the sub body to be rapidly opened.

2. The portable terminal having the sliding opening and closing device as claimed in claim 1, wherein a slide shaft is fixed to said slide plate, and a shaft holder is installed in said main plate, which is coupled to be slidable to said slide shaft.

3. The portable terminal having the sliding opening and closing device as claimed in claim 1, further comprising a first elastic part which supplies an elasticity power in a direction of closing said slide plate when said slide plate is near to the closed position of said slide plate based on a certain spot on the moving course of said slide plate, while it supplies an elasticity power in a direction of opening said slide plate when said slide plate is near to the open position of said slide plate based on a certain spot on the moving course of said slide plate.

4. The portable terminal having the sliding opening and closing device as claimed in claim 3, wherein the point of inflection in a direction of supplying force of said first elastic part is positioned within ½ of the total movement distance of said main plate from the closed spot thereof.

5. The portable terminal having the sliding opening and closing device as claimed in claim 3, wherein said first elastic part comprises at least one torsion spring, one end of which is supported by said main plate and the other end of which is supported by said slide plate.

6. The portable terminal having the sliding opening and closing device as claimed in claim 5, wherein a winding part of said first elastic part is wound a plurality of times, so that its radius can become widened around a concentric circle.

7. The portable terminal having the sliding opening and closing device as claimed in claim 3, wherein said first elastic part comprises at least one torsion spring, one end of which is supported by said main plate and the other end of which is supported by said rotating plate, so that it can supply an elasticity power to said rotating plate to maintain the initial condition when said rotating plate is not rotating, while it can supply an elasticity power to said rotating plate to continue to rotate when said rotating plate is rotating.

8. The portable terminal having the sliding opening and closing device as claimed in claim 7, wherein a winding part of said first elastic part is wound a plurality of times, so that its radius can become widened around a concentric circle.

9. The portable terminal having the sliding opening and closing device as claimed in claim 3, further comprising a second elastic part which supplies an elasticity power to said rotating plate to maintain the initial condition when said rotating plate is not rotating, while it supplies an elasticity power to said rotating plate to continue to rotate when said rotating plate is rotating.

10. The portable terminal having the sliding opening and closing device as claimed in claim 9, wherein said second elastic part comprises at least one torsion spring, one end of which is supported by said slide plate and the other end of which is supported by said rotating plate.

11. The portable terminal having the sliding opening and closing device as claimed in claim 10, wherein a winding part of said second elastic part is wound a plurality of times, so that its radius can become widened around a concentric circle.

12. The portable terminal having the sliding opening and closing device as claimed in claim 1, wherein said rotating plate rotates around a center axis which passes through a penetrating hole formed at a center of said rotating plate, and which is coupled to said slide plate.

13. The portable terminal having the sliding opening and closing device as claimed in claim 12, wherein at said slide plate, a table part is formed to support a bottom of a center area of said rotating plate.

14. An opening and closing device for a portable terminal having a main body, a sub body, and a display device, the device comprising:

a main plate which is configured to be coupled to said main body;

a slide plate which is configured to be fixed to said sub body and coupled to be slidable to said main plate;

a rotating plate which is coupled to be rotatable to said slide plate, the rotating plate configured to be fixed to said display device such that said display device is rotatable relative to said sub body;

a trajectory groove defined by one of the slide plate and the rotating plate; and a rotation limiting boss for engaging the trajectory groove to limit rotation of the slide plate relative to the rotating plate, wherein the other of the slide plate and the rotating plate includes the rotation limiting boss; at least one elastic part having one end supported by the main plate and another end supported by the rotating plate, so that the at least one elastic part can supply an elasticity power to said rotating plate to maintain the initial condition when said rotating plate is not rotating, while the at least one elastic part can supply an elasticity power to said rotating plate to continue to rotate when said rotating plate is rotating; wherein the point of inflection of the at least one elastic part in a direction of the elasticity power is positioned within ½ of the total movement distance of the main plate from the closed spot thereof, whereby the shorter distance from the open position of the sub body to the inflection point allows the sub body to be rapidly opened.

15. The opening and closing device of claim 14, wherein the at least one elastic part includes a winding part that is wound a plurality of times, so that its radius can become widened around a concentric circle, whereby a height value of the at least one elastic part is minimized irrelevant to the winding number of the at least one elastic part.

16. The opening and closing device of claim 14, wherein the at least one elastic part comprises:

a first torsion spring having one end supported by said main plate and another end supported by said slide plate; and a second torsion spring having one end supported by said main plate and another end supported by said rotating plate.

17. A portable terminal having the opening and closing device of claim 14, wherein the portable terminal is configured such that:

when the portable terminal is closed with the sub body superposed and closed into the main body, the slide plate coupled to the sub body maintains a closed position by the elasticity power of the at least one elastic part and the rotating plate coupled to the display device maintains the initial condition by receiving the elasticity power of the at least one elastic part;

when the sub body is pushed by hand, the sub body slides along with the slide plate but after it passes the inflection point of the at least one elastic part, the slide plate is pulled out in the direction of being opened by the elasticity power of the at least one elastic part to thereby automatically move the sub body to an open position without force; and when the sub body is completely opened, the elasticity power of the at least one elastic part continues to be applied to the slide plate to thereby maintain the sub body in the open position, and the display device is rotatable by 90 degrees until the rotation limiting boss contacts an end of the trajectory groove thereby limiting continued rotation of the display device, thereafter, the at least one elastic part continues to push the rotating plate in a direction of the rotation so that the display device can maintain the rotation state.

18. The opening and closing device of claim 14, wherein the rotation limiting boss is operable to limit the rotation angle of the rotating plate, whereby the rotation limiting boss is inserted into the trajectory groove and contacts both ends of the trajectory groove respectively to control the rotating plate not to rotate any more when it is rotating or is not rotating.

* * * * *